United States Patent
Bernier

(10) Patent No.: US 10,253,849 B2
(45) Date of Patent: Apr. 9, 2019

(54) CURVILINEAR GEAR AND METHOD

(71) Applicant: Leo J. D. Bernier, Hampton, NH (US)

(72) Inventor: Leo J. D. Bernier, Hampton, NH (US)

(*) Notice: Subject to any disclaimer, the term of this patent is extended or adjusted under 35 U.S.C. 154(b) by 827 days.

(21) Appl. No.: 14/542,853

(22) Filed: Nov. 17, 2014

(65) Prior Publication Data

US 2015/0316127 A1 Nov. 5, 2015

Related U.S. Application Data

(60) Division of application No. 12/562,167, filed on Sep. 18, 2009, now Pat. No. 8,888,651, which is a continuation-in-part of application No. 12/310,830, filed as application No. PCT/US2007/019474 on Sep. 7, 2007, now abandoned.

(60) Provisional application No. 60/842,724, filed on Sep. 7, 2006.

(51) Int. Cl.
  *F16H 15/28* (2006.01)
  *F16H 3/42* (2006.01)

(52) U.S. Cl.
  CPC ............... *F16H 3/42* (2013.01); *F16H 15/28* (2013.01); *Y10T 74/1836* (2015.01); *Y10T 74/1987* (2015.01); *Y10T 74/19565* (2015.01); *Y10T 74/19642* (2015.01)

(58) Field of Classification Search
  CPC ............. F16H 15/26; F16H 15/28; F16H 3/42

USPC ...................................................... 476/36, 38
  See application file for complete search history.

(56) References Cited

U.S. PATENT DOCUMENTS

| | | | | |
|---|---|---|---|---|
| 1,050,351 A | * | 1/1913 | Dean | F16H 15/14 476/31 |
| 1,826,408 A | * | 10/1931 | Tenney | F16H 15/00 476/38 |
| 2,230,627 A | * | 2/1941 | Sachse | F16H 15/26 476/31 |
| 5,129,275 A | * | 7/1992 | Park | F16H 1/006 464/109 |
| 5,339,707 A | * | 8/1994 | Arbus | F16H 37/043 74/413 |
| 7,147,587 B2 | * | 12/2006 | Kaplun | F16H 15/28 476/55 |

* cited by examiner

*Primary Examiner* — William C Joyce
(74) *Attorney, Agent, or Firm* — Lorusso & Associates

(57) ABSTRACT

A curvilinear gear system and method for transferring force and speed through a wide range of angles is disclosed. The system can optionally incorporate curvilinear U joints to increase effective range of angles to tailor the system to specific applications. The system includes complimentary gear heads, one of which is a curvilinear gear such as a hemispherical gear. A method of using the gear systems in a transmission apparatus is also disclosed.

13 Claims, 116 Drawing Sheets

PRIOR ART

PRIOR ART
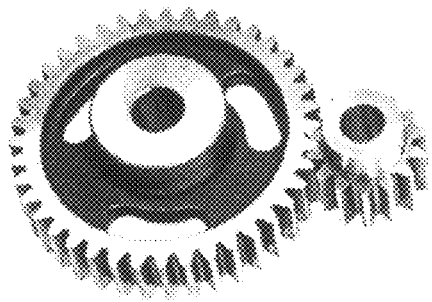
Spur Gear
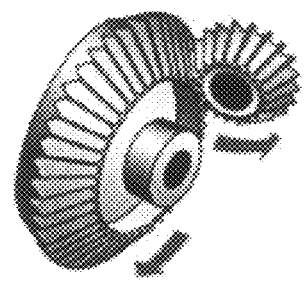
Bevel Gear
FIG. 3

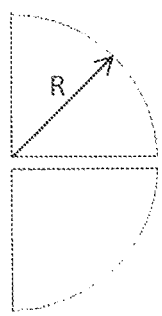 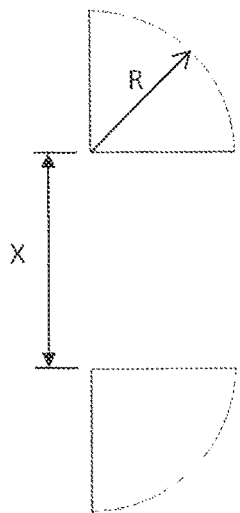 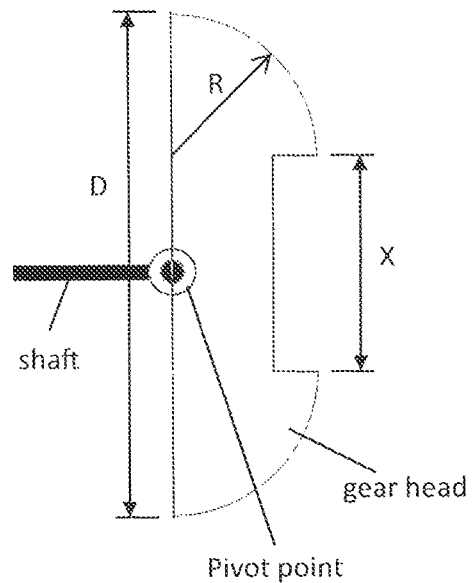
FIG. 9(a)    FIG. 9(b)    FIG. 9(c)
where X ≥ 0
FIG. 9

| Torque Ratio | Angular Velocity Ratio | Gear Ratio |
|---|---|---|
| Torque = Force x Radius | Angular Velocity Ratio= $C_{GA}/C_{GB}$ (Where C – Circumference) | A Gear Ratio of 10:1 seems to be a reasonable expectation. |
| Max Val - $R_A/R_B$ Min Val - $(R_A+L_A)/(R_B+L_B)$ | Max Val - $R_A/R_B$ Min Val - $(R_A+L_A)/(R_B+L_B)$ | Higher ratios are also possible by simply varying the radii, or be connected gear sets serially. |

PRIOR ART
Legend:
T – Torque
V – Angular Velocity
V – Velocity
F – Force
d – Diameter
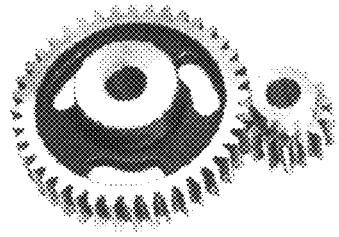
$T = d/2 \times F$
FIG. 13(a)
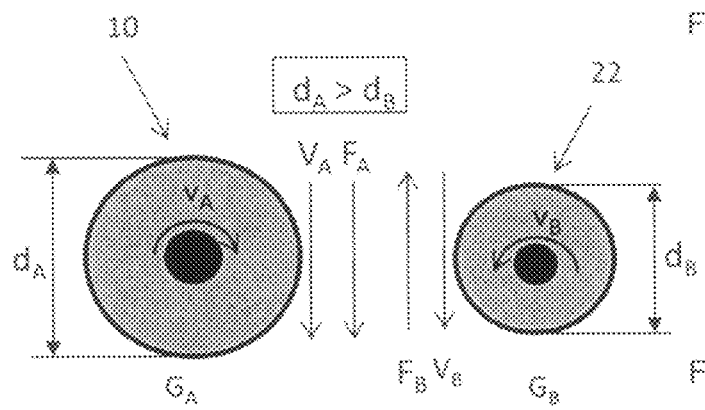
If $d_A > d_B$:
- $T_A > T_B$
- $V_A < V_B$
- $V_A = V_B$
- $F_A = F_B$
FIG. 13(b)
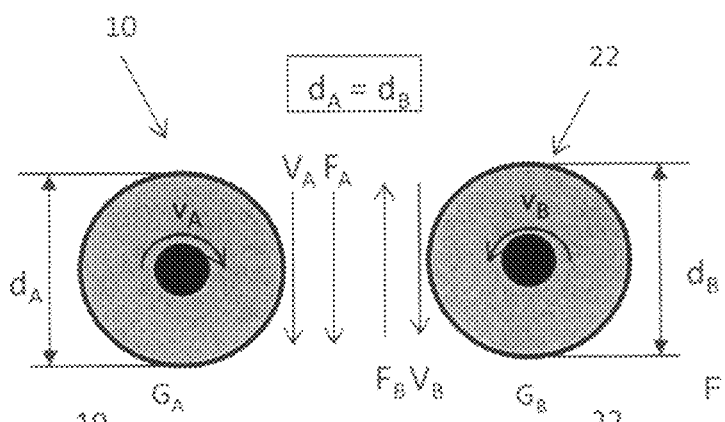
If $d_A = d_B$:
- $T_A = T_B$
- $V_A = V_B$
- $V_A = V_B$
- $F_A = F_B$
FIG. 13(c)
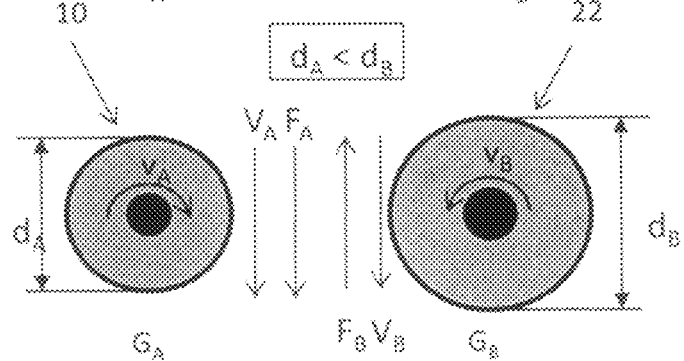
If $d_A > d_B$:
- $T_A < T_B$
- $V_A > V_B$
- $V_A = V_B$
- $F_A = F_B$
FIG. 13(d)
FIG. 13

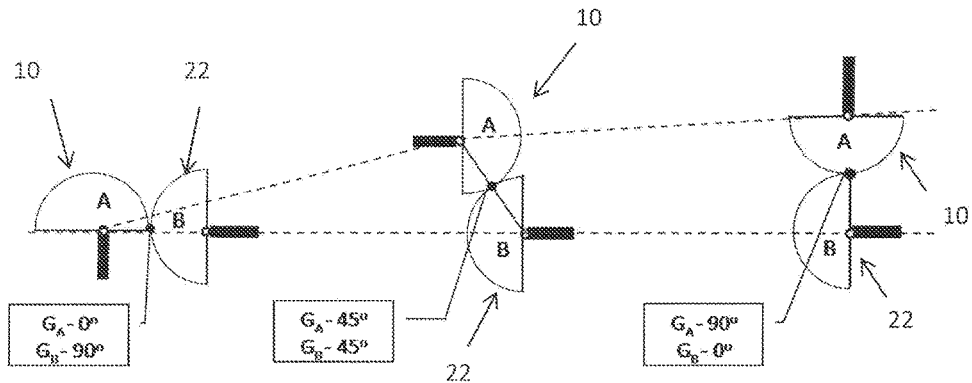

FIG. 14(a)

Legend:

T – Torque
V – Angular Velocity
V – Velocity
F – Force
d – Diameter

T = d/2 X F

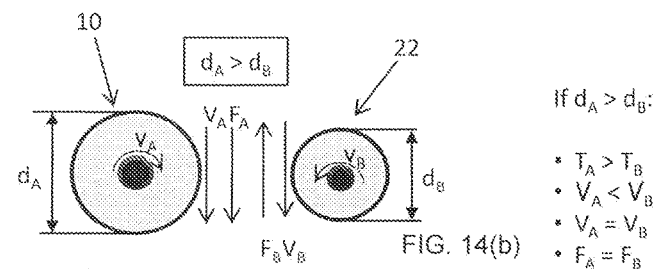

- $d_A$ continues to decrease from 0° to 45°
- $d_B$ continues to increase from 90° to 45°
- $d_A > d_B$ throughout this range If $d_A > d_B$:
- $T_A > T_B$
- $V_A < V_B$
- $V_A = V_B$
- $F_A = F_B$

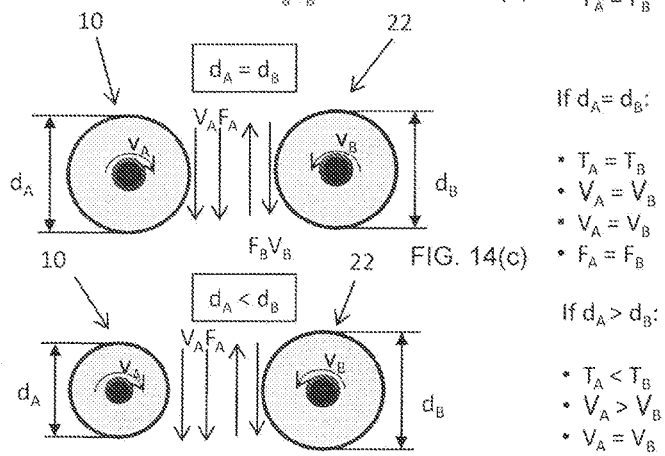

- $d_A$ continues to decrease from 45° to 90°
- $d_B$ continues to increase from 45° to 0°
- $d_B > d_A$ throughout this range If $d_A > d_B$:
- $T_A < T_B$
- $V_A > V_B$
- $V_A = V_B$
- $F_A = F_B$

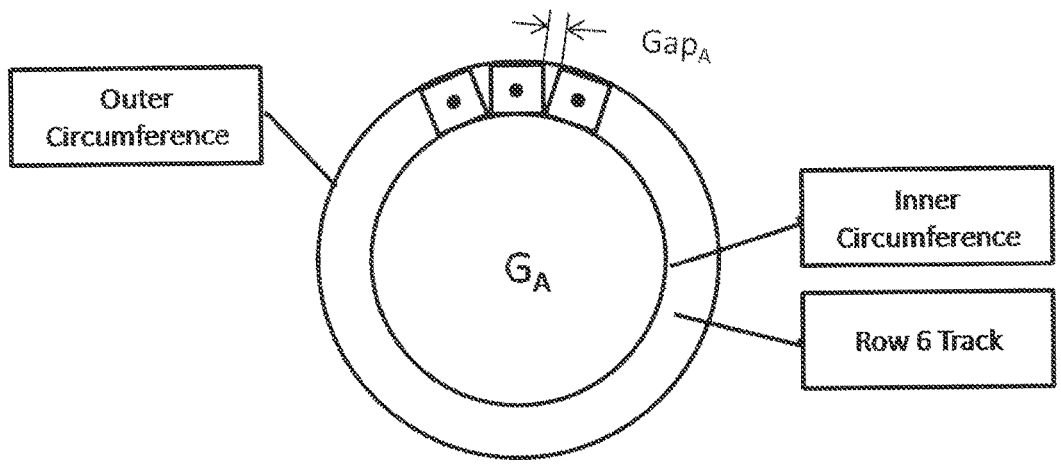
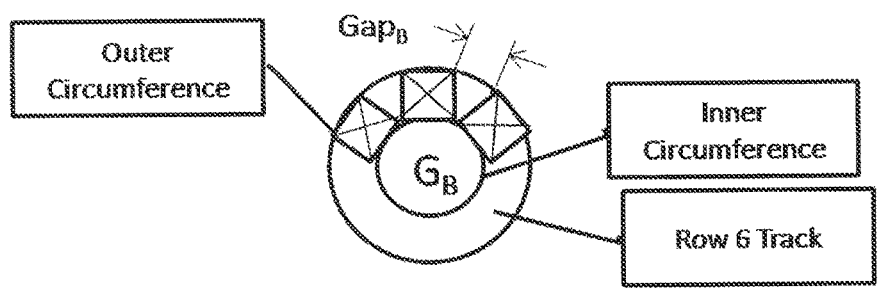
Row Set 6
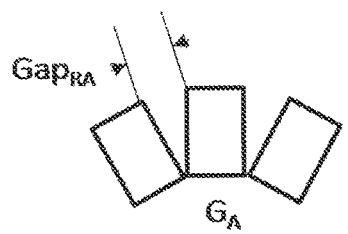
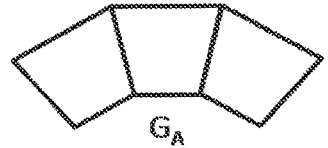
$Gap_{IA} = 0$
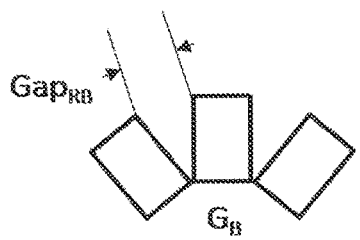
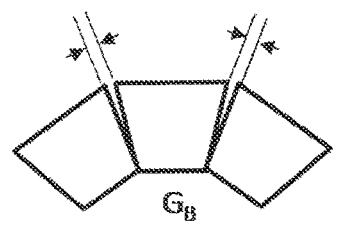
$Gap_{RA} > Gap_{RB}$
Rectangular Teeth
$Gap_{TB} = Gap_{RB} - Gap_{RA}$
Trapezoidal Teeth
FIG. 24

FIG. 28

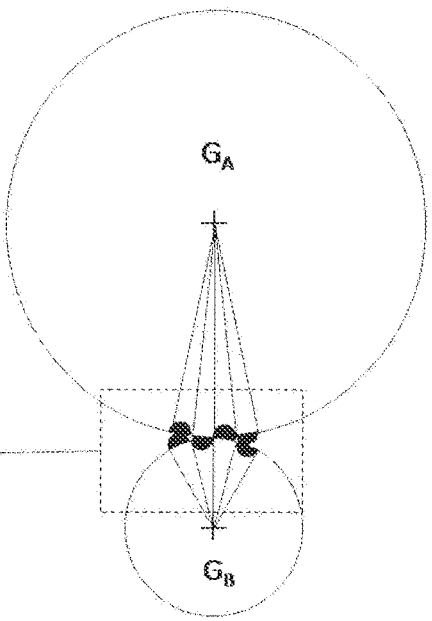
Row Set – Partial Side View
FIG 29: (a)
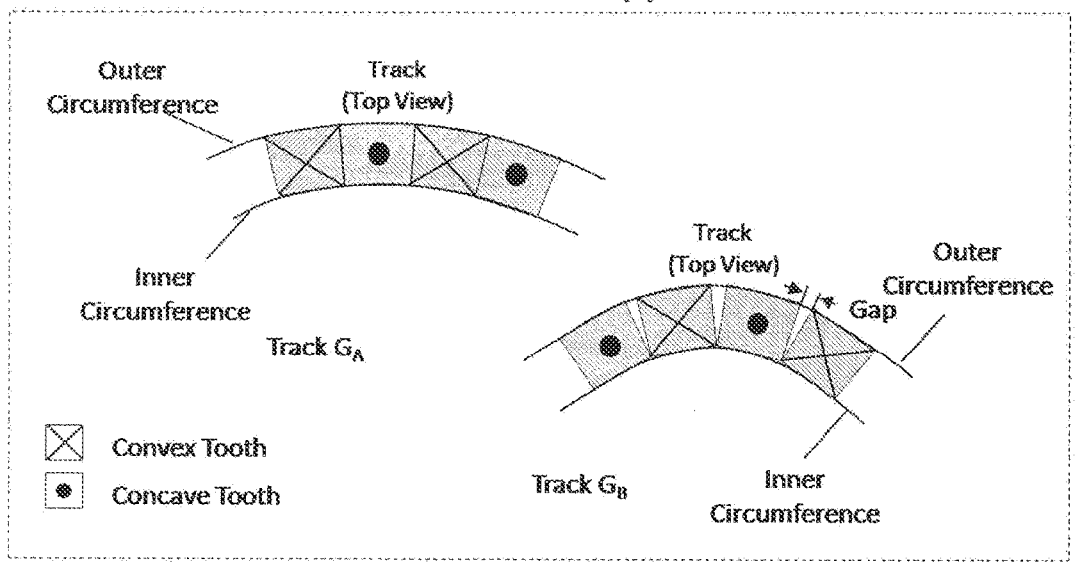
Row Set – Partial Top View
FIG 29: (b)

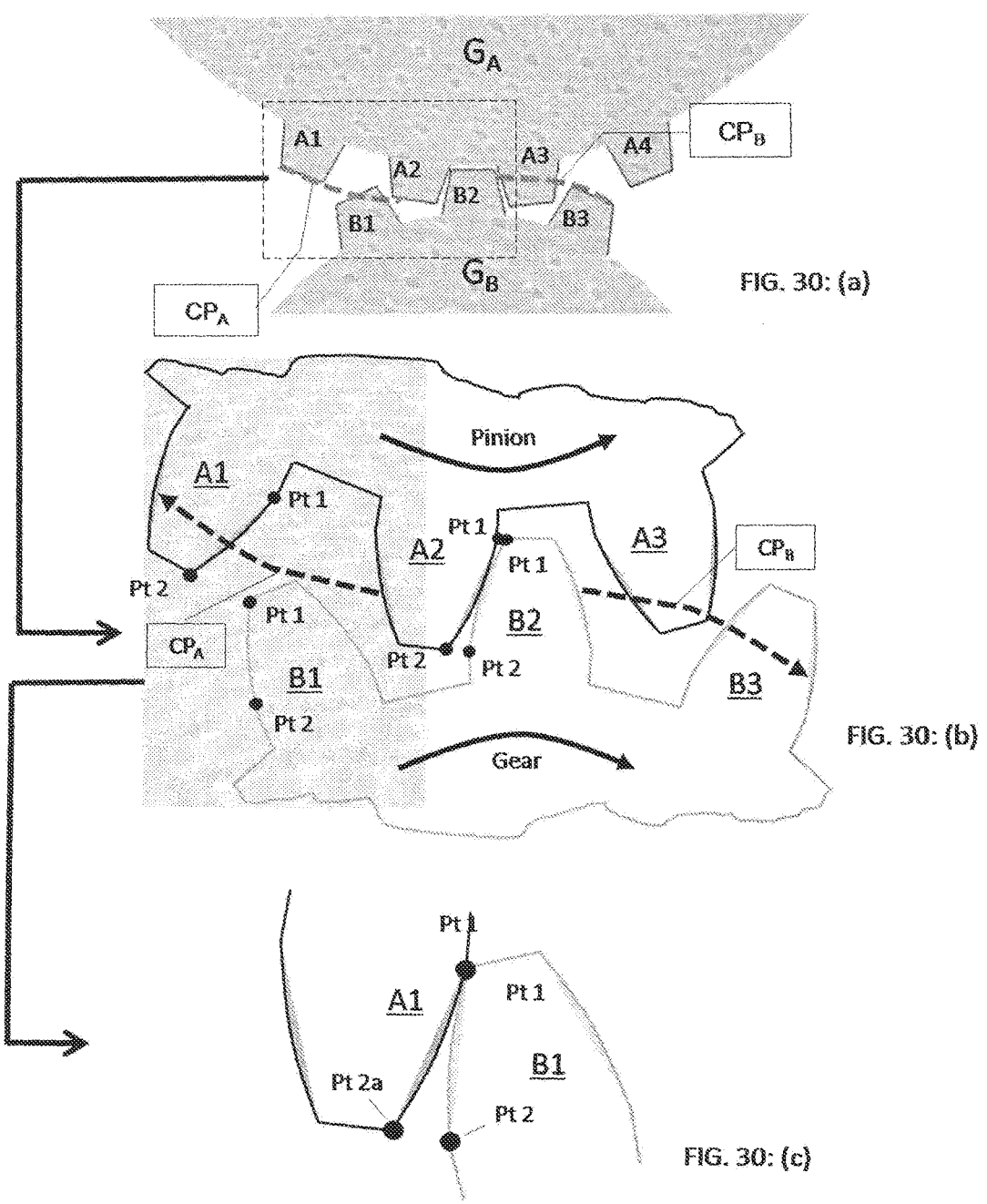
FIG. 30: (a)
FIG. 30: (b)
FIG. 30: (c)

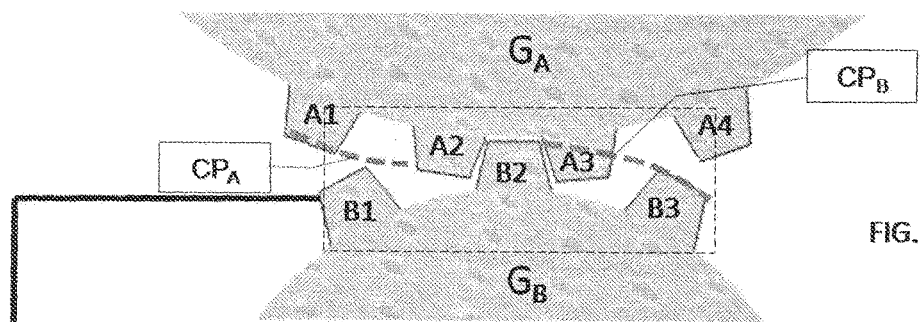
FIG. 31: (a)
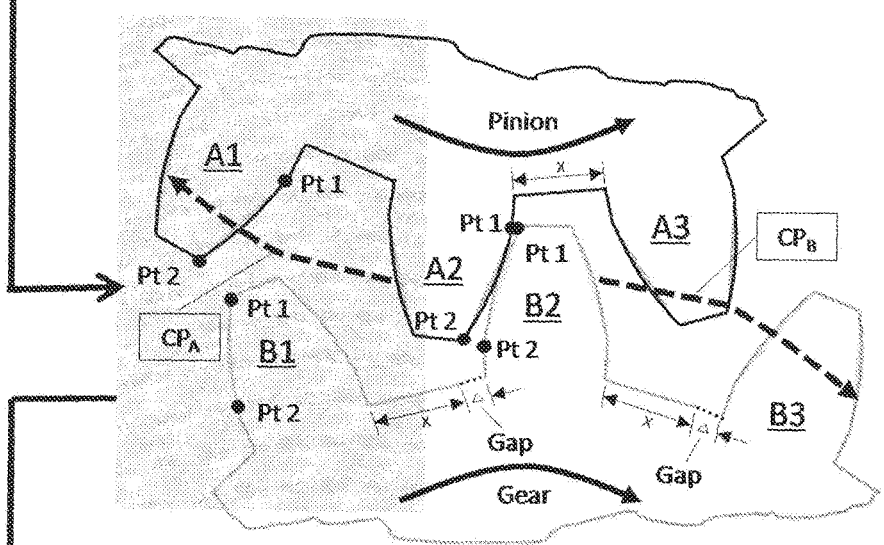
FIG. 31: (b)
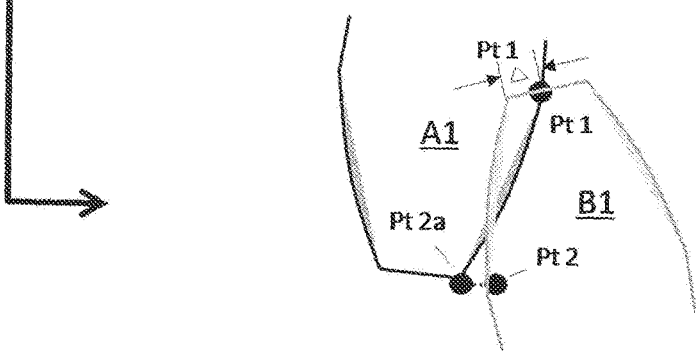
FIG. 31: (c)

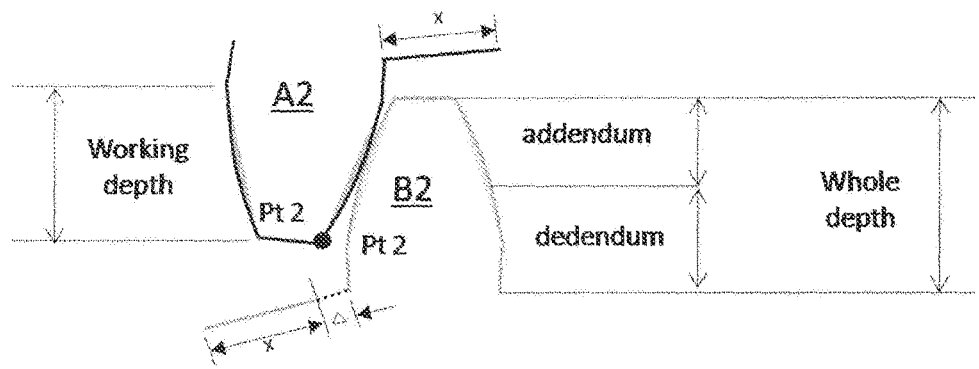
FIG. 32: (a)
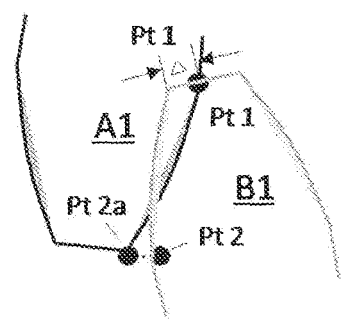
FIG. 32: (b)
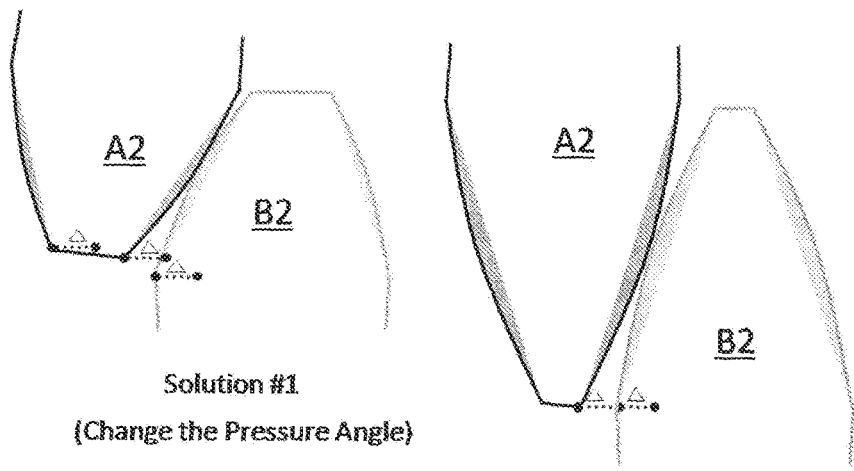
Solution #1
(Change the Pressure Angle)
FIG. 32: (c)
Solution #2
(Increase the Working Depth)
FIG. 32: (d)

Universal Joint
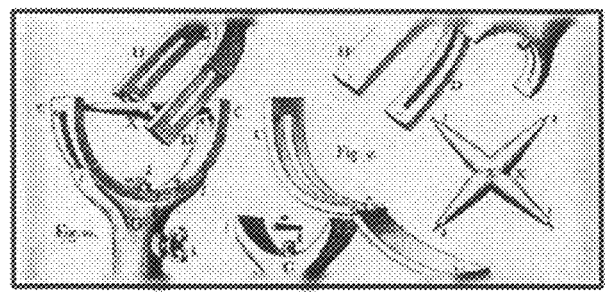
PRIOR ART
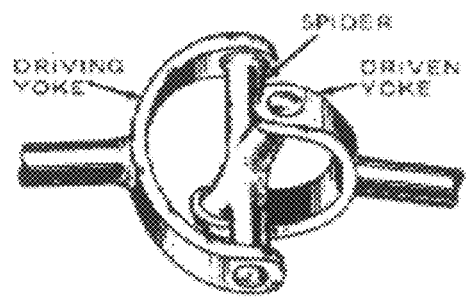
FIG. 39

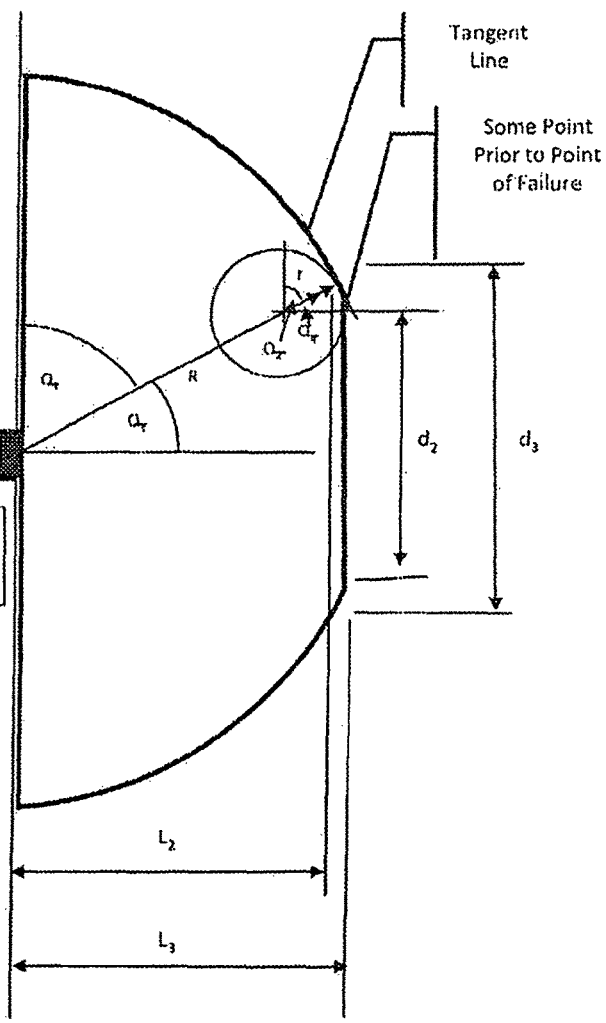
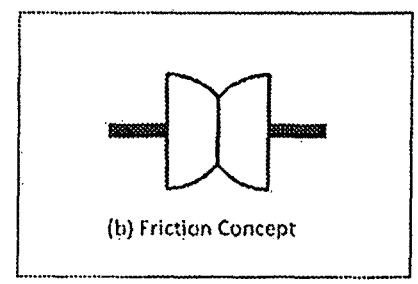
FIG. 52(b)
FIG. 52(a)

| Degrees | Radians | $X_1$ $X_1 = 2*\cos\Theta_1$ | $Y_1$ $Y_1 = 2*\sin\Theta$ | $X_2$ $X_2 = (1-Y_1^2)^{1/2}$ | $X_3$ $X_3 = 3 - (X_1 + X_2)$ |
|---|---|---|---|---|---|
| 0 | 0.000 | 2.0 | 0.0 | 1.000 | 0.000 |
| 1 | 0.017 | 2.0 | 0.0 | 0.999 | 0.001 |
| 2 | 0.035 | 2.0 | 0.1 | 0.998 | 0.004 |
| 3 | 0.052 | 2.0 | 0.1 | 0.995 | 0.008 |
| 4 | 0.070 | 2.0 | 0.1 | 0.990 | 0.015 |
| 5 | 0.087 | 2.0 | 0.2 | 0.985 | 0.023 |
| 6 | 0.105 | 2.0 | 0.2 | 0.978 | 0.033 |
| 7 | 0.122 | 2.0 | 0.2 | 0.970 | 0.045 |
| 8 | 0.140 | 2.0 | 0.3 | 0.960 | 0.059 |
| 9 | 0.157 | 2.0 | 0.3 | 0.950 | 0.075 |
| 10 | 0.175 | 2.0 | 0.3 | 0.938 | 0.093 |
| 11 | 0.192 | 2.0 | 0.4 | 0.924 | 0.112 |
| 12 | 0.209 | 2.0 | 0.4 | 0.909 | 0.134 |
| 13 | 0.227 | 1.9 | 0.4 | 0.893 | 0.158 |
| 14 | 0.244 | 1.9 | 0.5 | 0.875 | 0.184 |
| 15 | 0.262 | 1.9 | 0.5 | 0.856 | 0.213 |
| 16 | 0.279 | 1.9 | 0.6 | 0.834 | 0.243 |
| 17 | 0.297 | 1.9 | 0.6 | 0.811 | 0.276 |
| 18 | 0.314 | 1.9 | 0.6 | 0.786 | 0.312 |
| 19 | 0.332 | 1.9 | 0.7 | 0.759 | 0.350 |
| 20 | 0.349 | 1.9 | 0.7 | 0.729 | 0.391 |
| 21 | 0.367 | 1.9 | 0.7 | 0.697 | 0.435 |
| 22 | 0.384 | 1.9 | 0.7 | 0.662 | 0.483 |
| 23 | 0.401 | 1.8 | 0.8 | 0.624 | 0.535 |
| 24 | 0.419 | 1.8 | 0.8 | 0.582 | 0.591 |
| 25 | 0.436 | 1.8 | 0.8 | 0.534 | 0.653 |
| 26 | 0.454 | 1.8 | 0.9 | 0.481 | 0.721 |
| 26.58 | 0.464 | 1.8 | 0.9 | 0.446 | 0.765 |

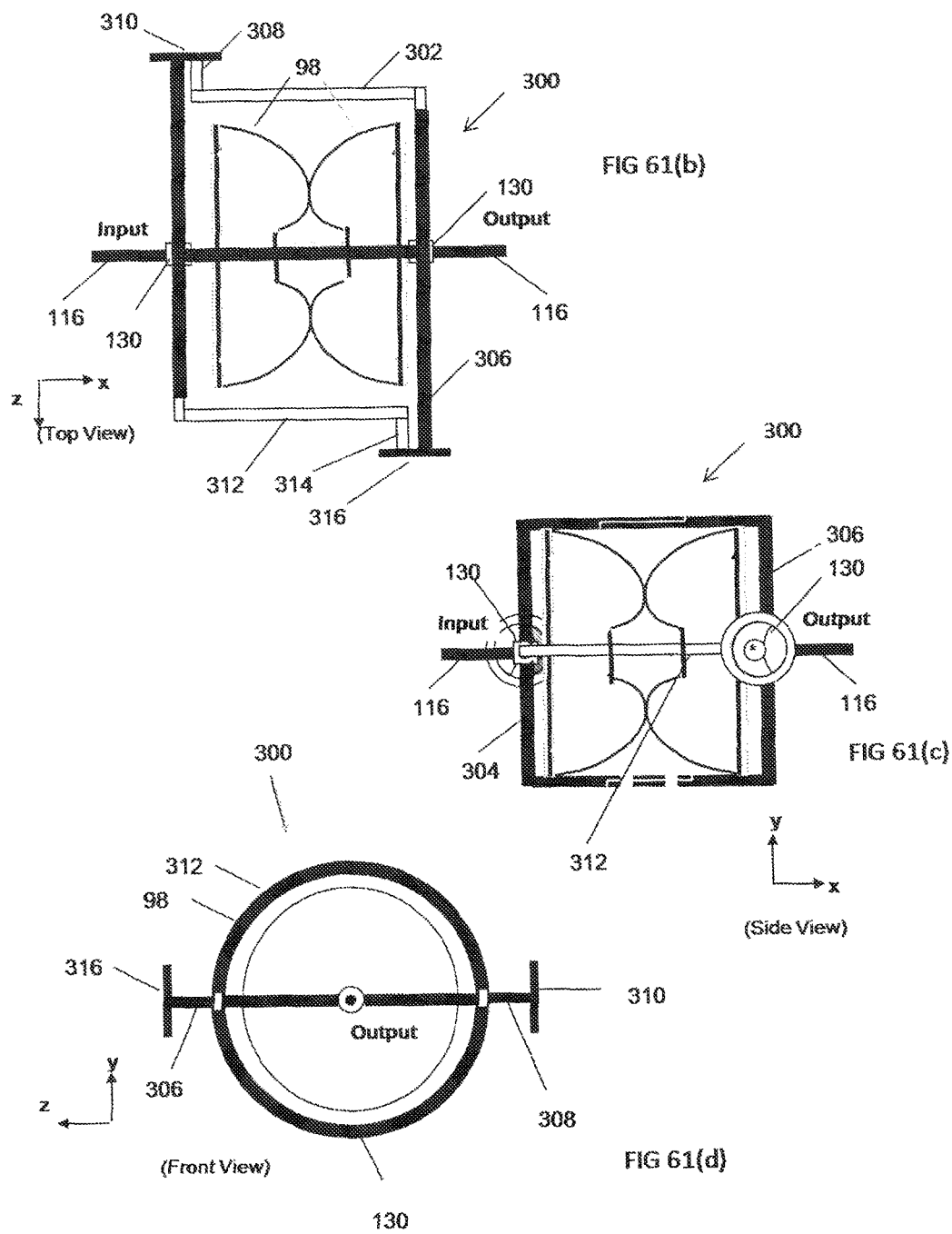

(Top View)

(Assembly Drawing)

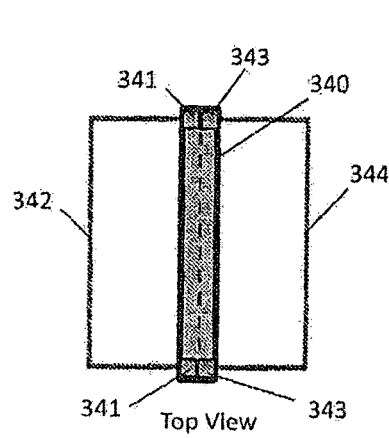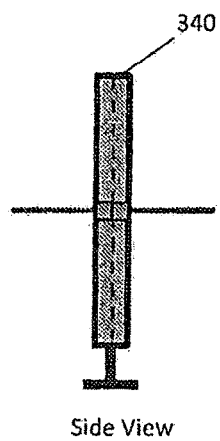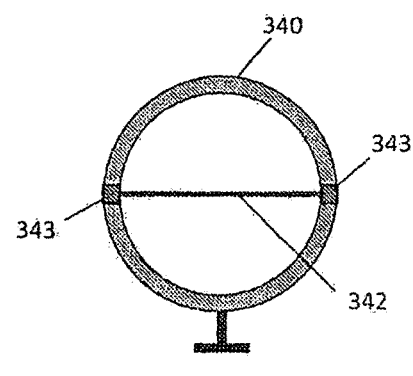
FIG. 67(a)   FIG. 67(b)   FIG. 67(c)
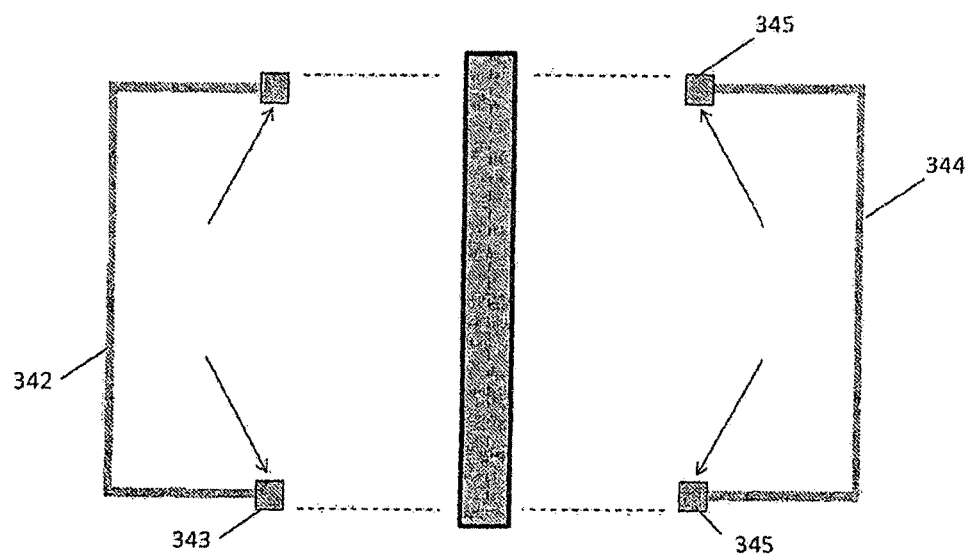
FIG. 67(d)

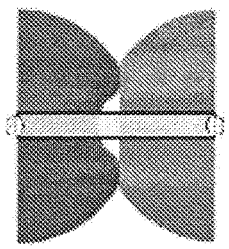
Links – Equal Spacing
Links – Unequal Spacing
FIG. 68

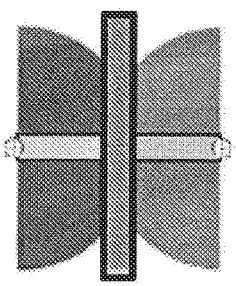
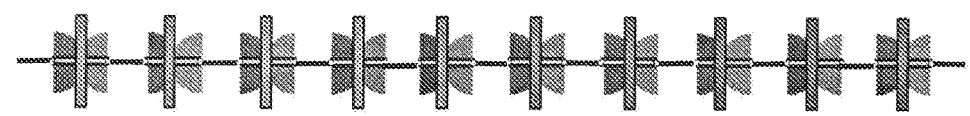
Links – Equal Spacing
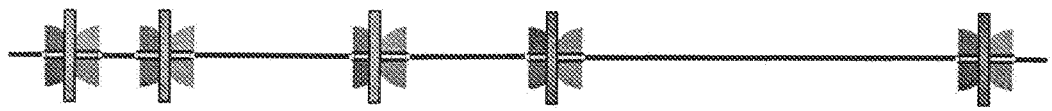
Links – Unequal Spacing
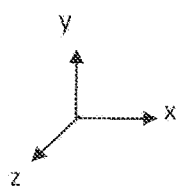
FIG. 69

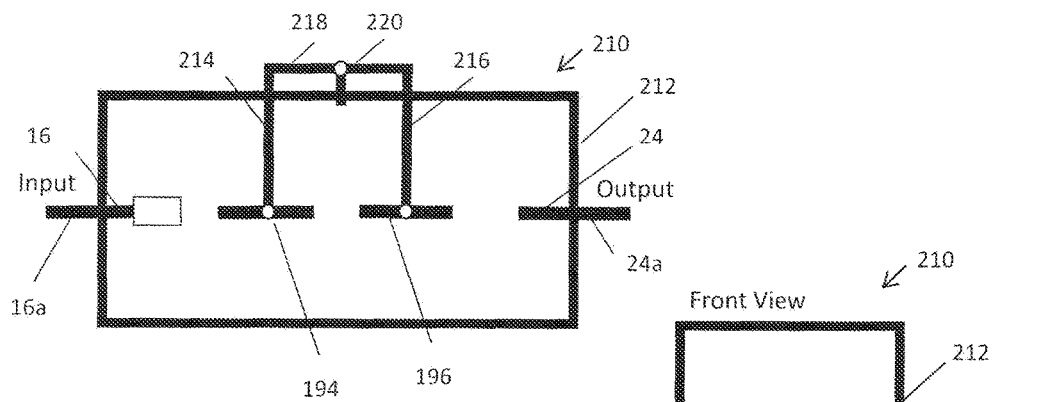
FIG. 97
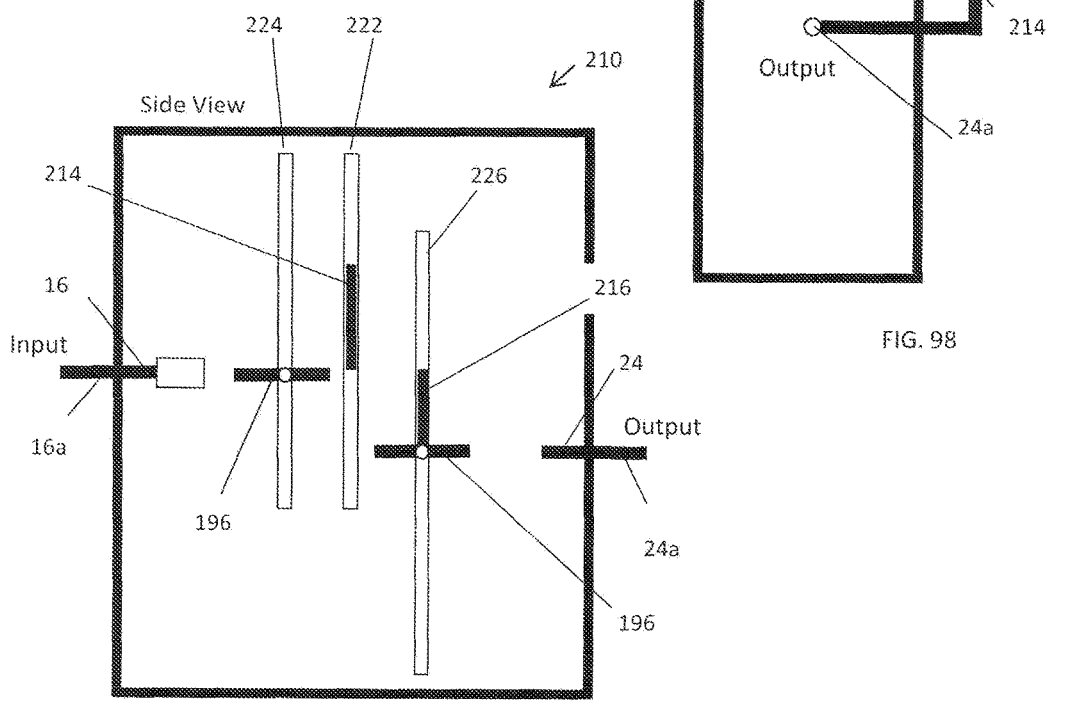
FIG. 98
FIG. 99

Side

Back

Side

Bottom

Top View

Front View

SideView

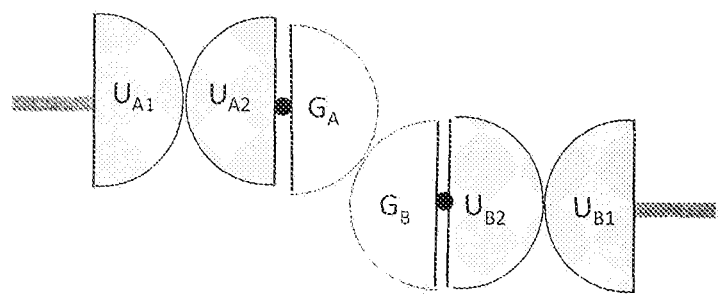
Simple Gear Head CVT
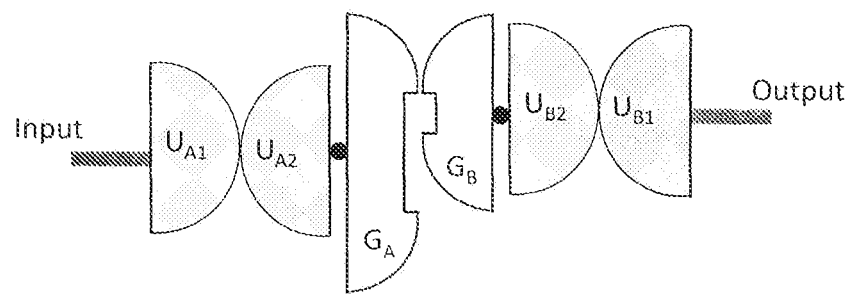
Split Gear Head CVT
FIG. 111

CURVILINEAR GEAR AND METHOD

CROSS-REFERENCE TO RELATED APPLICATIONS

This is a continuation-in-part of U.S. application Ser. No. 12/310,830 filed Mar. 9, 2009, which is a national stage application of International Application No. PCT/US2007/019474 filed Sep. 7, 2007, which claims priority to Provisional Application Ser. No. 60/842,724 filed Sep. 7, 2006, the contents all of which are incorporated in their entirety herein by reference.

BACKGROUND OF THE INVENTION

The disclosure relates to mechanical gears and methods of using the gears for a wide variety of applications.

DESCRIPTION OF ART

Gears, which can be described as toothed wheels, cylinders, or other machine elements that mesh with other toothed elements to transmit motion, or to change speed or direction, come in a wide variety of shapes and configurations. When two or more gears interact, the torque and the angular speed associated with an input gear are usually different than those produced by an output gear. This difference in torque and speed is a function of the difference in the radius of each gear.

The radius of a gear is measured from the gear axis of rotation to the point where one gear physically interacts with another. This radius is referred to as the "Lever Arm" of the gear as shown in FIG. 1. Referring to FIG. 2, the head of a gear often is geometrically circular with teeth formed or embedded on an outer [or inner] surface of the gear. In low torque applications, the toothed wheel can be replaced with a friction surface.

Gears usually are assembled in pairs. An input gear provides a torque and an angular speed along its axis of rotation that produces a force and a surface speed at the point of interaction of the gears. This force and surface speed is transferred to an output gear which transforms the force into a new torque and a new angular speed that may differ from that of the input gear. Two examples of this fundamental gear concept are shown in FIG. 3. The system on the left is a spur gear. The system on the right is a bevel gear in which the gears each occupy planes perpendicular to the other.

As stated, there are many different types of gears. The gear shown in FIG. 2 is known as a spur gear. A spur gear has teeth radially arrayed on the rim of the gear parallel to its axis of rotation. Other types of gears have been developed and improved over time to support specific applications. For example, when accuracy is important, a worm gear is often used. A bevel gear, such as that shown in FIG. 3, is often used to provide a change in direction. If a door is configured to open and close parallel to a wall to which it is attached, a rack and pinion gear arrangement is often used. Other examples are well known in the art.

Although different gear types may have different configurations, most, if not all, share the following characteristics:
1. Gears typically have a circular geometry. The rack portion of the rack and pinion gear is one exception to this rule.
2. Most gears operate by rotating about some fixed axis of rotation.
3. The speed on the surface of a gear head is a function of the angular velocity and the radius of the gear [the lever arm]. The point of interaction is the touch point where a gear delivers a force at a certain speed to some other object, often times another gear.
4. The torque/force relationship of a gear remains constant. This results from the fact that Torque=Force×Lever Arm.

Some have looked at alternative gear designs such as hemispherical gears, but have not resolved many problems that persist. For example, U.S. Pat. No. 6,467,374 discloses the use of one or more hemispherical gears to transmit torque and speed in a transmission application. The hemispherical gear of the '374 patent employs a mounting fork, the tines of which are attached to a bearing affixed to the gear at its large diameter so as to form pivot points to allow the gear head to pivot about a central axis. A double universal joint or other constant speed device such as a flexible shaft are attached to the gear head at some point along the central axis to allow the gear to rotate about the axis up to as much as 70° from the central axis. A control lever pivotally attached to a point on the major diameter of the gear provides a means to control the gear's pivot angle relative to the central axis.

At least eight problems can readily be identified with respect to current gear system designs. First, gear tooth concepts for curvilinear gears have been considered, but not successfully implemented. I have devised a spline concept to solve this problem. Second, conventional gears typically deal with line loads whereas curvilinear gears, like helical gears, deal with point loads. My curvilinear gear concept addresses the problems associated with point loads.

Third, the use of splines has up to now been limited to linear surfaces. I have combined spline technology with curvilinear gear heads to achieve superior torque performance. Fourth, curvilinear gear sets are constructed from same-size curvilinear gears. These gear head arrangements limit gear ratio ranges. Fifth, in prior art gear systems, arc length does not remain constant as arc chord length changes. I have devised gear heads in which the arc length remains constant as the chord length changes, which produces improvements as disclosed herein.

Sixth, when the moment arm length goes to 0°, a problem arises with gear interaction. I have devised a no gap gear configuration to address this as disclosed herein. Seventh, both curvilinear gear systems and U joint systems have limitations. I have devised a combination curvilinear gear/U joint system that forms a continuous variable transmission (CVT) that imparts superior performance characteristics with fewer working parts. And eighth, gear systems, in general, have gear ratio and functional limitations. I have devised a set of linked curvilinear gear sets, curvilinear U joints and CVT's that greatly improve upon the prior limitations of conventional gear systems.

Although the curvilinear gear systems disclosed herein are directed to gear and transmission systems, the technology may advantageously be used in other industries such as transportation, heavy equipment, mining and drilling, agriculture, and aerospace, to name but a few.

This disclosure addresses all major problems including the point load problem. Use of curvilinear gears requires dealing with point loads without losing performance. This disclosure describes how to convert point loads into manageable distributed loads.

What is needed and what I have developed is a gear system that has:
An improved range of torque and angular velocity;
An improved method of addressing point loads;

An improved method to assure a more positive interaction between the two gear heads that make up a gear set.

SUMMARY OF INVENTION

The disclosure covers a curvilinear gear that permits the dimension of the lever arm of a gear to vary continuously and/or intermittently between two points. The gear's geometry allows the point of interaction between two curvilinear gears to continuously change on the same gear head. In this manner, multiple lever arms are supported on one gear head. This novel concept also permits a surface of a gear head to be formed as any linear/non-linear shape, including elliptical and hemispherical shapes.

In one aspect of the disclosure, the gear comprises a hemispherical gear head with a friction surface or a surface substantially covered with gear teeth. The gear interacts with another gear having similar surface features to produce an infinite number of gear ratios between two limits. With respect to embodiments having gear teeth, the curvilinear gear teeth can conform to geometric shapes unlike the shape of conventional gear teeth.

In another aspect of the disclosure, two gear heads can be positioned and used to improve upon, and replace, conventional universal joint systems. The primary improvement over the conventional technology is that the torque and the angular velocity can be changed between two points in three dimensional space with minimal or no heat and vibration problems.

In a further aspect of the disclosure, two curvilinear gear heads can be incorporated into a gear system for a power transmission device to continuously and variably change the gear ratio between the two gear heads, thereby reducing the number of gears needed in the power transmission device. The power transmission embodiment demonstrates the compatibility of the curvilinear gear and curvilinear U Joint concepts disclosed herein.

In a yet further aspect of the invention, a physical interlocking mechanism for a curvilinear gear set is disclosed that allows a continuously variable transmission to be suitable for high torque applications. These and other aspects of the invention will be apparent from a reading of the following detailed description along with a review of the appended drawings.

BRIEF DESCRIPTION OF DRAWINGS

FIG. 3 shows perspective views of prior art gear systems.

FIG. 9 is a sequential representation of the geometric construction of a curvilinear gear head with each sequential step in the construction designated FIG. 9(a) through 9(c) according to the embodiment shown in FIG. 10.

FIG. 13 shows conventional gear properties of prior art gears with respect to four different configurations designated FIGS. 13(a) through 13(d).

FIG. 14 shows curvilinear gear properties according to at least one embodiment of the disclosure with respect to four different configurations designated FIGS. 14(a) through 14(d).

FIG. 24 shows gaps formed between adjacent teeth due to change in circumference on a curvilinear gear head according to one embodiment of the disclosure.

FIG. 28 shows a row set tooth gap size matrix according to one embodiment of the disclosure.

FIG. 29 includes two views designated as FIG. 29(a) and FIG. 29(b) in which FIG. 29a shows a partial side view of a row set and FIG. 29(b) shows a partial top view of a row set of teeth according to one embodiment of the disclosure.

FIG. 30 includes three views designated as FIG. 30(a), FIG. 30(b) and FIG. 30(c) in which FIG. 30(a) shows gear teeth interactions when no gap exists. FIG. 30(b) shows tooth interaction under such a condition, and FIG. 30(c) more closely demonstrates that teeth interact correctly according to one embodiment of the disclosure.

FIG. 31 includes three views designated as FIG. 31(a), FIG. 31(b) and FIG. 31(c) in which FIG. 31(a) illustrates the gap issue of interacting curvilinear gear teeth. FIG. 31(b) shows tooth interaction under such a condition, and FIG. 31(c) more closely demonstrates that teeth do not interact correctly according to one embodiment of the disclosure.

FIG. 32 includes four views designated as FIG. 32(a), FIG. 32(b), FIG. 32(c) and FIG. 32(d) in which FIG. 32(a) shows the attributes of gear teeth; FIG. 32(b) illustrates problems with curvilinear teeth interaction; FIG. 32(c) illustrates one solution to eliminate the gap; and FIG. 32(d) illustrates an alternation solution to eliminate the gap according to two embodiments of the disclosure.

FIG. 34 includes two views designated as FIG. 34(a) and FIG. 34(b) in which FIG. 34(a) shows multiple views of a tooth crown and FIG. 34(b) shows alternate tooth crown variations according to several embodiments of the disclosure.

FIG. 39 shows a prior art universal joint.

FIG. 52a shows a side sectional view of a curvilinear gear head used in a friction-based curvilinear U Joint system according to another embodiment of the disclosure.

FIG. 52b shows a side sectional view of a curvilinear U-joint system according to the embodiment shown in FIG. 52a.

FIG. 53 shows a concave gear head according to one embodiment of the disclosure.

FIG. 53b shows a concave gear head and axle assembly according to the gear head embodiment shown in FIG. 53a.

FIG. 58b shows a spline cross-section for the curvilinear U Joint shown in FIG. 58a.

FIG. 61C shows a side sectional view of a cam actuated curvilinear U Joint system with harness according to a further embodiment of the disclosure.

FIG. 61D shows a front sectional view of a cam actuated curvilinear U Joint system with harness according to a further embodiment of the disclosure.

FIG. 61H shows multiple views of a harness system for a cam actuated curvilinear U Joint system according to a further embodiment of the disclosure.

FIG. 67a is a top view of a 3-D curvilinear U Joint harness according to the embodiment shown in FIG. 66.

FIG. 67b is a side view of a 3-D curvilinear U Joint harness according to the embodiment shown in FIG. 66.

FIG. 67c is a front view of a 3-D curvilinear U Joint harness according to the embodiment shown in FIG. 66.

FIG. 67d is a top exploded view of the harness according to the embodiment shown in FIG. 66.

FIG. 68 shows a side sectional view of a 2-D curvilinear U Joint and two serially linked 2-D curvilinear U Joint configurations according to a further embodiment of the disclosure.

FIG. 69 shows a side sectional view of a 3-D curvilinear U Joint and two serially linked 3-D curvilinear U Joint configurations according to a yet further embodiment of the disclosure.

FIG. 96 shows a side sectional view of the curvilinear transmission shown in FIG. 89 with modified U Joint gear heads with the curvilinear pinion approaching 90° according to a further embodiment of the disclosure.

FIG. 97 shows a top view of a control system and an enclosure without gear heads for the curvilinear transmission shown in FIG. 89 according to one embodiment of the disclosure.

FIG. 98 shows a front elevational view of a control system and an enclosure without gear heads for the curvilinear transmission shown in FIG. 89 according to one embodiment of the disclosure.

FIG. 99 shows a side elevational view of a control system and an enclosure for the curvilinear transmission shown in FIG. 89 according to one embodiment of the disclosure.

FIG. 100 shows a side elevational view of a control system and an enclosure without gear heads for the curvilinear transmission shown in FIG. 89 according to one embodiment of the disclosure.

FIG. 101 shows a back view of an enclosure for the curvilinear transmission shown in FIG. 89 according to one embodiment of the disclosure.

FIG. 102 shows a side view of an input side of an enclosure for the curvilinear transmission shown in FIG. 89 according to one embodiment of the disclosure.

FIG. 103 shows a bottom view of an enclosure for the curvilinear transmission shown in FIG. 89 according to one embodiment of the disclosure.

FIG. 104 shows a top view of a control system for the curvilinear transmission shown in FIG. 89 according to one embodiment of the disclosure.

FIG. 105 shows a front view of a control system for the curvilinear transmission shown in FIG. 89 according to one embodiment of the disclosure.

FIG. 106 shows a side view of a control system for the curvilinear transmission shown in FIG. 89 according to one embodiment of the disclosure.

FIG. 107 shows a sectional view of a curvilinear transmission and an enclosure according to another embodiment of the disclosure.

Figure 108:
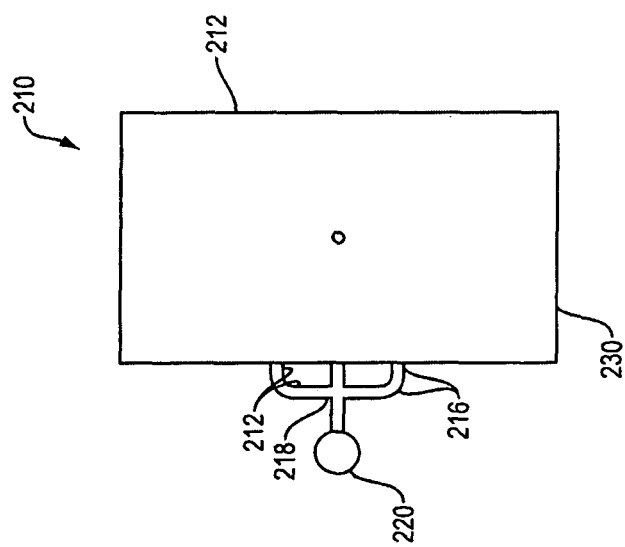

FIG. 108 shows a side elevational view of the output end of a curvilinear transmission enclosure according to one embodiment of the disclosure.

Figure 109:
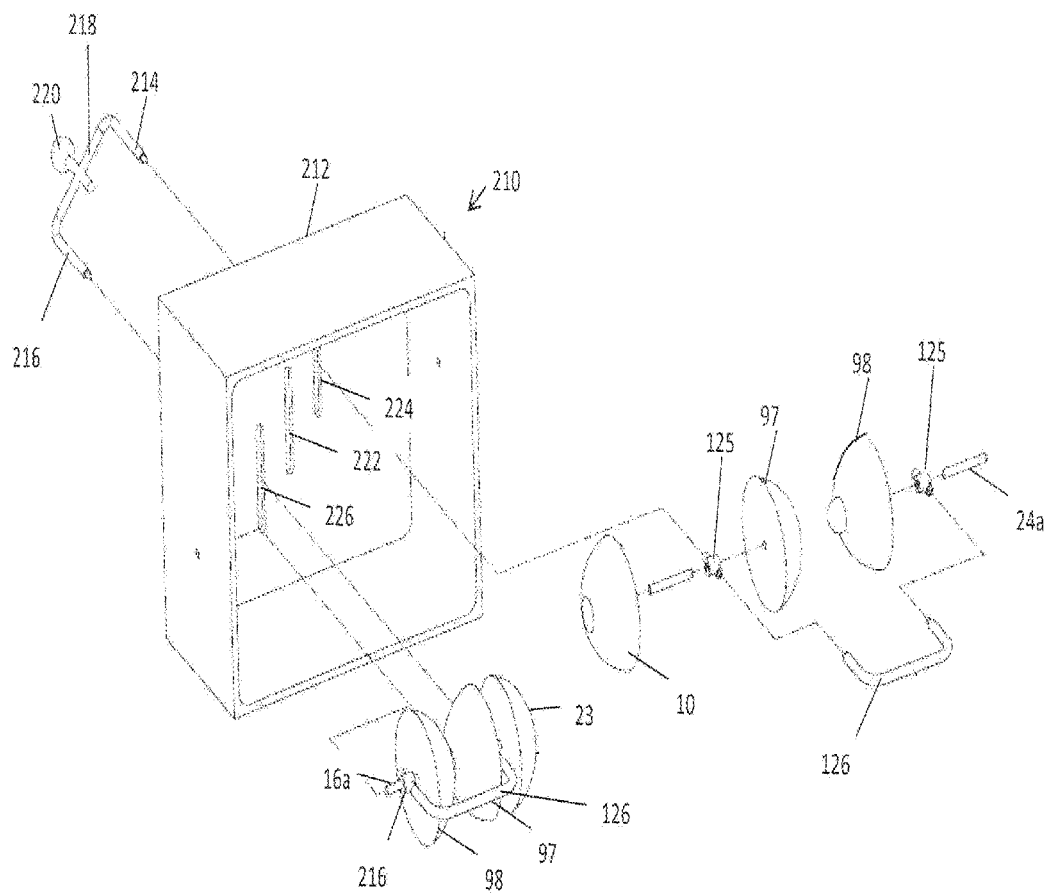

FIG. 109 is an exploded view of a curvilinear transmission and an enclosure according to another embodiment of the disclosure.

Figure 110:
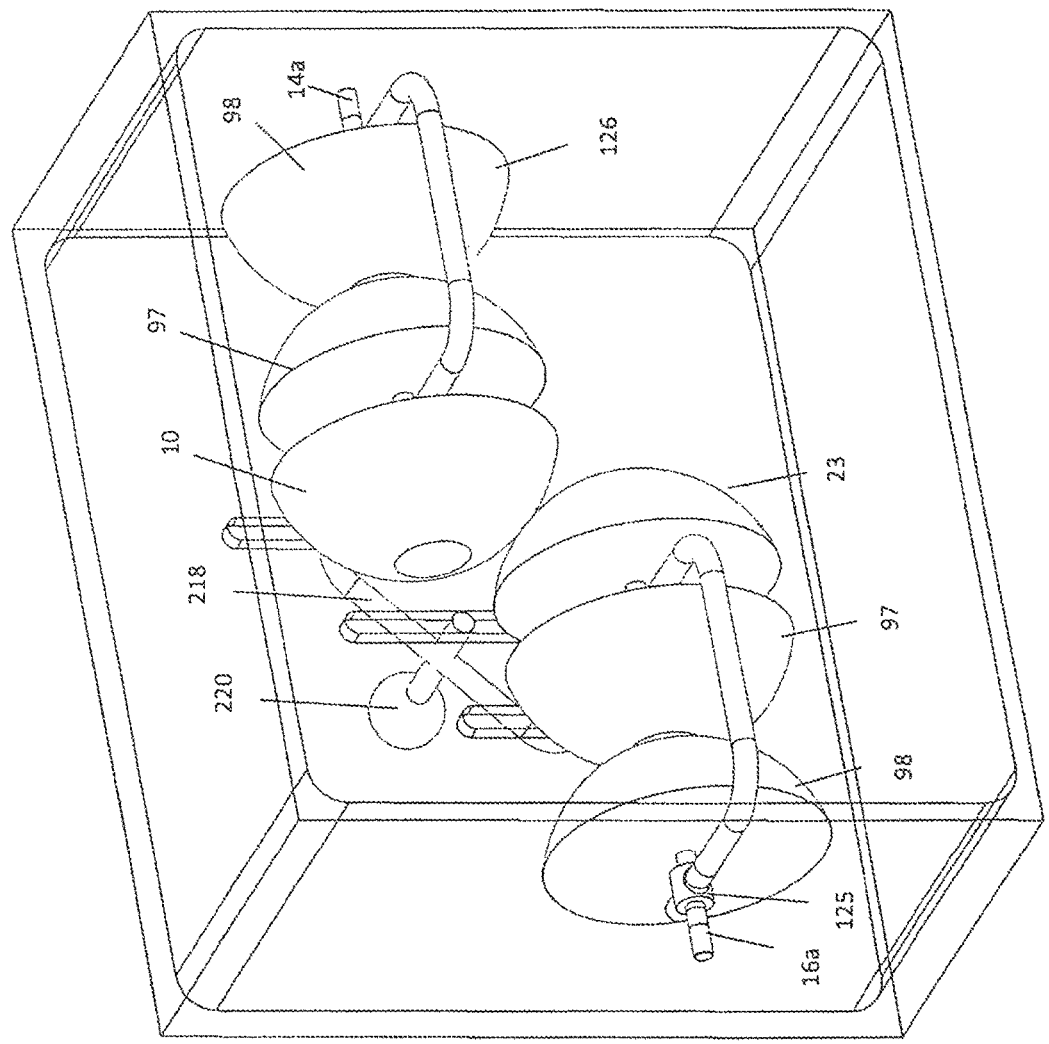

FIG. 110 is a solid model of a curvilinear transmission and an enclosure according to another embodiment of the disclosure.

FIG. 111 shows a simple gear head CVT vs split gear head CVT according to two embodiments of the disclosure.

Figure 112:
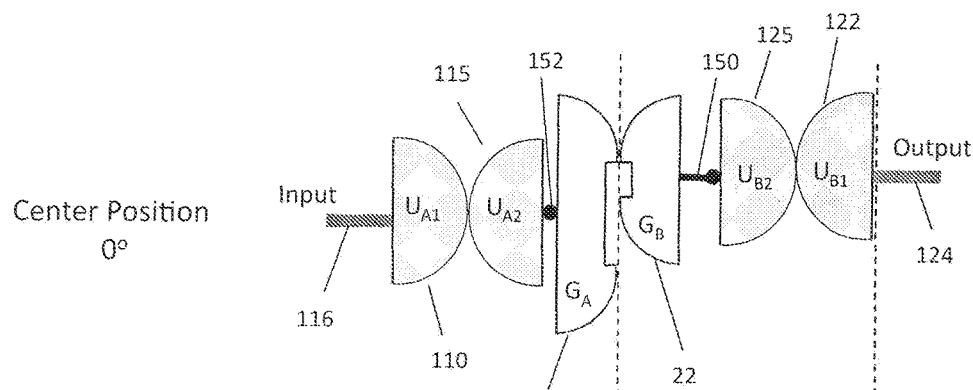

FIG. 112 is a center position view of a split gear head CVT according to another embodiment of the disclosure.

Figure 113:
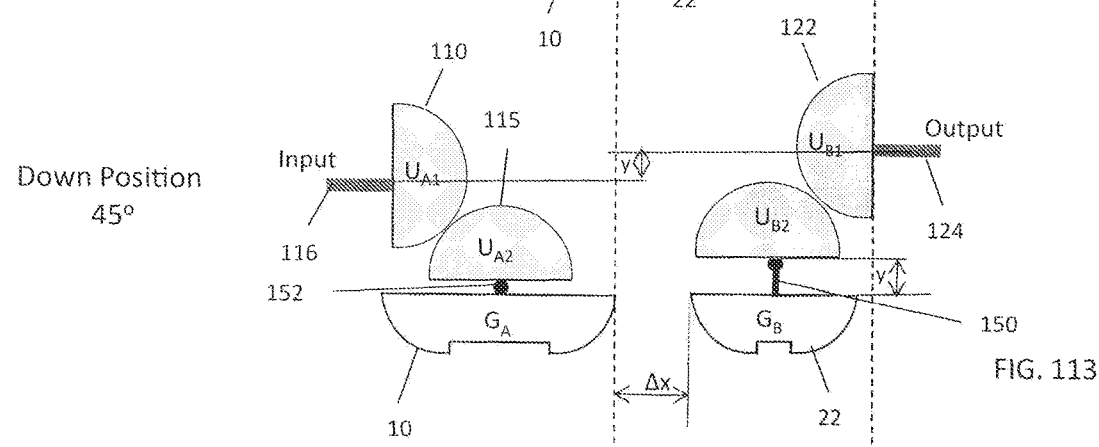

FIG. 113 is a view of gaps in the down position of a split gear head CVT according to another embodiment of the disclosure.

Figure 114:
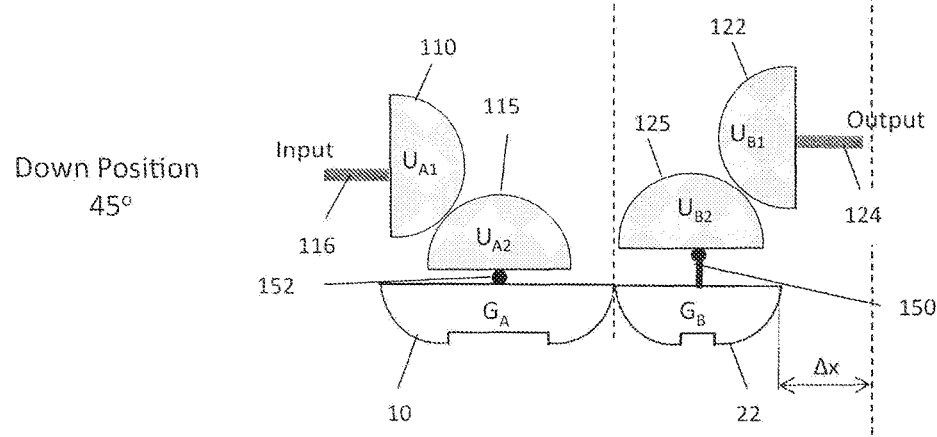

FIG. 114 is a view of gap resolution in the down position of a split gear head CVT according to another embodiment of the disclosure.

Figure 115:
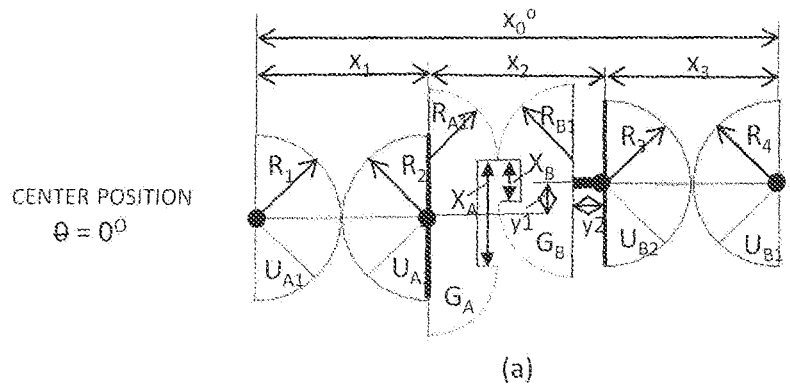

FIG. 115 shows a geometric view of a center position view of a split gear head CVT according to another embodiment of the disclosure.

Figure 116:
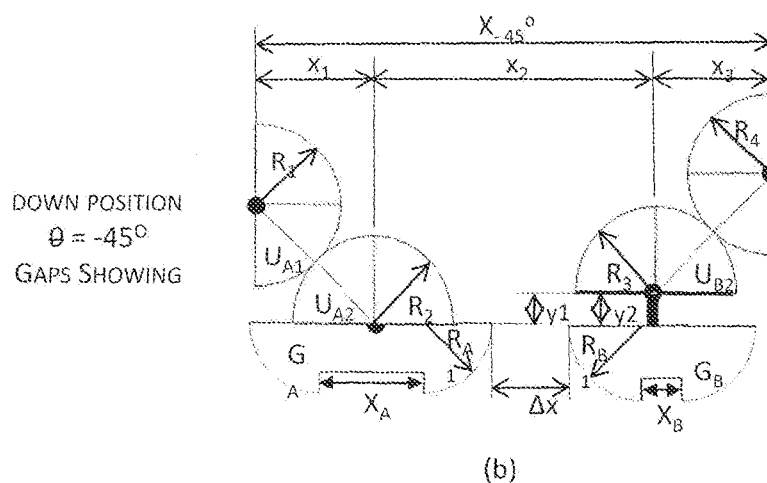

FIG. 116 is a geometric view of gap resolution in the down position of a split gear head CVT according to another embodiment of the disclosure.

Figure 117:
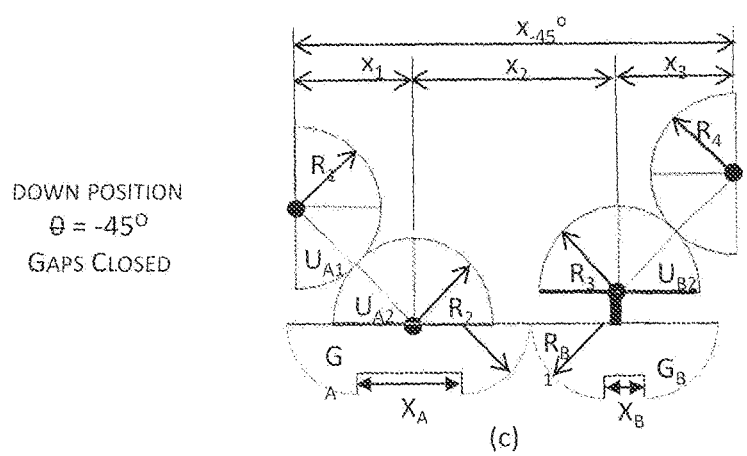

FIG. 117 is a geometric view of gap resolution in the down position of a split gear head CVT according to another embodiment of the disclosure.

Figure 118:
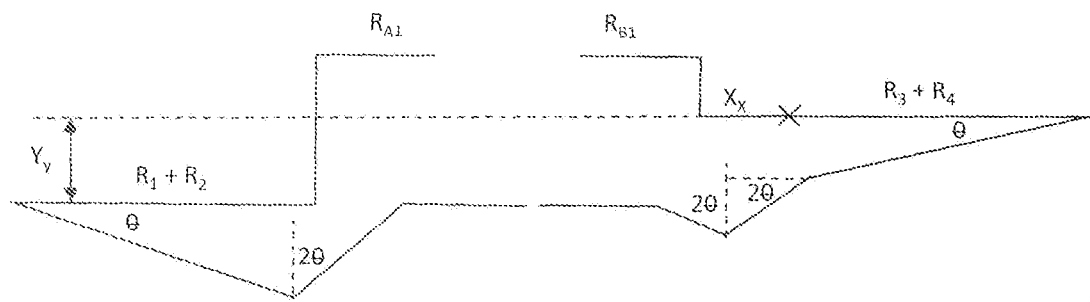

FIG. 118 shows information to be used in gap calculation according to another embodiment of the disclosure.

Figure 119:
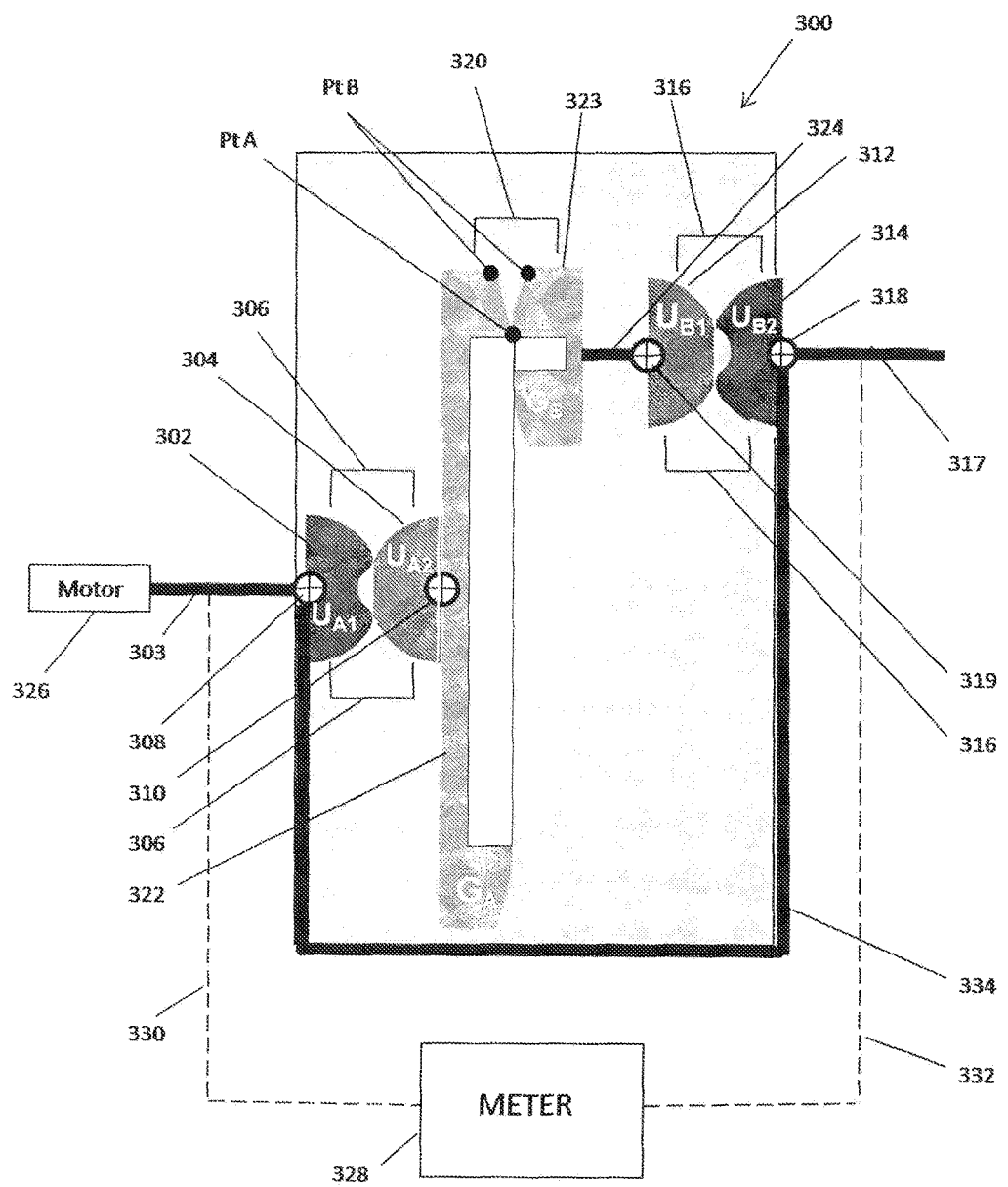

FIG. 119 is a split gear head prototype according to another embodiment of the disclosure.

Figures 120, 121:
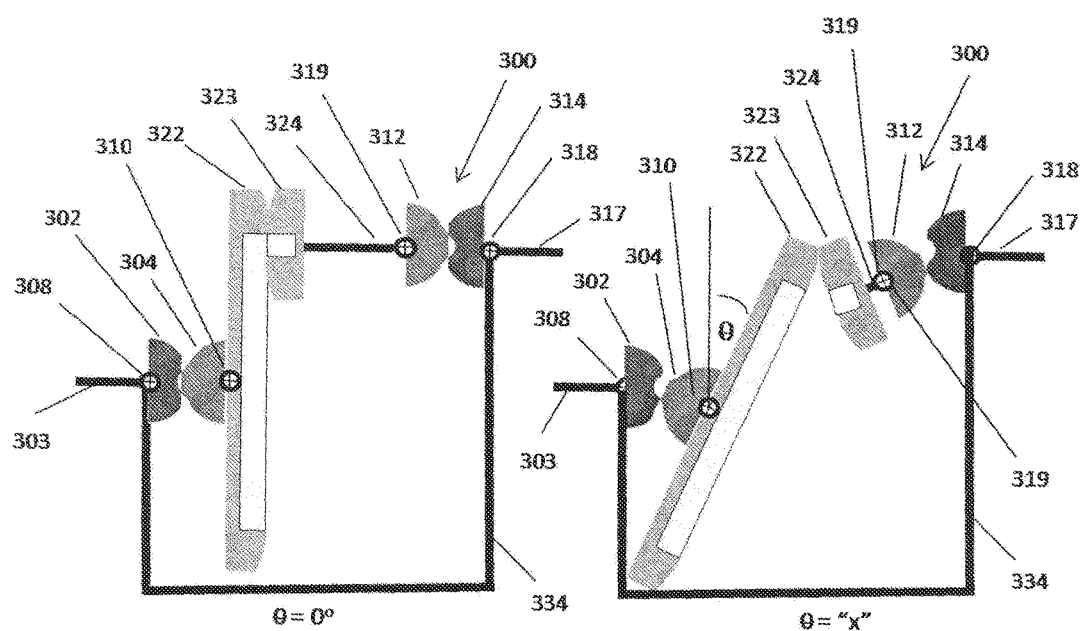

FIG. 120 is a split gear head operational concept in the 0° position using arc hear heads according to another embodiment of the disclosure.

FIG. 121 is a split gear head operational concept in the x° position using arc hear heads according to another embodiment of the disclosure.

Figure 122:
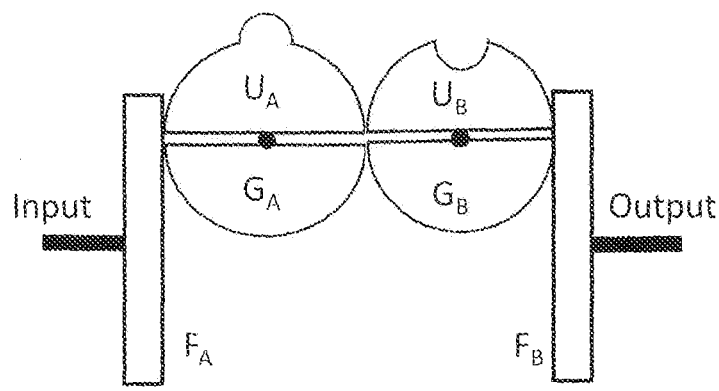

FIG. 122 shows an up position of a flat gear head CVT according to another embodiment of the disclosure.

Figure 123:
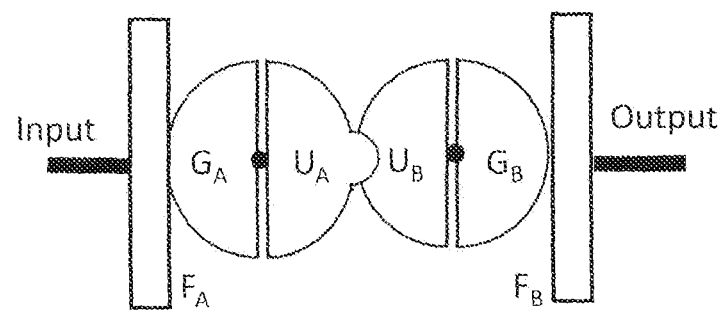

FIG. 123 shows a center position of a flat gear head CVT according to another embodiment of the disclosure.

Figure 124:
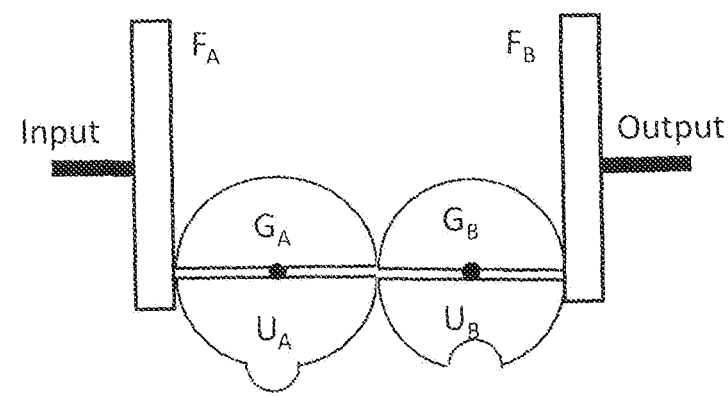

FIG. 124 shows a down position of a flat gear head CVT according to another embodiment of the disclosure.

Figure 125:
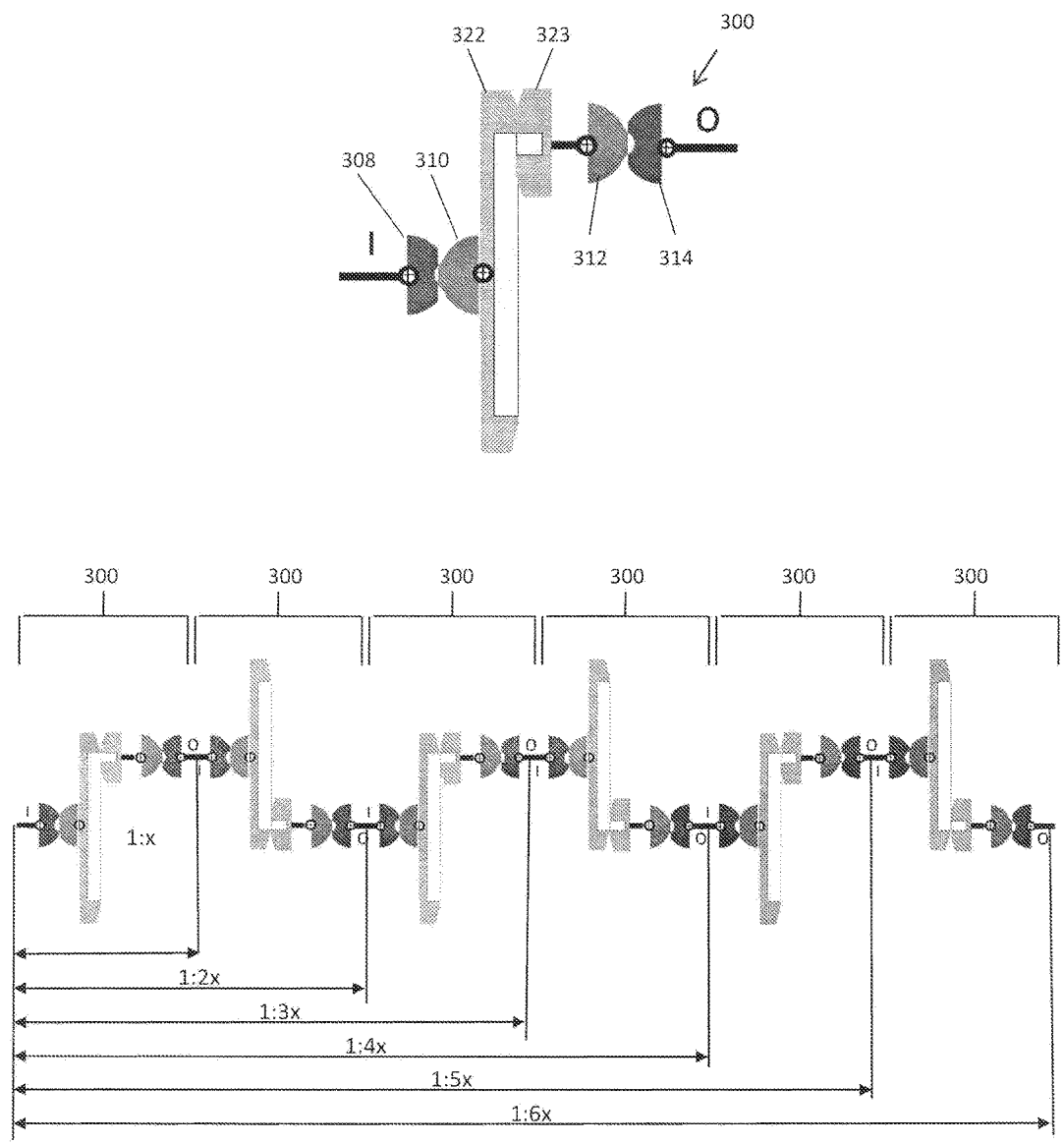

FIG. 125 shows a serial linking of CVTs and a single CVT unit according to a further embodiment of the disclosure.

DETAIL DESCRIPTION OF THE INVENTION

Figure 4:
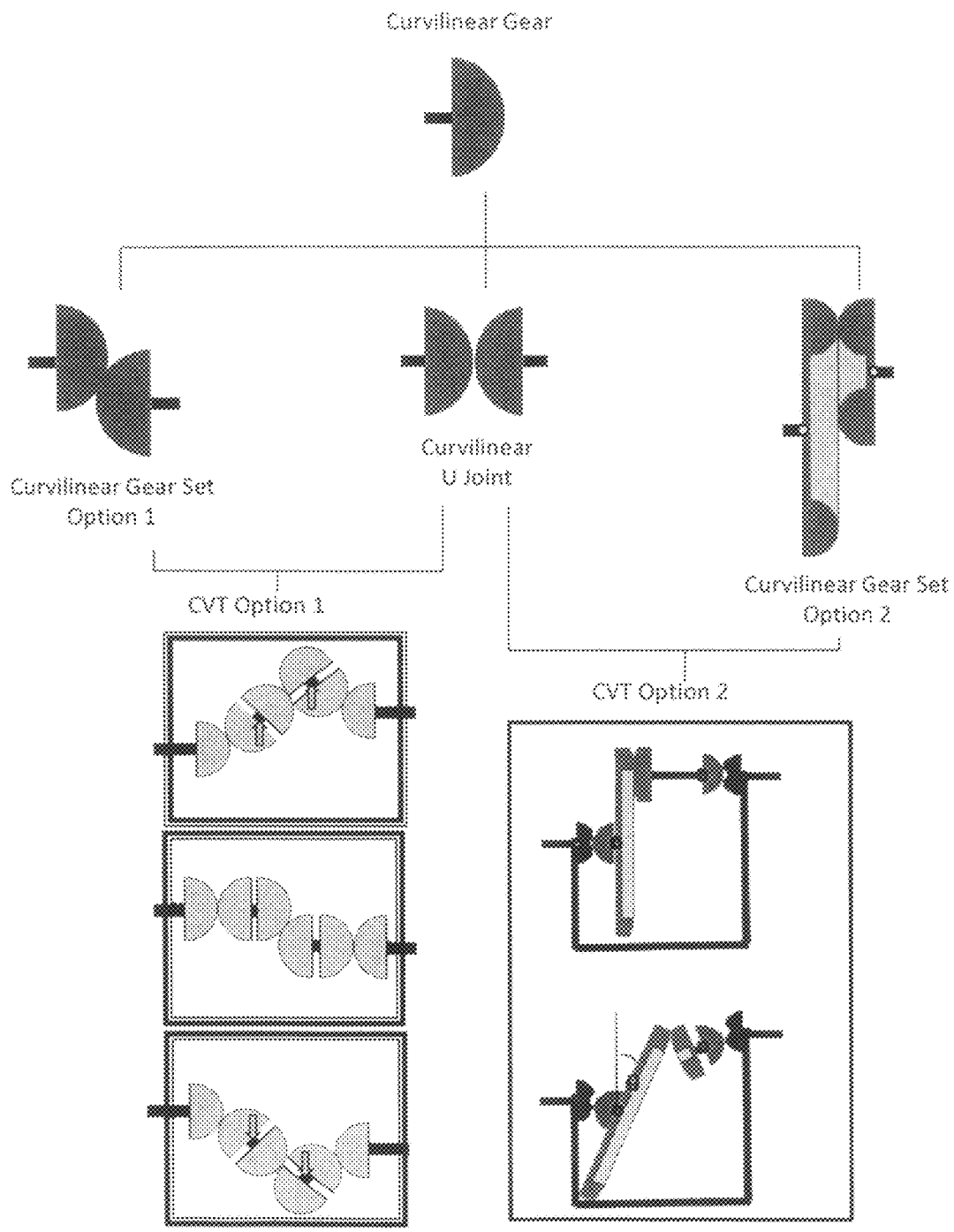
FIG. 4 shows curvilinear gear systems according to several embodiments of the disclosure.

Disclosed herein are improvements to a curvilinear gear and curvilinear gear systems. As shown in FIG. 4, illustrative embodiments of the invention include, but are not limited to, curvilinear gear combinations including substantially similarly sized, paired curvilinear gears and dissimilarly sized, paired curvilinear gears. Following the description of the curvilinear gear improvements, descriptions of curvilinear gear set applications and curvilinear universal joint systems (U Joint) will be disclosed.

Two curvilinear gear set embodiments, and three curvilinear U Joint embodiments are herein disclosed, for illustrative purposes and should not in any way be considered as limiting the scope of the appended claims. Further disclosure imparts how curvilinear gear sets and curvilinear U Joints can be combined to produce a continuously variable power train. Three embodiments of this new power train concept are introduced and described in detail for illustrative purposes.

1. Curvilinear Gear

Introduction of the curvilinear gear begins with a description of the gear head. This is followed by a description of how to combine two gear heads to form a gear set. An embodiment that demonstrates one approach to creating a direct drive gear set is then described including novel features and improved performance benefits of the novel designs.

1.1 Gear Head 1.1.1 Shape

Figure 5:
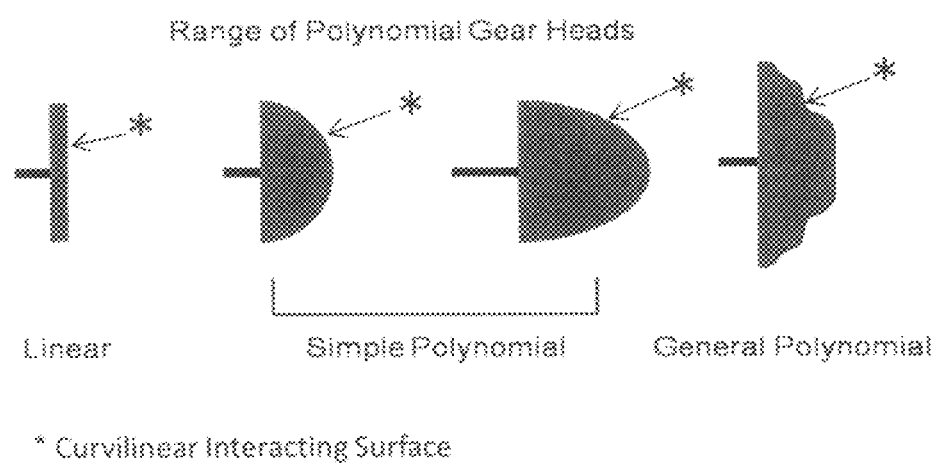
FIG. 5 shows curvilinear gear shapes according to several embodiments of the disclosure.

FIG. 5 shows an exemplary range of curvilinear gear head shapes. At one end of the spectrum is the linear curvilinear gear head. This gear head is a special case, because it resembles a spur gear. The difference between the two is that the interactive portion of a spur gear is on the inner or outer edge, while the interactive surface of a flat gear is on the front face of the gear. Simple polynomials like a circle and an ellipse represent a broad range of potential curvilinear gear head shapes. The general polynomial is considered to be the other extreme form that makes up the range of curvilinear gear head shapes.

A hemisphere is considered a simple polynomial shape. The hemispherical curvilinear gear head shown in FIG. 6 will be used as the illustrative embodiment for the disclosure. It should be understood that the description of a hemispherical curvilinear gear head does not limit the scope and coverage of the disclosure with respect to other curvilinear gear head choices. To the extent other gear head options depart from the general disclosure, such will be identified. Any polynomial shape could have been chosen, but this form is selected simply for ease of disclosure. As shown in FIG. 4, two forms of the curvilinear hemispherical gear head will be used to disclose the inventive features.

1.1.1.1 Simple Hemispherical Gear Head

Figure 6:
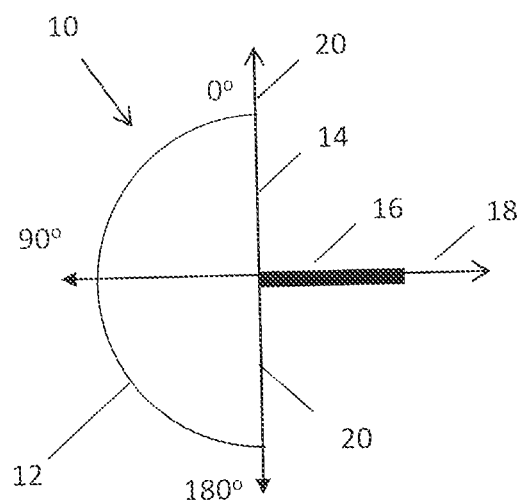
FIG. 6 is a sectional view of a hemispherical gear according to one embodiment of the disclosure.
Figure 8:
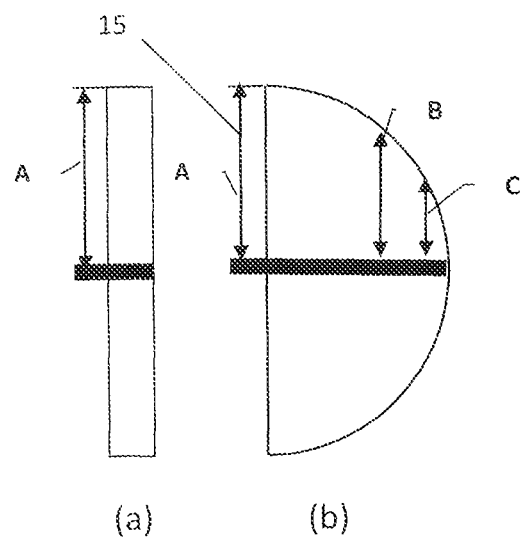
FIG. 8 is another diagrammatic representation in cross section of the comparative forces generated by a conventional prior art gear and a hemispherical gear.

One illustrative embodiment is a simple hemispherical gear head. As shown in FIG. 6, a hemispherical gear head 10 has a circular cross-section. Gear head 10 has a hemispherical gear head surface 12 and a flat circular surface 14 bordering on the hemispherical surface for mounting to a shaft or other attachment. Gear surface 12 may be a friction surface, or comprised of gear teeth as more fully described below. Gear head 10 has a lever arm 15 (shown in FIG. 8) that changes length, longer to shorter, when traveling from the major diameter to the minor diameter of gear head 10 as represented in FIG. 8 as lever arm lengths "A," "B" and "C." To rotate gear head 10, a shaft 16 is attached to surface 14 coextensive with a central axis or axis of rotation 18 of gear 10.

The axis running perpendicularly to the axis of rotation is the gear head axis 20. The angle of the gear is measured from the gear head axis to the angle produced by circular surface 14. FIG. 6 shows the gear in a 0° position.

1.1.1.2 Split Hemispherical Gear Head

Figure 10:
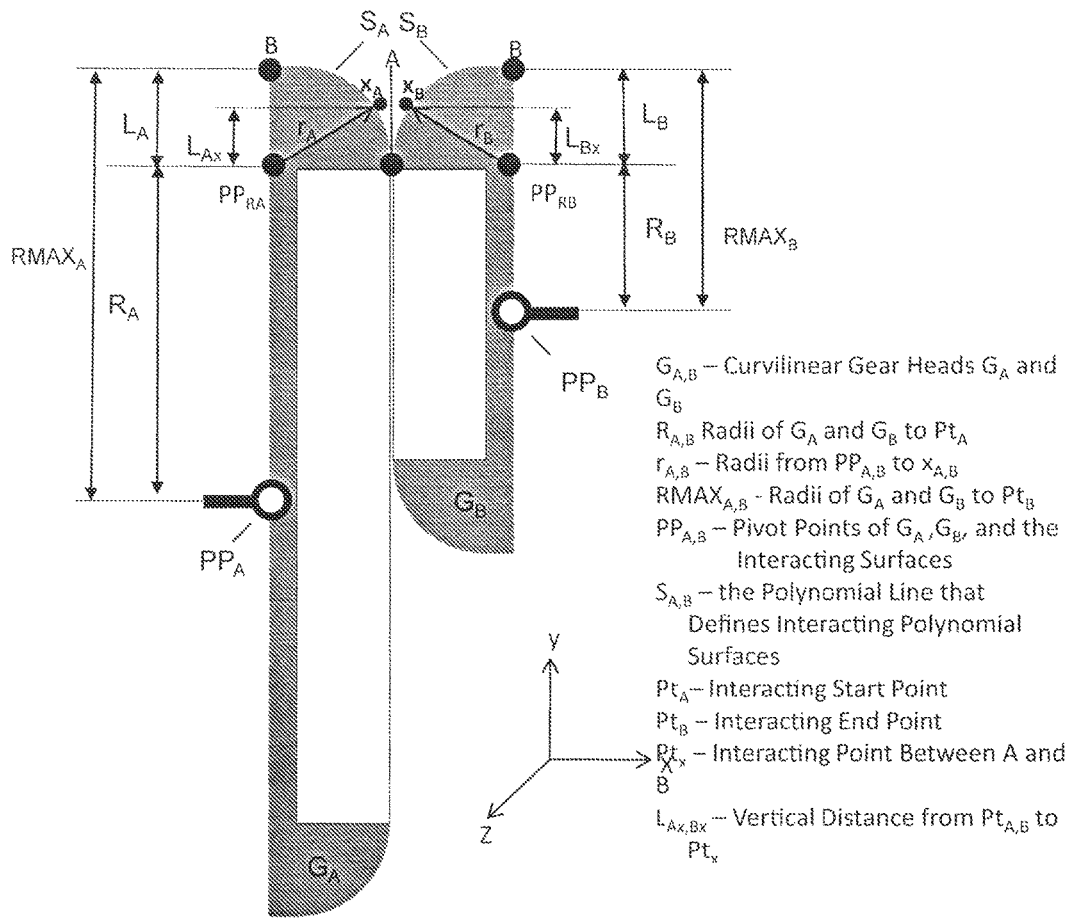
FIG. 10 shows the basic construction of the split curvilinear gear set according to one embodiment of the disclosure.

A second illustrative embodiment is the split hemispherical gear head. Referring to FIGS. 9a to 9c, the geometric construction of this gear head according to the embodiment shown in FIG. 10 is depicted. Creating the geometry can be visualized by splitting a hemisphere into two quarter spheres as shown in FIG. 9a. The quarter spheres are then separated by a distance "x" (FIG. 9b), and the void filled with a disk having a diameter "x" and some thickness less than R (the radius of the quarter sphere) (FIG. 9c). A pivot point and shaft are then placed at the center of the disk at diameter D. It is important to note that although the curves shown as $R_{A1}$ and $R_{B1}$ in FIG. 11 must be identical, they need not be circular. The curves can take on the shape of any workable polynomial that allows for the gear heads to interact and remain in contact throughout the range of motion of each gear head.

Referring to FIG. 10, the basic construction of the split curvilinear gear set is shown. The relative difference in size of the two gear heads is used to establish the gear ratio range. The greater the size differential, the greater the gear ratio range. The difference in gear head size is responsible for most of the range of gear ratios for the gear set. The initial positioning of the two gear heads relative to one another enables the gear heads to pivot relative to one another so as to vary the gear ratio. Polynomial surfaces $S_a$ and $S_b$ must be substantially identical because, as stated earlier, two interacting polynomial surfaces must be a mirror image of one another. The surfaces need not be circular in shape and the angle of rotation does not have to be 90°, but may be less than 90°. This adjustment can be made if space requirements are limited. Gear sets may be serially linked to increase gear ratio ranges and to accommodate space limitations as described more fully herein.

Figure 18:
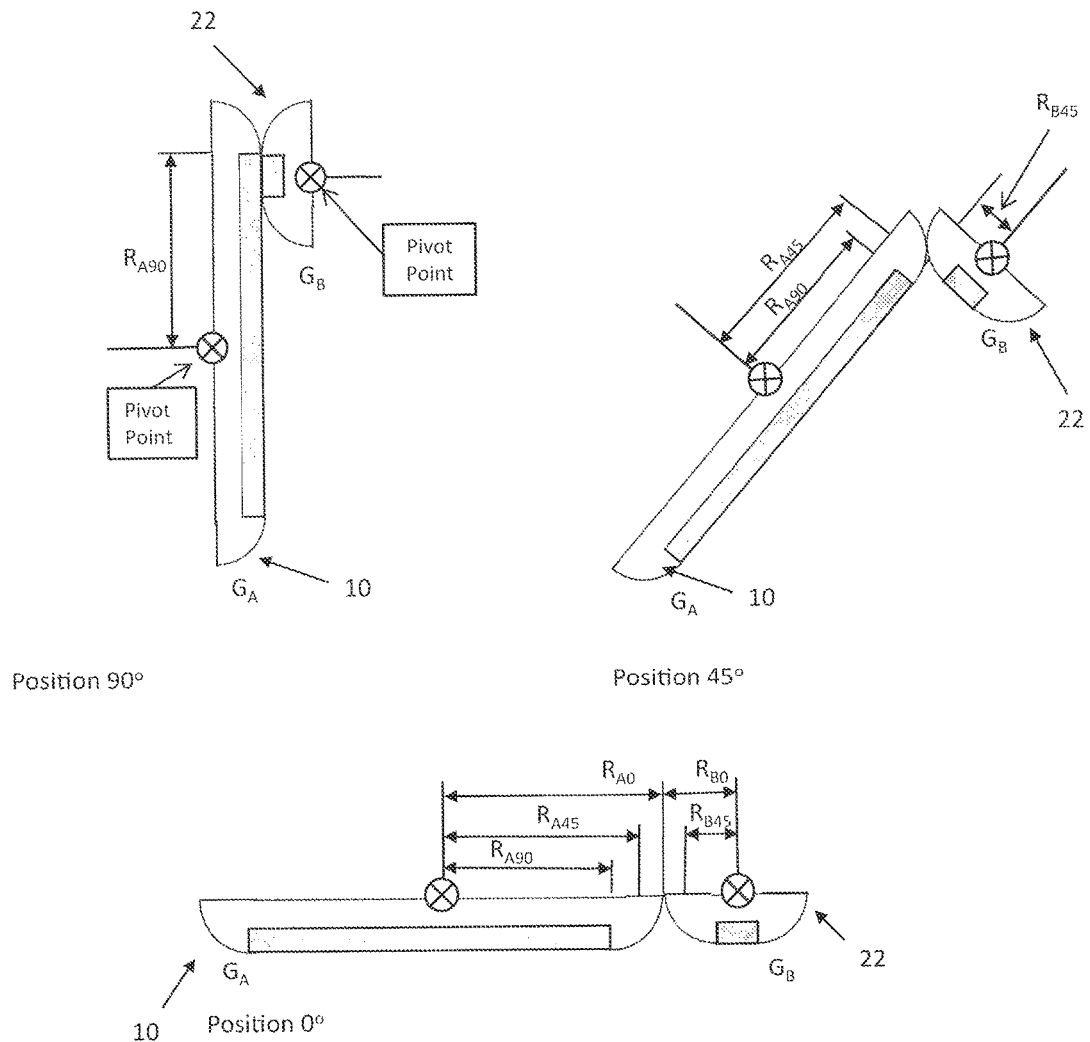
FIG. 18 shows the operational concept of a split gear set according to one embodiment of the disclosure.

FIG. 18 shows the operating range of the gear set configuration from about 0° to about 90° if a full hemispherical interactive profile is used. If an arc gear is used, the operating range can be reduced.

Referring again to FIG. 11, the basic curvilinear gear set configuration having physically interlocking gear heads is shown. Both $G_A$ and $G_B$ have the same geometric configuration, with the exception that the value of "x" is different for both gear heads. The difference in the value of "x" is important to the function of the gear set.

1.1.2 Assembly

The connection between a shaft to the gear head can be fixed, pivoting and/or universally rotational as with a ball/cup configuration. With a fixed axis, gear head axis 20 and central axis 18 are oriented perpendicularly. With a pivoting axis, gear head axis 20 can range from about 0° to about 90° relative to central axis 18 along two axes. The size of the gear relative to the size of the teeth impacts the range. A large gear with small teeth will minimize the range while a small gear with relatively large teeth will increase the range. With a ball/cup configuration, the gear head axis/central axis orientation is omnidirectional about three axes and may range from about 0° to about 90° along any of the axes. FIG. 6 shows that a gear head has two parts, the polynomial head 12 and an axle 16. The axle is connected to the flat side of the gear head 14 along the axis of rotation. The axle is used to turn the gear head.

1.1.3 The Lever Arm

Figure 7:
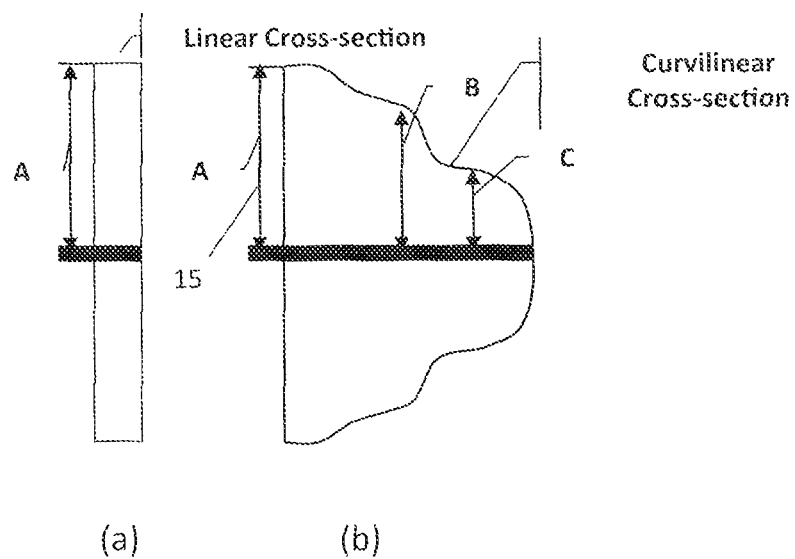
FIG. 7 is a diagrammatic representation in cross section of the comparative forces generated by a conventional prior art gear and a curvilinear gear.

In one aspect of the disclosure as illustrated in FIGS. 7 and 8, a curvilinear gear, (designated b in FIG. 7), enables the lever arm 15 of the gear to change in length, such as at points A, B and C, whereas the lever arm of a spur gear (designated a in FIG. 7a), remains constant across the cross-section or width of the gear. The change in the lever arm length changes as the point of interaction with a second gear changes. The degree of change of torque, force and speed is directly proportional to the distance of the point of interaction from the axis of rotation. One aspect of this concept is illustrated as a hemispherical gear as represented as b in FIG. 8.

1.1.4 Novel Features

The curvilinear gear permits torque and angular velocity produced by the gear head to continuously change between two limits. The curvilinear gear is intended to be used in both low and high load applications. Use in high load applications differentiates the curvilinear gear system from other similar technologies. One advantageous feature is a physical interlocking mechanism used to produce direct drive gear sets. A second advantageous feature is the use of two novel concepts, the curvilinear gear and the curvilinear U Joint, to create a new form of a continuously variable power train.

For low torque applications, friction surfaces may be used for the gear heads. Illustrative examples include rubber, neoprene and polymers. Friction surfaces have relatively few applications compared to gear teeth (described below) due to their inability to transfer energy in high torque applications.

Transitional physical mechanisms that can handle higher torque requirements than friction surfaces but do not use intermeshing gear teeth include gears with Velcro® surfaces and gear teeth interacting with a bed of rods. Torque capacity for such systems requires testing on a case-by-case basis.

1.2 Gear Set

1.2.1 Geometry and Types

Figure 12:
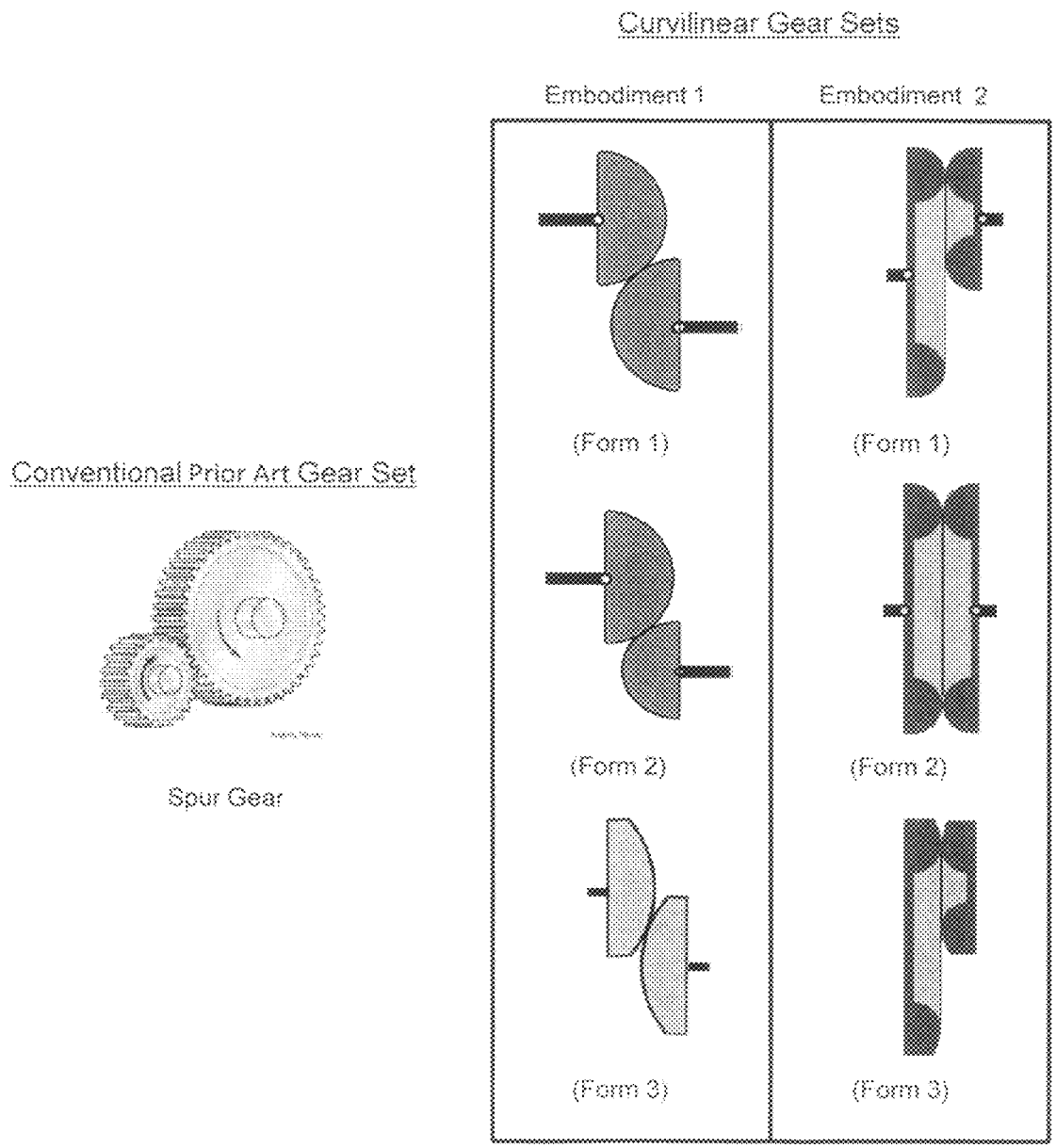
FIG. 12 shows two gear head options and three different embodiments of each according to several embodiments of the disclosure.

FIG. 12 illustrates a conventional gear set and two types of curvilinear gear sets. The conventional gear set shows one spur gear interacting with another to change the values of torque and angular velocity between the input/output (I/O) shafts. The two types of curvilinear gear sets being introduced demonstrate the same concept. The difference is that the conventional gear set changes one set of input values to another set of output values, while the curvilinear gear sets are capable of continuously changing one set of input values to a wide range of output values between two set limits.

The two embodiments of curvilinear gear set concepts being presented have the following different properties:

Embodiment 1

1. The I/O shafts rotate in different directions. That is, if the input shaft turns clockwise, then the output shaft turns counter-clockwise.
2. The interacting circumferences of two interacting gear heads change in opposite directions. As the interacting circumferences of one gear head increase, the circumferences of the other gear head decrease. This feature makes it more difficult for the gear teeth to cleanly interact.

Embodiment 2

1. The I/O shafts rotate in the same direction
2. The interacting circumferences both either increase or decrease. As one set of circumferences increase the other also increases, but at a different rate. This makes it easier for the gear teeth to interact, but does not eliminate the problem completely.

The difference in properties indicate that both gear set concepts can be either friction driven or direct driven, but Embodiment 2 is advantageous for the direct drive option, because it impacts the tooth interaction issue.

FIG. 12 shows three variations of each of the two curvilinear gear set embodiments. In the first two variations, the two gear heads that comprise the gear set can be the same or different in size. In the third variation, at least for a hemispherical curvilinear gear, the actual geometric shape can be altered by reducing the arc angle of engagement for the same arc length. This reduces the degree the I/O shafts need to pivot, while preserving the same gear ratio range.

1.2.2 Properties

1.2.2.1 Spur Gear

A further curvilinear gear set embodiment disclosed herein can use either a friction or a physical interlocking mechanism. The physical interlocking mechanism is particularly advantageous when used in Continuously Variable Transmissions as explained more fully herein. To better explain this embodiment, the properties of a conventional gear set will be further disclosed.

Referring to FIG. 13a, a conventional spur gear set is shown. The relative properties of torque (T), angular velocity (V), velocity (v), and force (F) with respect to gears having different gear diameters (d) are explained. $T=d/2\times F$. As shown in FIG. 13b, when the diameter $d_A$ of an input gear $G_A$ is greater than the diameter $d_B$ of output gear $G_B$, $T_A>T_B$, $V_A<V_B$, $V_A=V_B$, and $F_A=F_B$.

As shown in FIG. 13c, when the diameter $d_A$ of an input gear $G_A$ is equal to the diameter $d_B$ of output gear $G_B$, $T_A=T_B$, $V_A=V_B$, $V_A=V_B$, and $F_A=F_B$. As shown in FIG. 13d, when the diameter $d_A$ of an input gear $G_A$ is less than the diameter $d_B$ of output gear $G_B$, $T_A<T_B$, $V_A>V_B$, $V_A=V_B$, and $F_A=F_B$.

1.2.2.2 Curvilinear Gear vs Spur Gear

Referring now to FIGS. 14a-d, a curvilinear gear set, the first variation of Embodiment 1 (see FIG. 12) of the invention is shown. The key difference between this curvilinear gear set and the conventional gear set shown in FIGS. 13a-d is that the curvilinear gear set provides an infinite number of gear ratios between two limits, whereas the conventional gear set provides a single gear ratio.

As $G_A$ moves from 0° to 45° and $G_B$ moves from 90° to 45°, $d_A$ decreases in size while $d_B$ increases in size. As the diameters of the two gears change relative to one another, the properties of Torque (T), Angular Velocity (V), Velocity (v), and Force (F) of the two gears change in a manner identical to those of the conventional gear set. Similarly, as $G_A$ moves from 45° to 90° and $G_B$ moves from 45° to 0°, $d_A$ continues to decrease in size while $d_B$ continues to increase in size. Again, the properties of Torque (T), Angular Velocity (V), Velocity (V), and Force (F) are identical to those of the conventional gear.

1.2.2.3 Point Load vs Line Load

It is important to note that conventional gear sets and curvilinear gear sets differ in that conventional gear sets tend to be driven using line loads, while curvilinear gear sets are driven using point loads. This characteristic is important because it can affect two important properties, load and wear as described herein. In either case, both line loads and point loads must be converted into area loads that can be absorbed by the gears without exceeding the elastic limit of the material properties of the gear heads. One conventional gear, the spiral bevel gear, has already addressed this problem. The technology used to produce the spiral bevel gear will be examined and used to address the point load issue of the curvilinear gear.

1.2.3 Operational Concept

1.2.3.1 Embodiment 1

Figure 15:
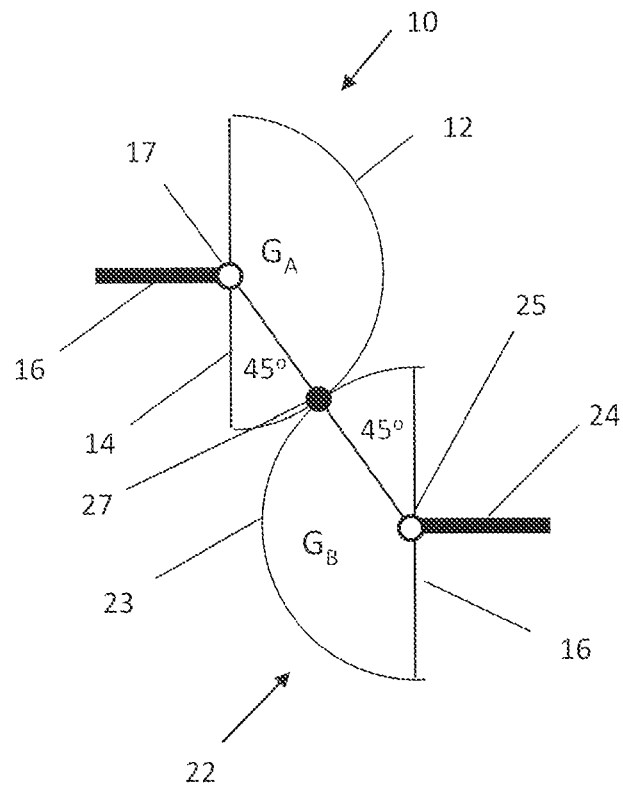
FIG. 15 is a hemispherical gear system according to one friction-driven embodiment of the disclosure.

FIG. 15 illustrates a first variation of Embodiment 1 (see FIG. 12). FIG. 15 also illustrates the initial positioning of the two gear heads, a first gear head 10, and a second gear head 22, that comprise the gear set. To transmit torque and speed, second gear head 22 interacts with first gear head surface 12. Second gear head 22 is also configured as a hemispherical gear having a hemispherical surface 23 with a second pivoting shaft 24 attached by a second pivot point 25 to a second gear flat circular surface 26. In the hemispherical embodiment, a first shaft 16 is attached by a first pivot point 17 to first circular surface 14 of first gear head 10. When gear head 10 rotates about its axis of rotation and interacts with second gear head 22, a force and speed passes from gear head 10 to second gear head 22 at a point of interaction 27. At the point of interaction, the force and speed is the same for both gear heads 10 and 22. The angular speed and torque of each gear, however, is a function of the lever arm of each gear. The lever arm of each gear is determined by the distance between the point of interaction and each gear head's axis of rotation. When the point of interaction for each gear head is at 45° as shown in FIG. 15, the torque and angular velocity of both gear heads is the same.

As shown in FIG. 15, the point of interaction is set at 45° for each gear head so the lever arms are identical. At this point, the gear heads act like spur gears having the same lever arm and the same radius. If each gear head is permitted to rotate about its pivot point, the point of interaction will change, which will change the length of the lever arm of each gear head. The torque and angular velocity of each gear head will also change as a result.

FIG. 14*a* illustrates the interaction of input first gear head 10 and second gear head 22 at two extreme points and one midpoint of interaction. In the embodiment shown, both gears have fixed pivot points. In the first segment shown at left, input gear head 10 has a point of interaction at its major diameter while output second gear head 22 has a point of interaction at its minor diameter. In the second segment, each gear has a point of interaction at a midpoint diameter so that each has the same lever arm, torque and angular velocity. In the third segment at right, input gear head 10 has a point of interaction at its minor diameter while output second gear head 22 has a point of interaction at its major diameter. Advantageously, the torque ratio and velocity ratio between the two gears varies continuously between two set limits as the gear heads rotate approximately 90°. The limits are determined by the size of the gears, i.e., their radii.

Figure 16:
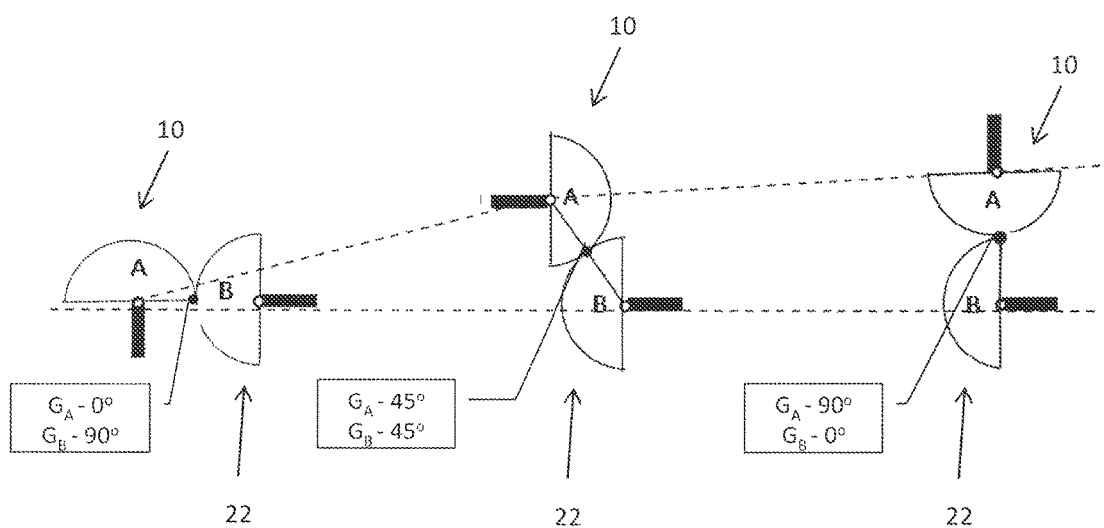
FIG. 16 shows the range of motion of the hemispherical gear system when the gear head pivot points remain fixed according to one embodiment of the disclosure.

In contrast to gear heads with pivot points, if one gear head (such as gear head 22 shown in FIG. 16), has a fixed shaft, the angular range of motion of the input gear head 10 (also commonly known in the art as the pinion gear), is +/−45°. In this configuration, the pivot point of pinion 10 moves in both a vertical and horizontal direction.

Figure 17:
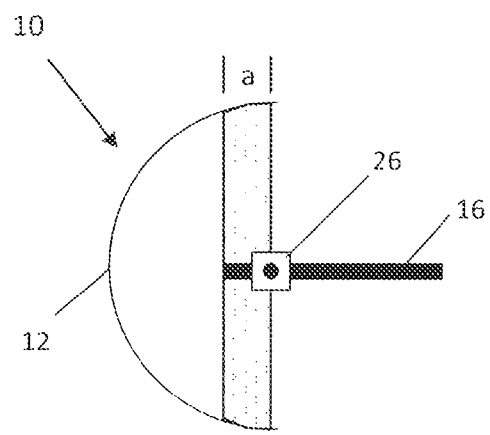
FIG. 17 shows a sectional view of a hemispherical gear head and bearing assembly according to one embodiment of the disclosure.

Referring now to FIG. 17, an embodiment of the hemispherical gear head is shown with a first bearing 26 used to connect the first gear head 10 to first shaft 16. This configuration provides a pivoting shaft/gear head arrangement. Attachment of the bearing, gear head and shaft can be accomplished by any means well known to those skilled in the art. The section designated "a" represents a section of the gear head that may be removed to accommodate first bearing 26.

Again, for low torque applications, friction surfaces may be used for the gear heads. Illustrative examples include rubber, neoprene and polymers. Friction surfaces have relatively few applications compared to gear teeth (described below) due to their inability to transfer energy in high torque applications.

Transitional physical mechanisms that can handle higher torque requirements than friction surfaces, but do not use intermeshing gear teeth include gears with Velcro® surfaces and gear teeth interacting with a bed of rods. Torque capacity for such systems requires testing on a case-by-case basis.

1.2.3.2—Embodiment 2

Figure 11:
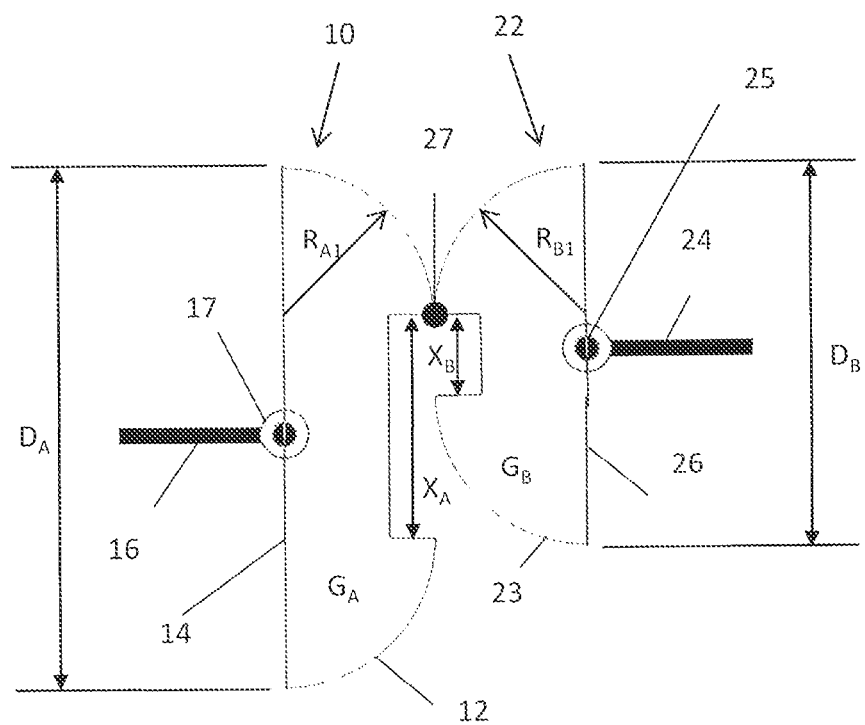
FIG. 11 is a further illustration of a split gear set according to one embodiment of the disclosure.

FIG. 12 illustrates a first variation of Embodiment 2. FIG. 11 also illustrates the initial positioning of the two gear heads 12, 22, that make the gear set. To transmit torque and speed, second gear head 22 interacting with first gear surface 12 is required. Referring to FIG. 11, second gear head 22 is also configured as a split hemispherical gear having a hemispherical second gear surface 23 with second pivoting shaft 24 attached by second pivot point 25 to a second gear flat circular surface 26. In the split hemispherical embodiment, first shaft 16 is attached by a first pivot point 17 to first circular surface 14. When gear head 10 rotates about its axis of rotation and interacts with second gear head 22, a force and speed passes from gear head 10 to second gear head 22 at a point of interaction 27. At the point of interaction, the force and speed is the same for both gear heads 10 and 22. The angular speed and torque of each gear, however, is a function of the lever arm of each gear head. The lever arm of each gear head is determined by the distance between the point of interaction and each gear head's axis of rotation.

If each gear head is permitted to rotate about its pivot point, the point of interaction will change, which will change the length of the lever arm of each gear head. The torque and angular velocity of each gear head will also change as a result.

FIG. 18 illustrates the interaction of input first gear head 10 and second gear head 22 at two extreme points and one midpoint of interaction. In the embodiment shown, both gear heads have fixed pivot points. In the first segment shown at 0°, input first gear head 10 has a point of interaction at its minor diameter as does the output second gear head 22. In the second segment at 45°, each gear head has a point of interaction at a midpoint diameter. In the third segment at right, input first gear head 10 has a point of interaction at its major diameter as does the output second gear head 22. This gear configuration imparts a torque ratio and a velocity ratio between the two gear heads that varies continuously between two set limits as the gear heads rotate approximately 90°. The limits are determined by the size of the gear heads, i.e., their radii, and the difference in the relative minor and major diameters of each. The set limits increase as the gear heads' radii and difference in the relative major and minor diameters increase.

As long as the values of "x" are different, the gear heads will assume the properties of a conventional gear set with the exception that this new configuration will also possess an infinite number of gear ratios between two limits.

Figure 19:
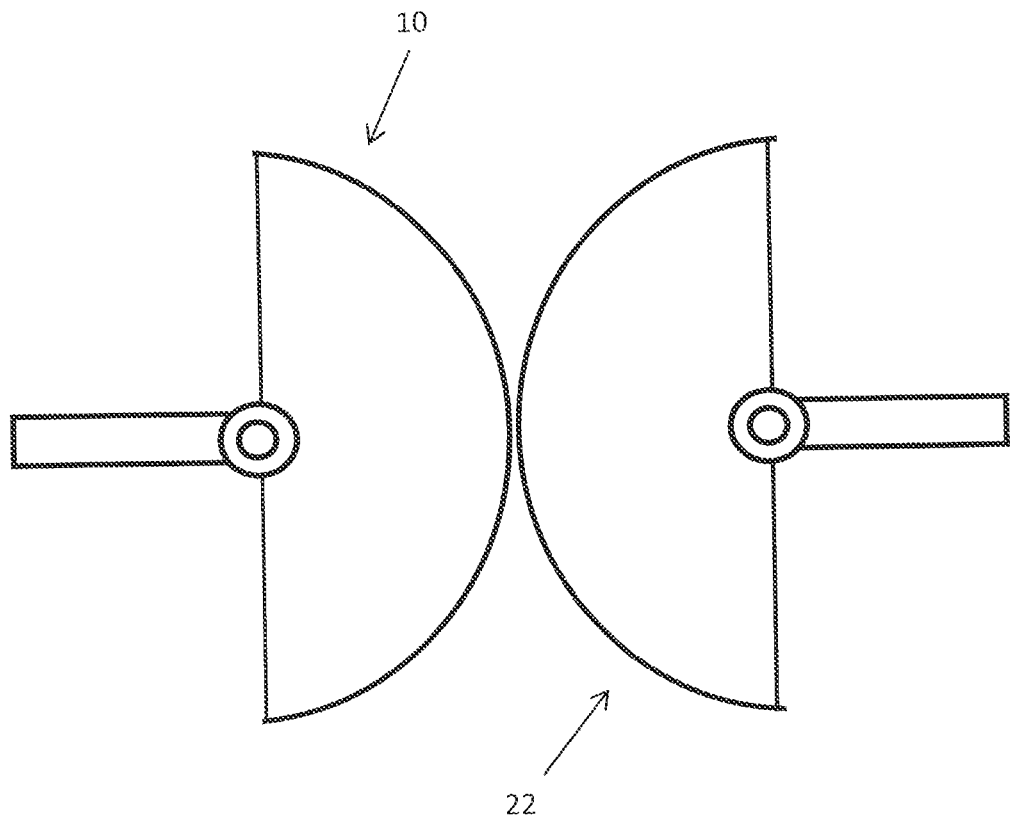
FIG. 19 shows a curvilinear U Joint according to one embodiment of the disclosure.

And like the curvilinear universal joint shown in FIG. 19, the interlocking surfaces of the gear heads can take on any geometry, the only requirement being that the interlocking mechanism of one gear head must be the inverse of the interlocking mechanism of the other gear head.

Figure 20:
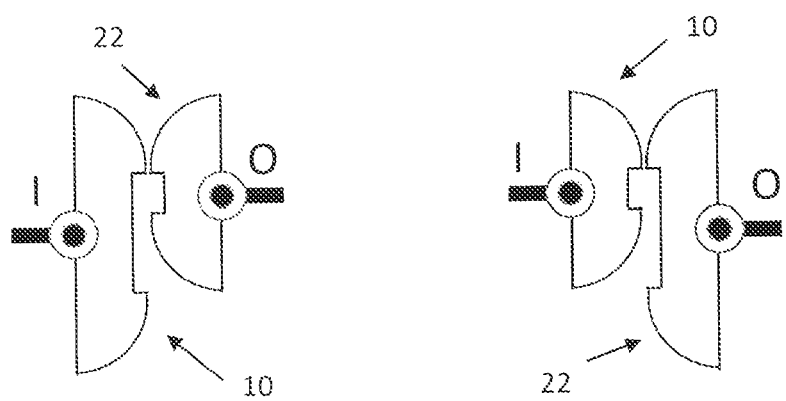
FIG. 20 shows split gear sets according to two embodiments of the disclosure.

FIG. 20 shows an illustrative range of allowable configuration options. The allowable options include: (1) the Input (I) gear is equal, larger or smaller than the Output (O) gear, and (2) the value of $X_A$ and $X_B$ is greater than "0

1.2.3.2.1 Angular Velocity

The curvilinear gear set shown in FIG. 11 will be used to demonstrate an illustrative example of one range of angular velocities that can be supported using one curvilinear gear set configuration. If $$\Delta V = C_A/C_B = \pi D_A/\pi D_B$$

where C—Circumference then $$\Delta V = [X_A + 2R_{A1} \sin \theta]/[X_B + 2R_{B1} \sin \theta]$$

Where $X_A = D_A - 2R_A$ $X_B = D_B - 2R_B$

Example:

Now, if $D_A = 10$, and $D_B = 6$ then at $\theta = 90°$ $$\Delta = [6 + 4 \times 1]/[2 + 4 \times 1] = 10/6 = 1.7:1$$

and $\theta = 0°$ $$\Delta V = [6 + 4 \times 0]/[2 + 2.5 \times 0] = 6/2 = 5:1$$

1.2.3.2.2 Torque

Referring again to the gear set embodiment shown in FIG. 11, the gear set will be used to establish an illustrative range of torque values that can be achieved by using the gear set configuration. If $T(\text{Torque}) = F(\text{Force}) \times R(\text{Lever Arm})$ then $$T_A = F_A[X_A/2 + R_{A1} \sin \theta]; \text{ and } F_A = T_A/[X_A/2 + R_{A1} \sin \theta]$$

$$T_B = F_B[X_B/2 + R_{B1} \sin \theta]; \text{ and } F_B = T_B/[X_B/2 + R_{B1} \sin \theta]$$

If $F_A = F_B$, then $$T_A/[X_A/2 + R_{A1} \sin \theta] = T_B/[X_B/2 + R_{B1} \sin \theta], \text{ and}$$

$$T_B = T_A[X_B/2 + R_{B1} \sin \theta]/[X_A/2 + R_{A1} \sin \theta]$$

Example:

Now, if $T_A = 1200$ ft-lbs $R_A = R_B = 2''$ $D_A = 10''$ $D_B = 6''$ then at $\theta = 90°$ $$T_B = 1200/[2/2 + 2 \times 1]/[6/2 + 2 \times 1] = 1200[1+2]/[3+2] = 1200 \times 3/5 = 720 \text{ ft-lbs}$$

and at $\theta = 0°$ $$T_B = 1200/[2/2 + 2 \times 0]/[6/2 + 2 \times 0] = 1200 \times 1/3 = 400 \text{ ft-lbs}$$

Accordingly, using the curvilinear gear set shown in FIG. 11 results in torque output ranges from about 400 ft-lbs to about 720 ft-lbs. The application of this curvilinear gear set to a power train application is described herein.

1.2.4 Interlocking Mechanism

Having described the gear head and gear set concepts of a curvilinear gear, a physical interlocking mechanism; i.e., the direct drive mechanism, will now be described. This will include: (1) a description of a method for laying out a tooth pattern, (2) a method of establishing a tooth footprint, and (3) a method of creating tooth head geometries.

One illustrative embodiment will be presented to demonstrate this, but it should not be considered as limiting as to the range of possible strategies that may be used. It should also be understood that although the example concerns gear teeth as currently known, future developments in gear tooth design may become applicable to the curvilinear gear systems disclosed herein.

The following description is applied to Embodiment 2 Variation 1 (See FIG. 12). Any application of the concepts to other embodiments will be noted as applicable.

Before describing the physical interlocking mechanism for a curvilinear gear set, the following prefatory considerations should be noted:

1. Teeth having different geometric shapes can be used. For example, a rectangular, hemispherical or elliptical shape may be implemented. More general volumetric polynomial shapes may also be used.
2. Gear teeth are arranged in sets of two interacting longitudinal rows referred to as a Row Sets. The teeth used to populate a row set must be geometrically identical, while the geometric properties between row sets can vary. Alternatives to the Row Set concept are also possible.
3. The width of the row sets need not be the same.
4. Gear teeth can be arranged on a curvilinear gear head in many different configurations. One configuration is to use alternating concave/convex teeth on each gear head. Another is to place all concave teeth on one gear head and all convex teeth on the other. And configurations are possible as long as the other criteria described herein are met.
5. The required range of torque and angular velocity for a specific application will often drive the actual design of the teeth.

1.2.4.1 Teeth Arrangement

Figure 21:
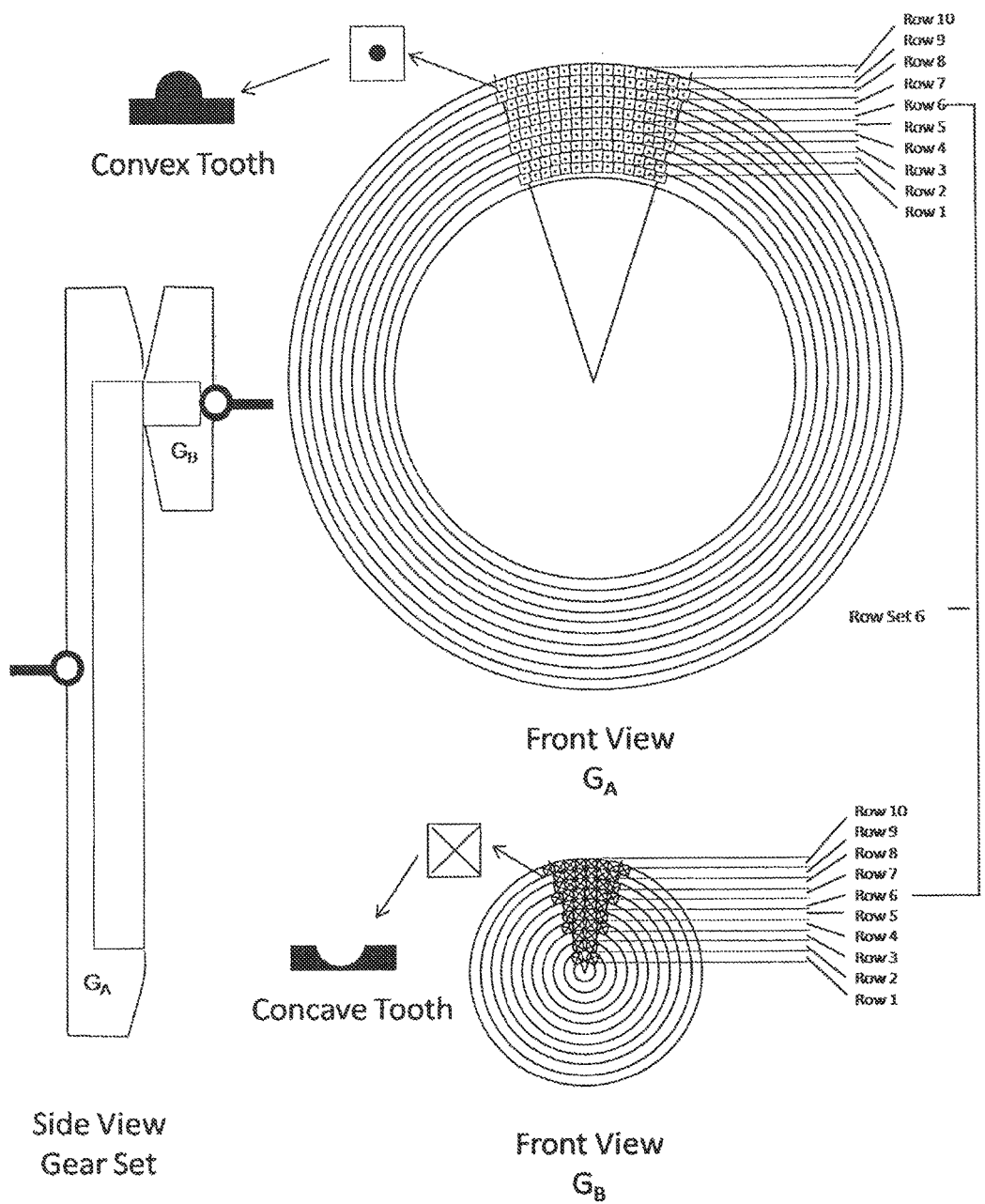
FIG. 21 is a diagrammatic representation with exploded view of teeth and tooth-receiving cavities and gear teeth rows for an interlocking mechanism, and an interacting curvilinear gear set according to one embodiment of the disclosure.

FIG. 21 shows one embodiment in which teeth can be arranged on each gear head. The following should be noted:

1. The surface of $G_A$ ($S_A$) must be the geometric inverse of the surface of $G_B$ ($S_B$).
2. Teeth are positioned longitudinally, in rows, on each gear head.
3. Each gear head must have the same number of rows.
4. Row "x" of $G_A$ and Row "x" of $G_B$ form a Row Set. The geometric properties of different row sets can vary.
5. Convex teeth can populate $G_B$, while concave depressions having the same shape as the convex teeth can populate $G_A$.
6. Interaction occurs when a convex tooth engages a concave depression.

The following steps are used to design a Row Set:

Step 1 Determine the width of each row;

Step 2 Establish the tooth footprint; and,

Step 3 Define the tooth crown geometry.

1.2.4.1.1 Step 1—Determine Row Width

Background

Figure 22:
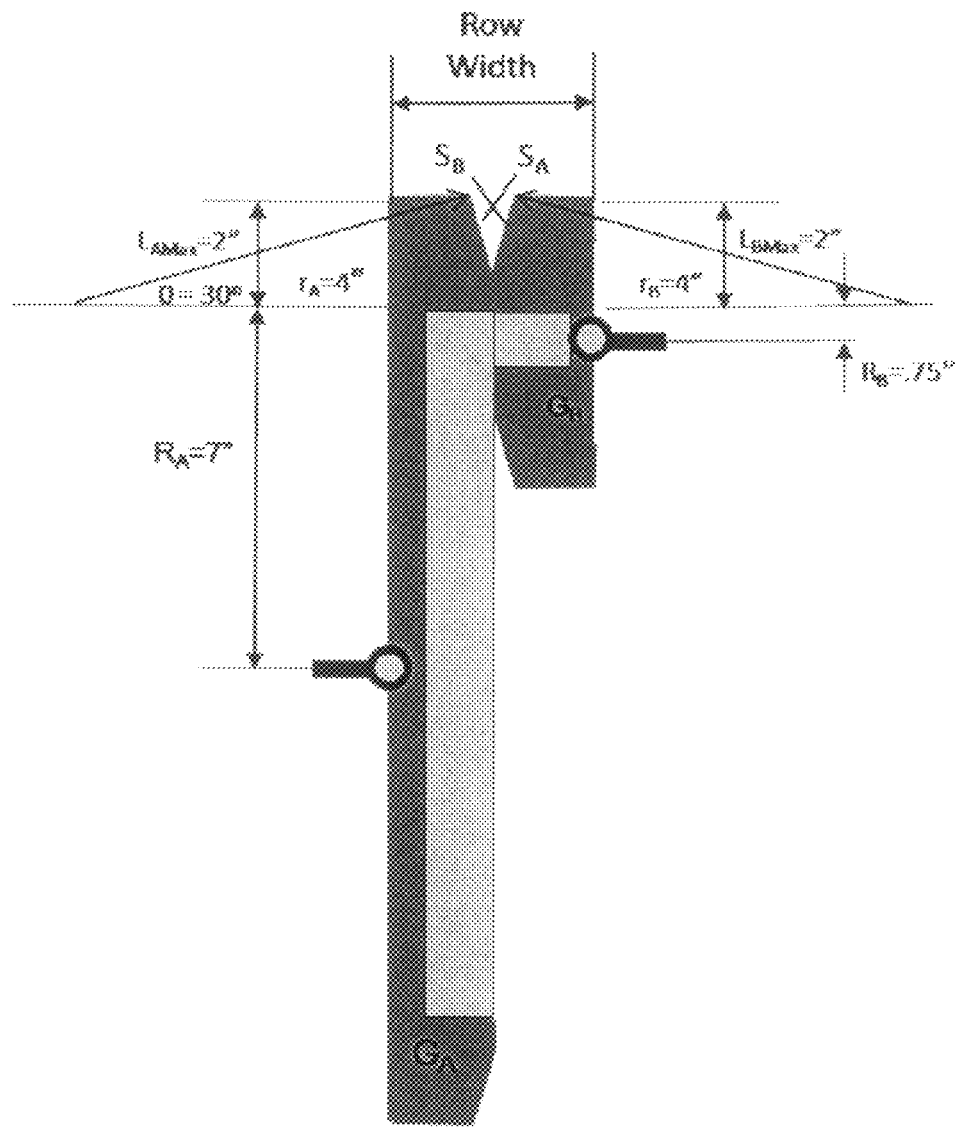
FIG. 22 shows an interacting curvilinear gear set with highlighted dimensions according to one embodiment of the disclosure.

FIG. 22 illustrates a procedure for determining row width. In a typical application, the row width is established by first determining the required tooth strength.

Illustrative Example

For this embodiment, it is assumed the strength assessment has been performed and the results indicate a tooth width of 0.2" is needed. Any strength assessment used in the art may be implemented to ascertain necessary tooth strength. The method used is not critical to determine tooth strength adequate to construct tooth configurations. This means the row width must be ≥0.2". Based on this requirement, the following method is used to establish the row width for the prototype.

Given $r_{A,B}$ (arc radius of $S_{A,B}$) = 4"

Determine the Arc Length of $S_{A,B}$ $$S_{A,B} = 30°/360° \times 2pi \; r_{A,B} = 0.083 \times 2pi \times 4'' = 2.086''$$

Establish the Number of Rows

No. of Rows=$S_{A,B}$/0.2=2.086/0.2=10.43 (rounded off to 10 rows)

Compute the Actual Row Width

Actual Row Width (AW)=$S_{A,B}$/10 rows=2.086/10=0.208"

1.2.4.1.2 Step 2—Establish Tooth Footprint

Background

Figure 23:
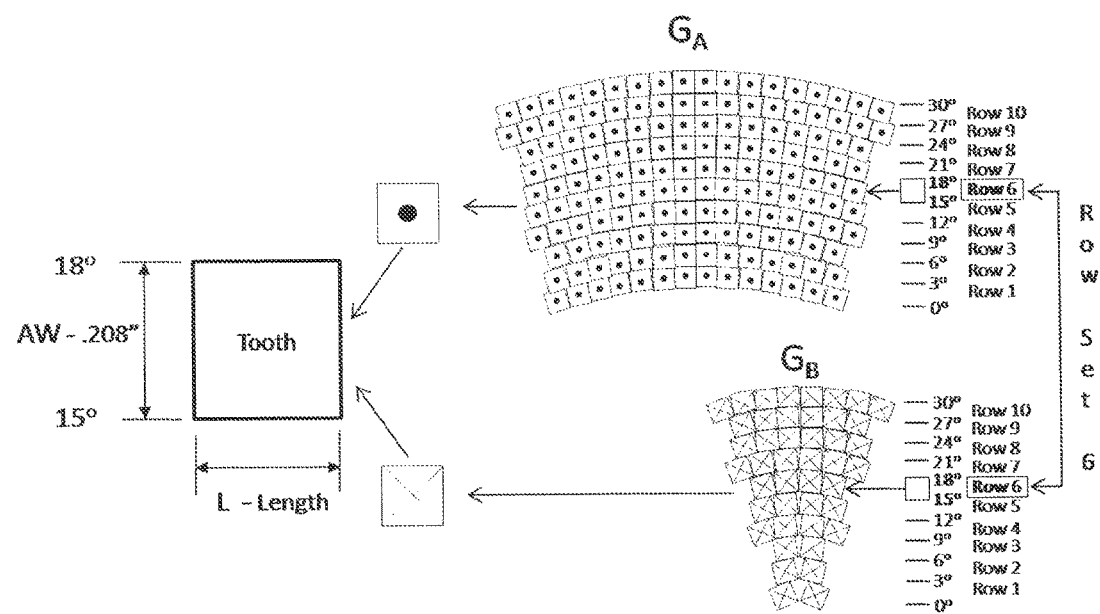
FIG. 23 shows row sets, teeth footprints and exploded views of teeth footprints on a curvilinear gear according to one embodiment of the disclosure.

The minimum required tooth length is a product of the strength analysis. Establishing the actual tooth length involves finding the correct number of teeth in the two channels that make up a Row Set, then determining the tooth length needed to properly implement these teeth. Row Set 6, shown in FIG. 23, is used illustratively to demonstrate the process.

FIG. 22 shows two surfaces ($S_{A,B}$) being inter-connected. FIG. 23 visually summarizes the goal of this step, and FIG. 24 illustrates an important issue that must be addressed. The issue is how to address the gap formed between the inner and the outer circumference of each gear head.

Row Set 6 involves row 6 of $G_A$ and row 6 of $G_B$. Row 6 of $G_A$ is populated completely with convex teeth, while row 6 of $G_B$ is populated completely with concave teeth. The footprint length and width dimensions of both concave and convex teeth must be identical (manufacturing tolerances excepted), while the tooth profile of $G_B$ must be the substantial inverse of the tooth profile of $G_A$.

FIG. 24 is used to illustrate the difference in the inner and outer diameters of Row Set 6 of both $G_A$ and $G_B$. It is important to note that if the tooth footprint is either a square or a rectangle, a gap occurs between the teeth as the diameter increases from the inner circumference to the outer circumference. It is also important to note that the gap of the smaller gear head grows at a faster rate than that of the larger gear head, $G_A$. This is due to the fact that the rate of change of circumferences for the small gear head, $G_B$, is greater than the rate of change experienced by $G_A$.

FIG. 24 also shows the smaller gap can be substantially eliminated by replacing the square, or rectangle, with an isosceles trapezoid. Taking this step also reduces, but does not completely remove the gap from the smaller gear head.

The error that remains can be controlled to some degree in the following ways:
1. Reduce the Row Set track width: This affects the strength of the tooth. Some of the strength can be preserved by increasing the tooth length as tooth width is reduced.
2. Increase the number of teeth: Cutting the tooth length in half will halve the gap error, but once again, this strategy will also reduce the tooth strength.
3. Reduce the difference in $R_A$ and $R_B$: The downside here is that the range of gear ratios will be reduced. Increasing the size of $L_A$ and $L_B$ can also compensate for the reduction in difference in $R_A$ and $R_B$, but this will force the gear heads to increase in size.
4. Serially link gear sets: This alternative is discussed in greater detail herein below in Section 3.3. Serially linking gear sets permits any torque and angular requirements to be successfully addressed while simultaneously minimizing the gap issue.

Design Strategy

Figure 25:
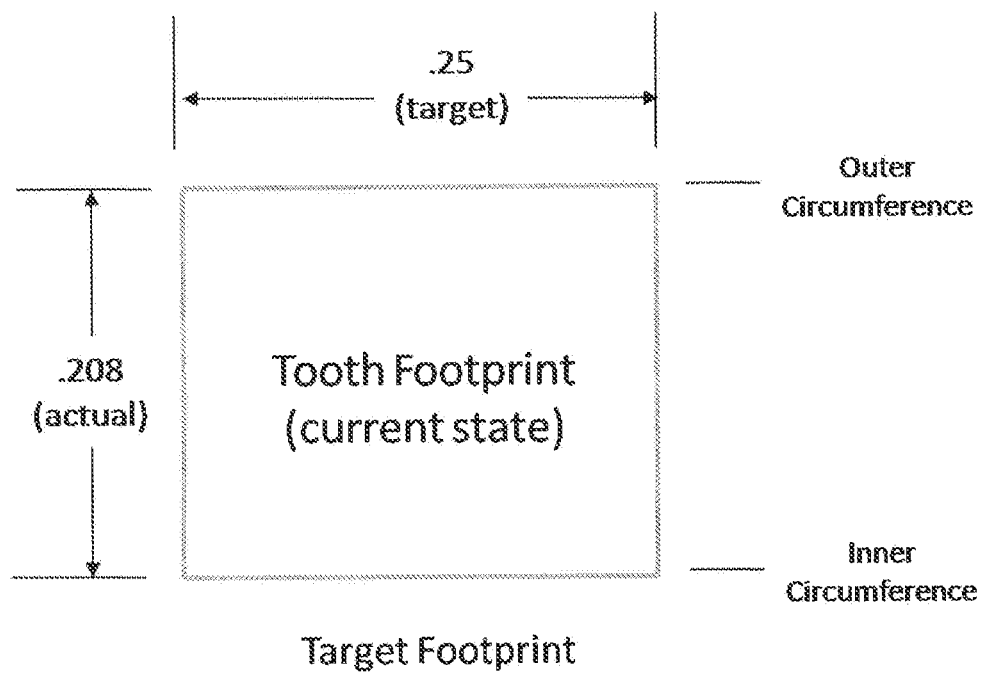
FIG. 25 shows a tooth footprint according to one embodiment of the disclosure.

With this foundation, it is now possible to prepare the design concept for the tooth footprint. FIG. 25 illustrates the currently described point in the process. The following is an illustrative procedure to convert from a rectangular footprint to an isosceles trapezoidal footprint.

Illustrative Example

Figure 26:
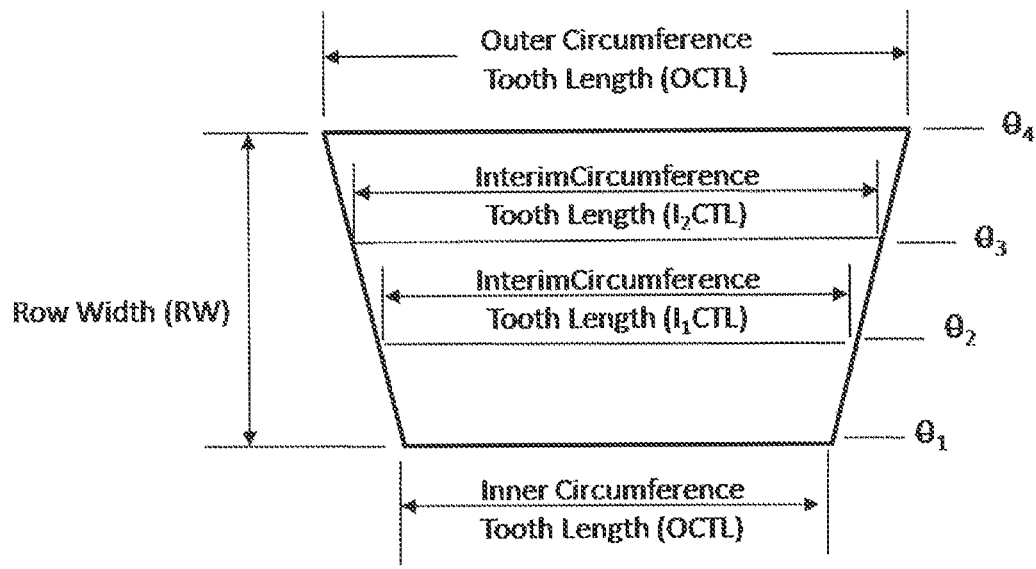
FIG. 26 shows a tooth footprint template according to one embodiment of the disclosure.

Row Set 6, as shown in FIG. 23, is used again to demonstrate how to establish a tooth footprint for a Row Set. The process is repeated for the remaining nine (9) Row Sets of the functional prototype embodiment. FIG. 26 illustrates how the footprint is documented.

The following method is used to determine the footprint for each Row Set. As stated, Row Set 6 ($RS_6$) is used in the exemplary embodiment of the procedure, with the results shown in FIG. 27. The process is then repeated for the remaining Row Sets, with the results shown in FIG. 28.

Given:

For $RS_6$:

$RW_6$ (Row Width)=0.208"

$TTL_6$ (Target Tooth Length)=0.25"

Legend:

$ERR_{max}$—Error (Max Gap)

IC—Inner Circumference

ICTL—Inner Circumference Tooth Length

OC—Outer Circumference

OCTL—Outer Circumference Tooth Length

R—Row

RS—Row Set

RW—Row Width

T—No. of Teeth

TL—Tooth Length

TTL—Target Tooth Length

Procedure

Step 2a. Determine a footprint that can be used for $R_{6A}$.

Step 2b. Evaluate using the footprint from step 2a with $R_{6B}$. Compute $ERR_{6B}$ at $IC_{6B}$.

Step 2c. Adjust $T_{6A}$ to minimize $ERR_{6B}$, or

Step 2d. Adjust $T_{6A}$ to eliminate $ERR_{6B}$

Step 2e. FIG. 22 illustrates the process of developing the gear tooth footprint for $RS_6$.

Step 2a: Establish the Footprint for $R_{6A}$

Step 2a(1): Compute Number of Teeth in $R_{6A}$

Define the Inner Circumference of $G_A$ ($IC_{6A}$) for $RS_6$ (as Shown in FIG. 22)

$IC_{6A}=2*Pi*L_{6A}=2*Pi*8.03=50.454"$

Where:

$L_{6A}=R_{6A}+L_{AMax}*\sin(\theta)=7+4*\sin(15°)=7+4*0.258=7+1.035=8.03"$

Define the Inner Circumference of $G_B$ ($IC_{6B}$) for $RS_6$ $IC_{6B}=2*Pi*L_{BMax}=2*Pi*1.99=12.479"$ Where:

$L_{6B}=R_{6B}+L_{BMax}*\sin(\theta)=0.75+4*\sin(15°)=0.75+4*0.25=0.75+1035=1.78"$ Compute the Number of Teeth in $RS_{6A}$ $T_{6A}=C_{6A}/TTL=51.749/0.25=206.996=206$ teeth plus an error (ERR/Gap) of 0.996 Note: 0.996 represents 99.6% of a tooth. This, obviously, cannot be produced, and therefore a gap is created.

Step 2a(2): Adjust the Inner Circumference Tooth Length ($ICTL_{6A}$)

Find Actual $ICTL_{6A}$ by Eliminating the Error of 0.996

$ICTL_{6A}=TTL_{6A}+ERR_{6A}/T_{6A}=0.25+0.996/206=0.25+0.0048=0.2548$

Step 2b: Evaluate Using the $R_{6A}$ Footprint for $R_{6B}$
Find Number of Teeth for $R_{6B}$ $$T_{6B} = IC_{6B}/TL_6 = 12.479/0.2548 = 48.97 = 49$$

teeth plus part of another tooth. This forms a gap, $ERR_{6B}$ on $IC_{6B}$ having the value of 0.97.

Step 2c: Minimize Gap in $R_{6B}$
Step 2c(1): Minimize $ERR_{se}$ on $IC_{6s}$
This can be accomplished by using the following iterative approach:
1. Adjust $T_{6A}$ up or down
2. Re-compute $TL_{6A}$
3. Re-calculate $ERR_{6B}$
4. Repeat the process until $ERR_{6B}=0$, or some minimum value For $RS_6$, this procedure yielded the following results at $RS_6$:

| Circumference Position | TL (Tooth Length) at $RS_{6A}$ | No of Teeth at $G_A$ | No of Teeth at $G_B$ | $ERR_{6B}$ |
|---|---|---|---|---|
| 15° | .2550 | 198 | 44 | 0 |

Step 2c(2): Minimize $ERR_B$ for $OC_B$ and the Two Interim Points

This step demonstrates a process for minimizing the gap, or the amount of "Pull" experienced at the interim points and outer circumference for of $RS_6$.

Track width, tooth length at the inner circumference, and the number of teeth needed in $R_{6A}$ and $R_{6B}$ are known. What remains is to determine the tooth lengths at the outer circumference and two interim circumferences, and then determine the size of any gap formed at each of these three points for $R_{6B}$. Whereas the gap in $R_{6A}$ can be substantially eliminated, $R_{6B}$ cannot.

Although the number of teeth in $RS_6$ must remain fixed, the length of a tooth can vary across the width of the track. The following process is used to determine this change:

For $OC_{6A}$, the tooth length needed to produce an $ERRA_{18}°=0$ is determined. It will be seen that this new tooth length is less than what is needed for $R_{6B}$.

The size of the gap formed at $OC_{6B}$ is determined by subtracting the needed tooth length of $OC_{6B}$ by $OCTL_{6A}$.

A gap occurs because the rate of change between gear head circumferences in a smaller gear is greater than in a larger gear. Formation of the gap is a negative because it inhibits a smooth interaction between the two gear heads. Some applications may be able to tolerate this imperfection, while others may not. The next section, Section 2d, will address how to substantially eliminate the gap.

The following exemplary procedure addresses the issues involved with the inner circumference of $RS_6$ at the outer circumference and the two interim circumferences.

Compute $OCTL_6$ $$OCTL_6 = OC_{A6}/T_{A6} = 51.749/198 = 0.2614$$

Compute $ERR_{6B}$ $$ERR_{6B} = OC_{B6}/T_{B6} - OCTL_{A6} = 12.479/44 - 0.2614 = 0.2836 - 0.2614 = 0.022$$

Repeat these Two Steps for Interim Circumferences
The complete results for $RS_6$ are presented in the following table:

| Circumference Position | TL (Tooth Length) at $RS_{6A}$ | No of Teeth at $G_A$ | No of Teeth at $G_B$ | $ERR_{6B}$ |
|---|---|---|---|---|
| 15° | .2550 | 198 | 44 | 0 |
| 16° | .2571 | 198 | 44 | .0007 |
| 17° | .2592 | 198 | 44 | .015 |
| 18° | .2614 | 198 | 44 | .022 |

Figure 27:
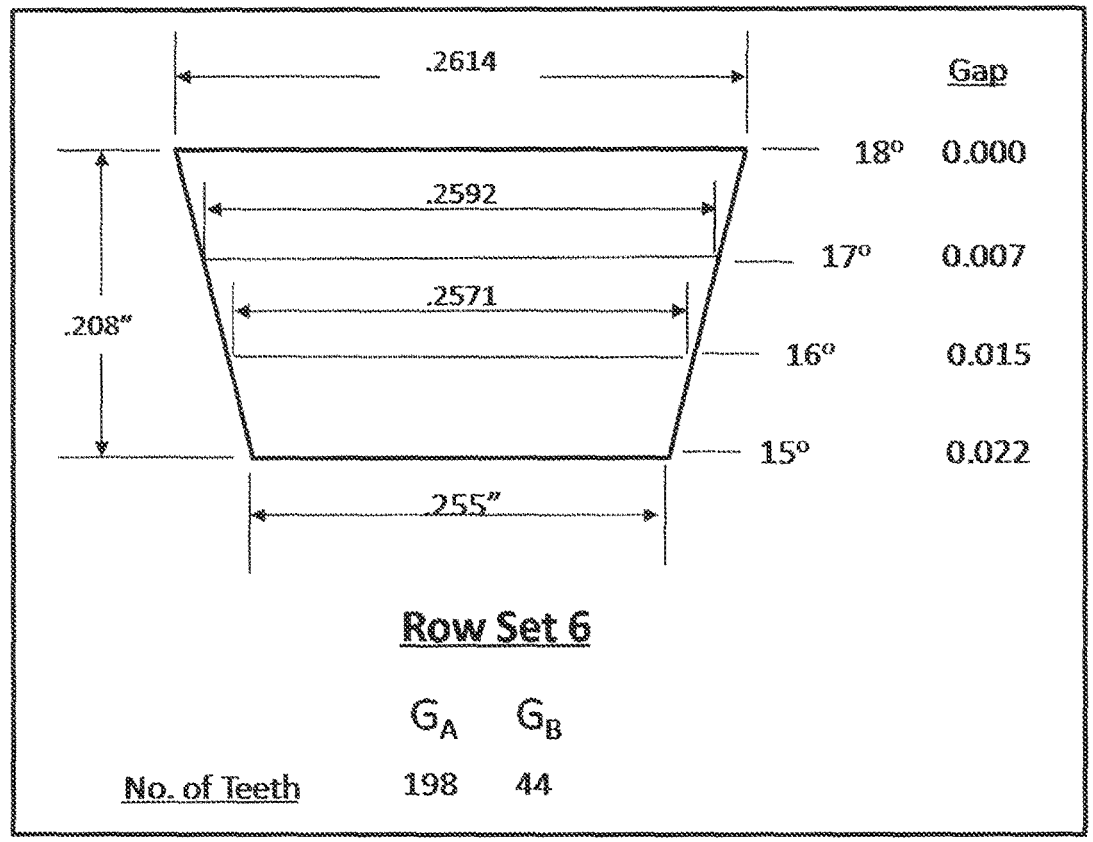
FIG. 27 shows a tooth footprint for a specific row according to one embodiment of the disclosure.

FIG. 27 provides the information in a more graphical form. The process used to document the foot print for $RS_6$ can now be repeated for the remaining Row Sets. The complete set of results for all the footprints are presented in FIG. 28.

Step 2d: Eliminate Gap in $R_{6B}$
Background
Step 2d builds off the results presented in Step 2c. This step demonstrates how to substantially eliminate any "Push" or "Pull" effect that occurs across a Row Set track. This section addresses situations where simply minimizing the gap cannot be tolerated. The foot print generated in Step 2c is used as the starting point. This section describes a tooth crown design capable of dealing with the gap issue.

The Process
Referring to FIG. 29(a), a partial side view of a Row Set is shown. In this illustrative embodiment, a row set is used consisting of alternating concave and convex teeth to support a tooth crown design strategy. FIG. 29(b) shows a partial top view of the two tracks that make up the gear set.

Before further describing the tooth crown embodiment, the previously introduced findings are reprised:
1. The inner circumference of $G_A$ and $G_B$ are always different in size. This is also true of the outer circumferences.
2. The length of the footprint that lies on the inner circumference of the Row Set can be equal in size.
3. Using a trapezoidal shape a footprint can be developed that eliminates any gap in the Row Set of the larger gear, in this case $G_A$.
4. Using the trapezoidal strategy alone cannot completely eliminate the gap that occurs in the smaller gear; i.e., $G_B$.

Accepting these findings, the next issue to be addressed is elimination of the gap in the smaller gear. The following solution is provided.

The solution begins by focusing on the inner circumference of a Row Set. FIG. 30(a) shows the teeth highlighted in FIG. 29. For purposes of disclosure, it is assumed that FIG. 30(a) shows the inner circumferences of $G_A$ and $G_B$ interacting with one another. As was shown in Section 2c, $ERR_6$ at the inner circumference is "zero". It is "zero" that the circular pitch (CP) of the Row Set is set to be the same at the inner circumference of the Row Set for both $G_A$ and $G_B$.

This demonstrates conventional gear tooth technology can be applied to satisfy the mating requirements at the inner circumference point of a Row Set. FIG. 30(b) illustrates this point. If $G_A$ is the pinion (the drive gear) and $G_B$ is the gear (the driven gear), Point 1 of tooth A2 and tooth B2 engage at the correct time as do Points 2 of both teeth. It can also be seen that Points 1 and 2 of A1 and B1 also engage substantially correctly at the appropriate time [0294] Gear technology informs if $CP_A$ and $CP_B$ are equal, the teeth will engage properly. $CP_A$ does equal $CP_B$ at the inner circumference by virtue of making them equal. FIG. 33(c) shows that the gear teeth engage correctly when the the CP's of both gear heads are equal.

Moving from the inner circumference point to any other point between the inner and outer circumferences of a Row Track, $CP_A$ will always be different than $CP_B$. Furthermore, the farther the point moves between the inner and the outer circumferences, the greater the gap. (See FIG. 27). The larger gear always has a smaller CP than the smaller gear because the rate of change of the CP's is greater in the smaller gear. Therefore $CP_A$ will always be less than $CP_B$; i.e., $CP_A < CP_B$.

Attention is now drawn to the effect to the two gears when the CP's of both are different. As shown in FIG. 31(a), when $CP_B$ becomes greater than $CP_A$, the teeth of $G_B$ become more displaced from one another than the teeth in $G_A$. The difference is shown as $\Delta$.

FIG. 31(b) shows what happens to the relationship between two teeth when any $\Delta$ is introduced. FIG. 31(b) shows that if A2 and B2 are properly positioned, and the gears are allowed to continue to rotate, Point.1 of A1 reaches its proper position before Point.1 of B1. B1 must rotate some additional distance so that Point.1 of B1 can travel the distance $\Delta$ to get properly into position for the initial engagement. FIG. 31(c) shows that when $CP_A < CP_B$, the teeth of $CP_A$ attempt to engage too early.

FIG. 32 illustrates a solution to this problem. First, FIG. 32(a) introduces a few basic attributes of a gear tooth. The working depth of a tooth is composed of the addendum and dedendum. These two components represent the portions of the gear surfaces that must correctly interact between Points 1 and 2. The shape of the addendum and dedendum is critical in making this happen. The shape must be such that when Point1 of both gear teeth meet, interaction between Points 1 and 2 can be accomplished with no substantial slipping or sliding. The involute curve disclosed herein was developed to satisfy this need. The problem to be solved is to find a means to make Points 1 of both gear teeth come into contact at the right time so that the involute curve can properly perform its function. FIG. 32(b) illustrates the problem to be solved.

FIGS. 32(c) and 32(d) introduce two different solutions to this problem. FIG. 32(c) allows Point 1 of B1 to arrive late. This is accomplished by adjusting the tooth geometry of B1 to force it to accept Point 1 of A1 when Point 1 of A1 is ready. This move increases the lateral movement of the addendum and dedendum to whatever value is needed. This solution also increases the pressure angle which may be considered to be an undesirable characteristic. But the degree to which the pressure angle changes can be controlled. This first solution appears to produce the most desirable results.

FIG. 32(d) illustrates a second solution to the gap problem. This approach permits increasing the working depth of the gear teeth at the same pressure angle. Due to the working pressure angles of typical gears, this solution may be more desirable for small $\Delta$'s, as the ratio of required working depth to $\Delta$ is higher than that of the first solution presented. The most advantageous solution may involve a combination of the two solutions. One approach is to use Solution #1 to begin the adjustment process, then incorporate Solution #2 to address higher portions of any large $\Delta$ value.

Figure 33:
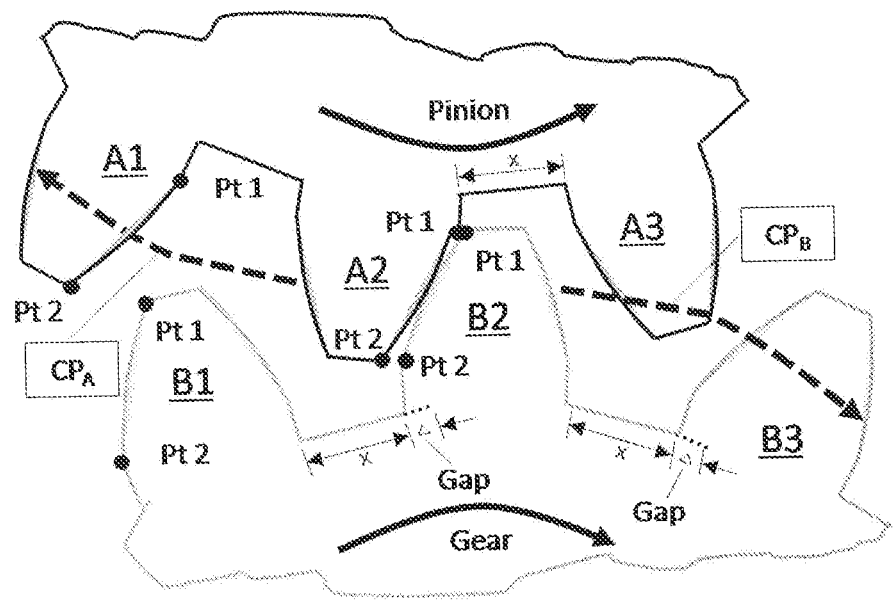
FIG. 33 demonstrates one solution to resolve the gap issue according to one embodiment of the disclosure.

FIG. 33 demonstrates how the application of the first solution; i.e., how the pressure angle adjustment solution works. It should be noted that the width of the gear tooth of the interacting gears at Point1 is reduced by, while the width of the interacting gears is increased by, $\Delta$. This increases the length of the addendum and dedendum while keeping the working depth constant. This change can only be achieved by changing the pressure angle.

Gear interaction have thus far been described using two types of 2-D geometries, the first addressing the inner circumference, and the second addressing all other points between the inner and outer circumference including the outer circumference. Elsewhere in this disclosure, these 2-D sections have been referred to as laminates. A laminate represents a 2-D cross-section of the curvilinear gear that has no width.

Step 3: Create Crown Tooth Geometry

Figure 34:
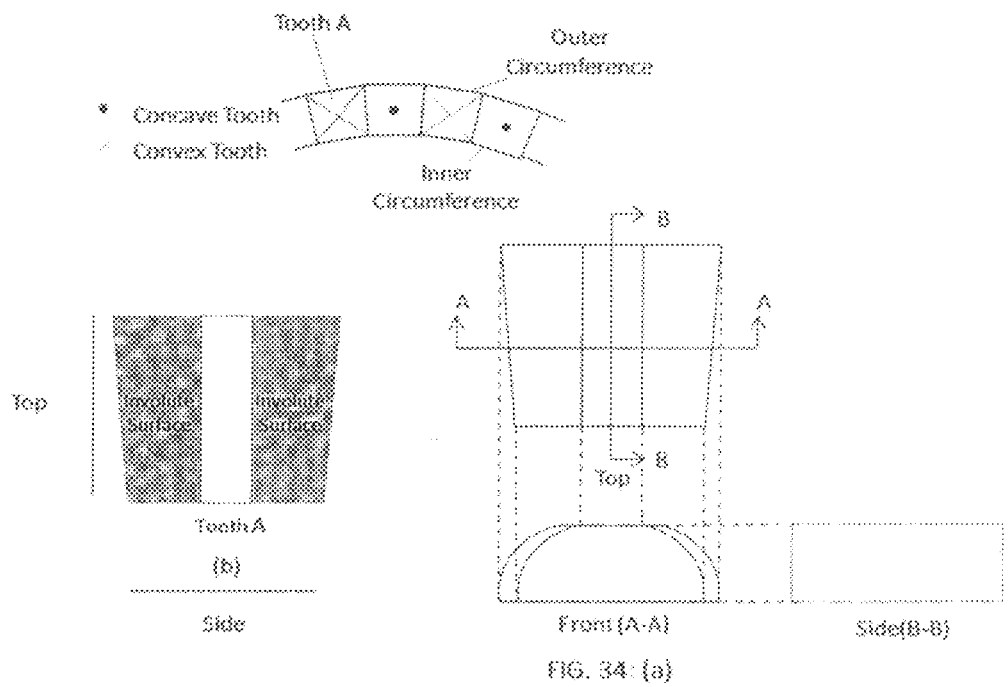
Figure 34:
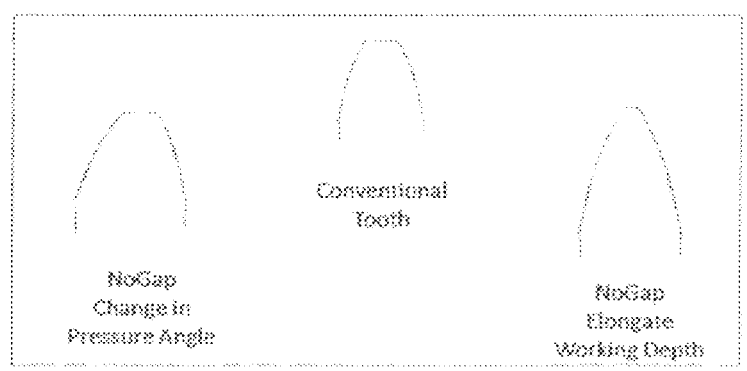

FIG. 34 summarizes the disclosed solutions and adds a 3-D representation of the tooth crown design concept. FIG. 34(a) illustrates a general definition of a top, front, and side view of a crown tooth design concept using a spherical profile. FIG. 34(b) illustrates how the profile can take on the shape of a conventional tooth, or some general polynomial as expressed in both of the NoGap concepts described herein. Specifically, the crown design concept can accommodate any cross-section polynomial, which covers every known embodiment.

1.2.5 Advantageous Aspects of Curvilinear Gears

An important advantage of a curvilinear gear set is its ability to perform the same function as multiple gear assemblies such as those found in a drive train or automobile transmission using a direct drive mechanism. One set of curvilinear gears can continuously change torque, speed, and direction in both high and low torque applications.

For high torque applications, intermeshing or interlocking structures, such as gear teeth, are required to efficiently deliver the force from one gear to another.

1.2.6 Additional Novel Functional Aspects

Additional innovations derived from the curvilinear gear head and gear set concepts include improvements to the flat gear, the arc gear set, the convex gear, and the curvilinear U Joint. Each is described below.

1.2.6.1 Flat Gear

Figure 35:
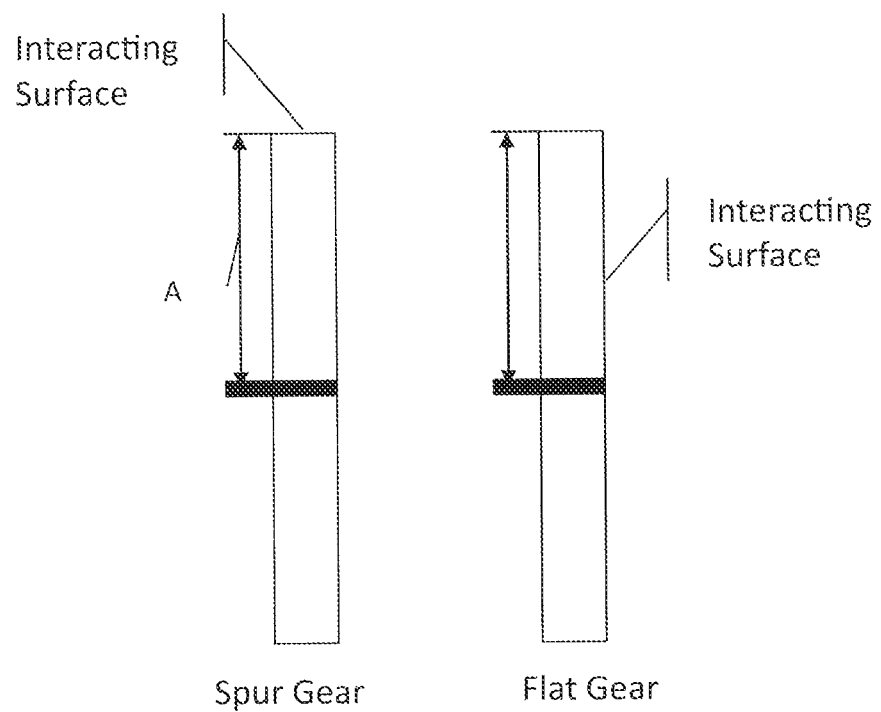
FIG. 35 shows a comparison of a conventional spur gear and a curvilinear flat gear according to one embodiment of the disclosure.

In another aspect of the invention, a flat gear is provided that interacts with one or more other curvilinear gears. FIG. 35 illustrates the basic geometry of a flat gear. Its geometry is very similar to that of a conventional spur gear, but there is a difference. The interacting surface of a spur gear is on the outer (or inner) diameter of the gear head, whereas the interacting surface of a flat gear is on the face of the gear head.

Figure 36:
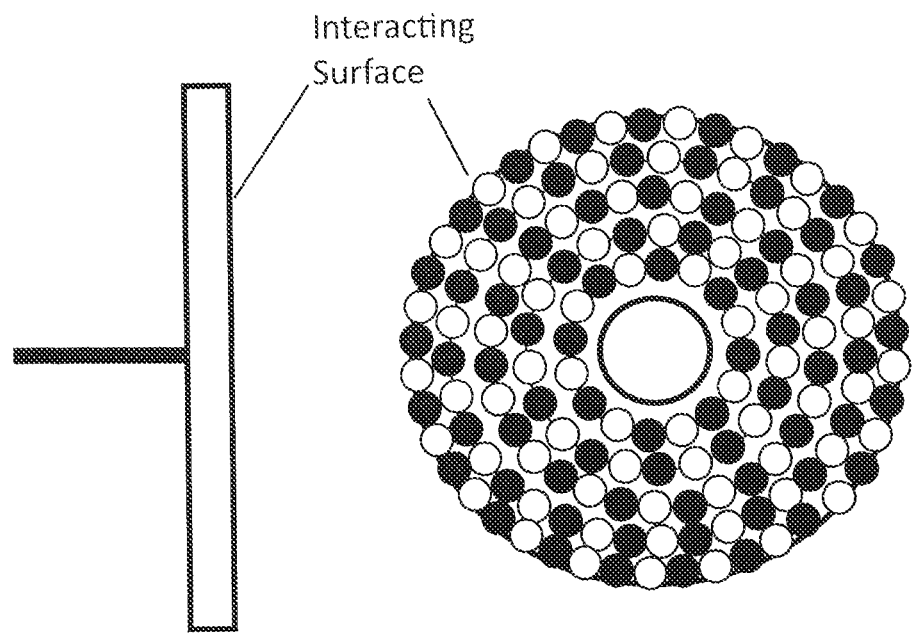
FIG. 36 shows a side and front profile of a curvilinear flat gear according to one embodiment of the disclosure.

A more accurate representation of a flat gear is shown in FIG. 36. A key feature is that the interacting surface is not on the outer circumference of the gear, but rather on the face of the gear. To operate like a conventional gear requires some physical means of turning the head about an axis of rotation. This is accomplished by attaching a shaft to the flat side horizontal center of each gear head in a manner similar to the way shafts are used with conventional gears. Either teeth or splines can be used as the physical interactive mechanism.

Figure 1:
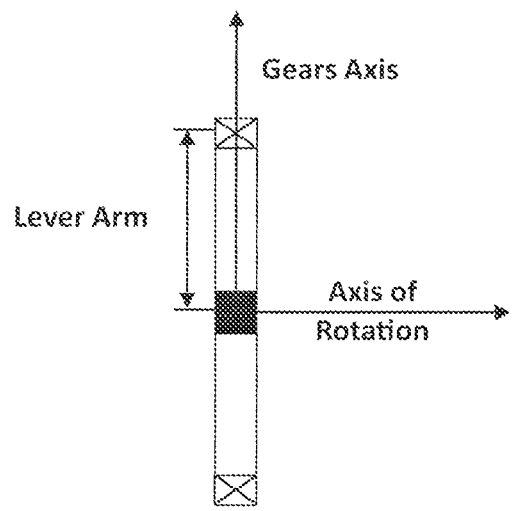
FIG. 1 is a diagrammatic representation of gear axes.
Figure 2:
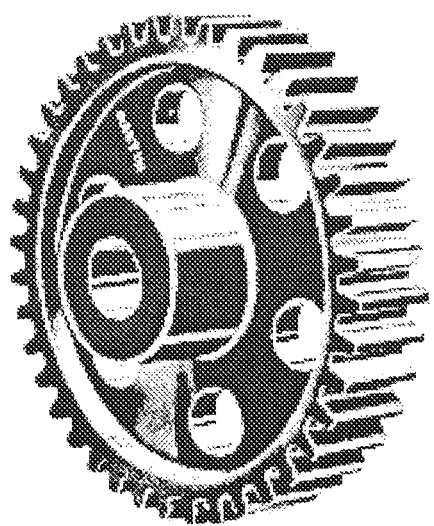
FIG. 2 is a perspective view of a prior art spur gear.

FIG. 1 sets the local coordinate system that will be used to further discuss these gears. Again, the axis shown running horizontally through the shaft will be referred to as the axis of rotation. The axis running perpendicular to axis of rotation along the flat side of the gear will be referred to as the gear head axis. The point of interaction is measured from the Gear Head Axis counterclockwise, so the axis shown in FIG. 1 is at the 0° position.

Figure 37:
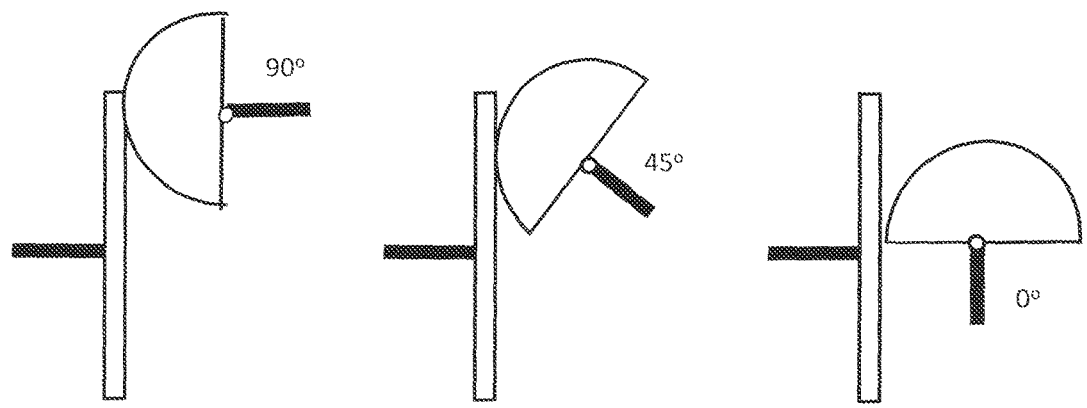
FIG. 37 shows a series of flat gear interactions with a hemispherical gear according to one embodiment of the disclosure.

The flat gear is intended to be used with a curvilinear gear. FIG. 37 illustrates how a flat gear interacts with a hemispherical gear. It should also be noted that the angle of the flat gear remains fixed as the other gear, the hemispherical gear in this case, rotates from 0° to 90°. The length of the lever arm changes as the hemispherical gear rotates up and down the radius of the flat gear. This characteristic has some positive implications as described below.

As stated, the purpose of the gear head interaction is to have the input gear transfer its force and speed to the output gear at the point of interaction. The gear heads can interact with each other using friction, or some sort of interlocking mechanism.

Friction surfaces are ideal from a geometric point of view, because there is no need to worry about the geometric shape of the particles that are actually interacting. Friction surfaces are limited, however, to the amount of torque they can support, and the choices of a friction surface for a particular application are well known in the art.

1.2.6.2 Arc Gear

The arc gear is a gear head that permits the operational angle to be changed for the same arc length. One form of this gear type is a hemispherical arc. Embodiment 1 Variation 3 in FIG. 10 shows one embodiment of this gear set type, while Embodiment 2 Variation 3 shows a second embodiment. The smaller the arc angle, the smaller the operational pivot angle. This feature results in decreasing the operational space requirements and less pivot movement. This feature also makes it easier to engage the physical interlocking mechanism.

1.2.6.3 Convex Gear

Figure 38:
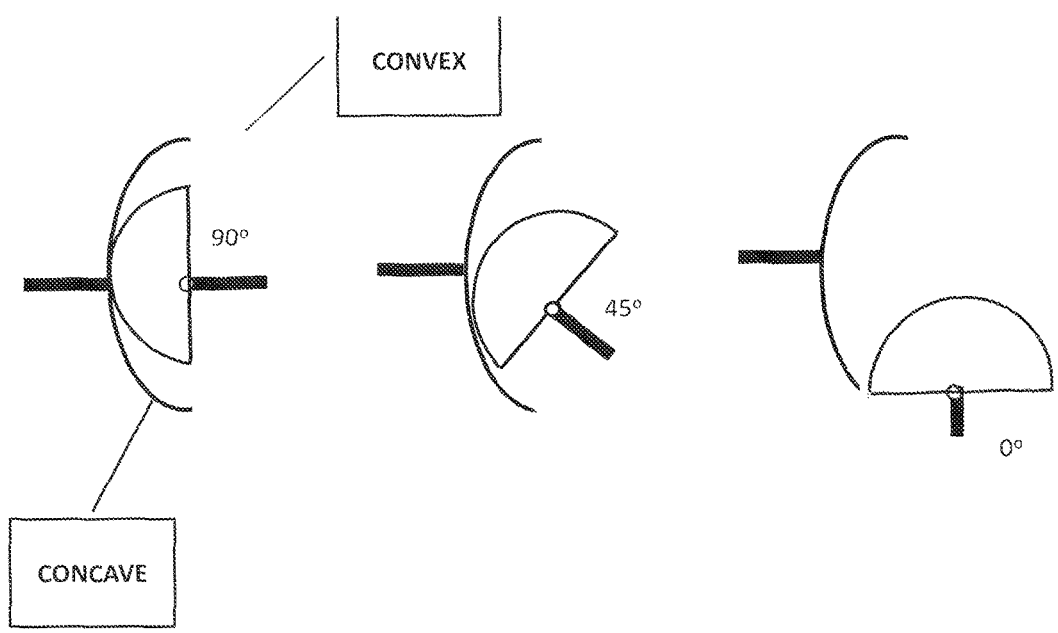
FIG. 38 shows a hemispherical gear head interacting with a concave gear head according to one embodiment of the disclosure.

The concept similar to the flat gear is the Convex Gear. An illustration of this gear type is shown in FIG. 38

1.2.6.4 Curvilinear U Joint

By combining two split gear heads of equal size increases both the functionality and performance of Hooke's concept of a universal joint. Hooke's concept is shown in FIG. 39, and the split gear set universal joint is shown in FIG. 12 (Embodiment 2/Variation 1). The following is a detailed description of the curvilinear U joint.

2. Curvilinear U Joint

In a yet further aspect of the invention, a curvilinear U joint is provided that is geometrically different than conventional U Joints, and offers new characteristics; one being that the allowable angular range of motion is 180°. The Curvilinear U Joint is completely compatible with the Cardan style Curvilinear U Joint and is intended to replace this previous type of U Joint.

Figure 40:
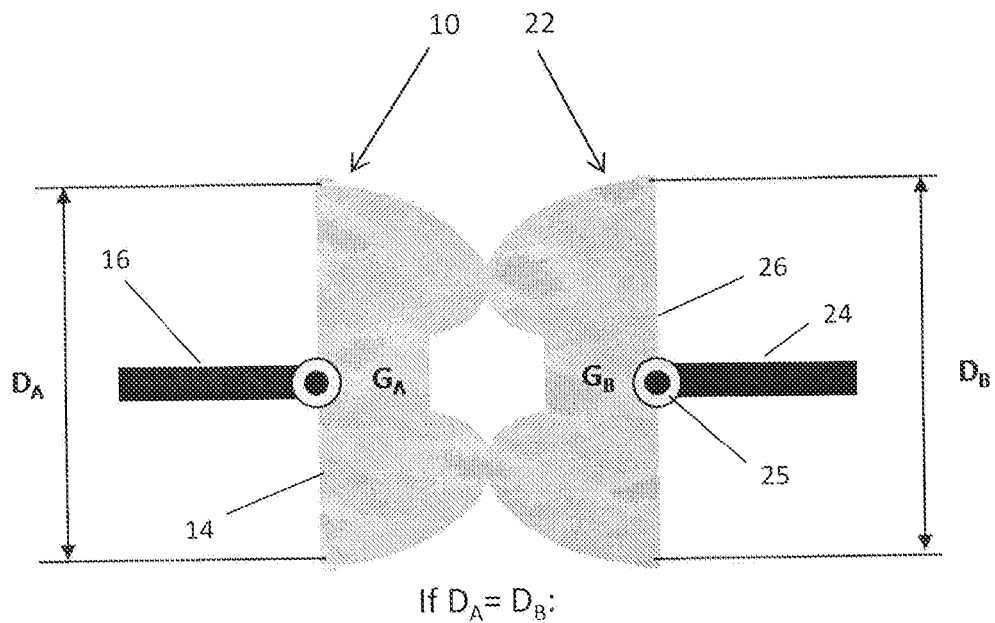
FIG. 40 shows a curvilinear universal joint according to one embodiment of the disclosure.

To give perspective to the curvilinear gear set embodiment, reference is made to FIG. 40. The two gear heads, a shown, are equal in size, the geometries are identical, and the interacting surface of $G_A$ is a mirror image of the surface of $G_B$. This arrangement transfers the same torque and angular velocity from one point in 3-D space to any other point in 3-D space. Referring to FIG. 12, it can be seen that the curvilinear U Joint represents Variation 2 of Embodiment 2.

In contrast, FIGS. 10 and 18 show a curvilinear gear set in which the diameter of $G_A$ is larger than the diameter of $G_B$. If the geometry of the interacting surfaces remains unchanged, the properties of the resulting curvilinear gear set take on the properties of a conventional gear set with one exception—the curvilinear gear set can continuously change its gear ratio between two limits.

In this embodiment, the interactive portions of the two gear heads are equal in size and the geometries are identical. For purposes of this description, the curvilinear gear heads have physical interlocking surfaces wherein the interacting surface of $G_A$ is the exact opposite of the interactive surface of $G_B$. Such an arrangement can be used to change the torque and angular velocity from one set of values to another. Again, the difference between the curvilinear gear set and a conventional gear set is that the gear ratio can continuously change between two established limits.

The following three considerations will be discussed with respect to the curvilinear U Joint: 1) the differences between the curvilinear U Joint and conventional U Joints, 2) gear head design, and 3) the packaging and operational characteristics of three different curvilinear U Joint embodiments. Further with respect to the curvilinear U-joints, four considerations for their construction and function will be described: 1) gear head design and the mechanism used to interlock interfacing gear heads, 2) the harness structure used to maintain the gear heads in contact, 3) a system to monitor torque and angular velocity, and 4) a power source to drive the U-joint. Each segment of the U-joint contributes to the overall function.

2.1 Curvilinear U Joint Vs Conventional U Joints

The American Heritage Dictionary states that a universal joint is: "A joint, or coupling, that allows parts of a machine not in line with each other limited freedom of movement in any direction while transmitting rotary motion."

Figure 41:
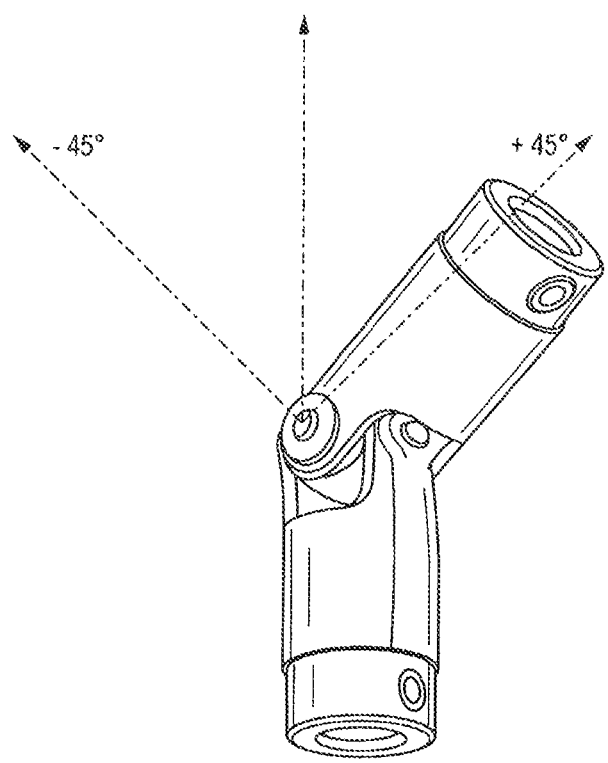
FIG. 41 shows a prior art universal joint.

Although there is debate over the actual origin of the universal joint, some claim that the standard Cardan-style Universal Joint was invented in 1676 by Robert Hook, and that the basic design concept has not changed over the years. Hook's concept is illustrated in FIG. 39. FIG. 41 shows a standard Cardan-style U Joint available in today's market. It should be noted that most standard U Joints have a maximum angle of operation that is somewhere between about 20° to about 45°. As a matter of fact, most transmit power between 5 ft-lb to 11 million ft-lb in a 15° or less offset angle.

Figure 42:
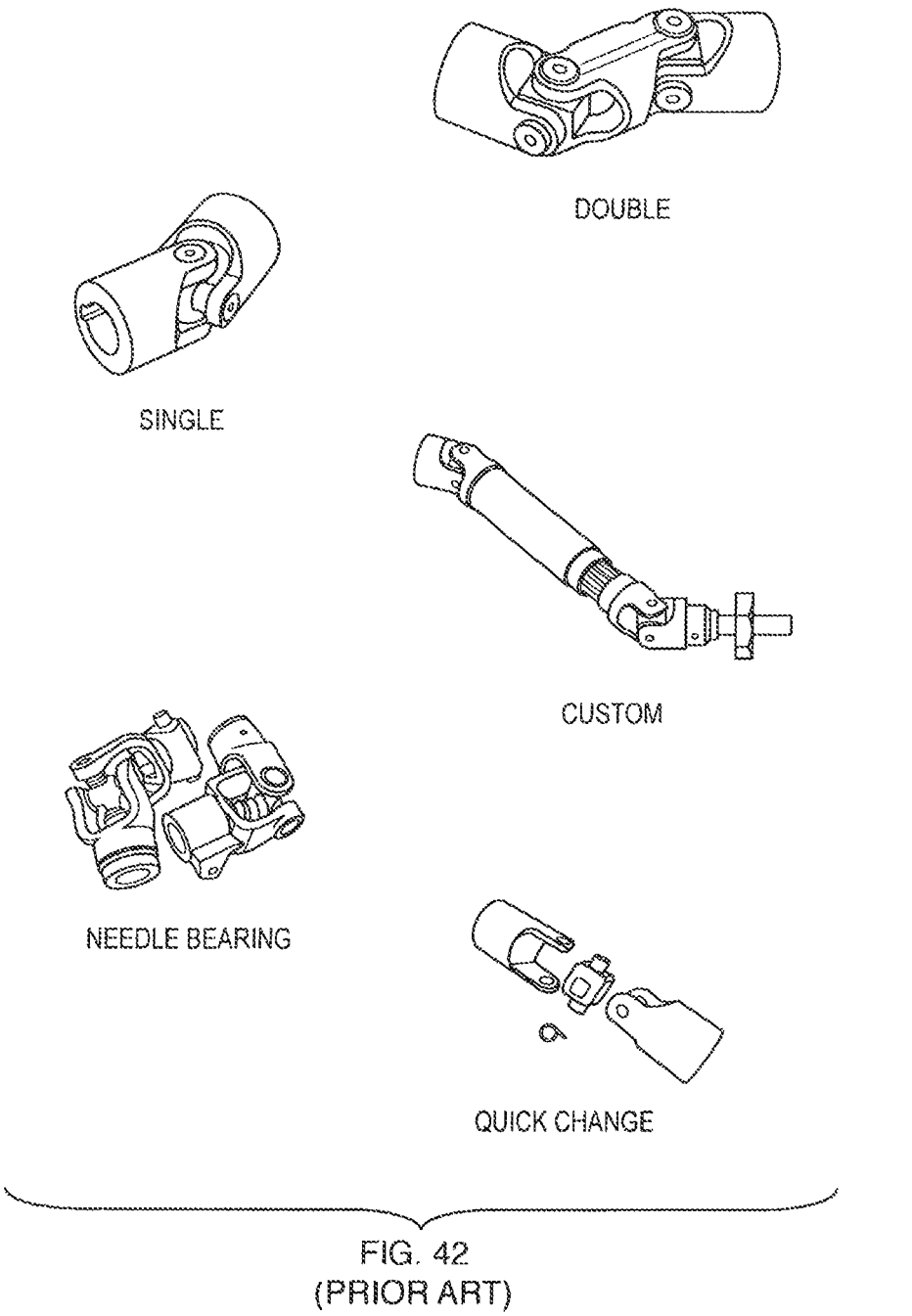
FIG. 42 shows various prior art universal joint configurations.

Other types of U Joints have evolved over time to address specific applications. Some of these are illustrated in FIG. 42. For example, the double U Joint is used to increase the angular range of operation if needed. The Telescopic/Quick Change U Joints support needs where ease of maintenance is important. Other types exist that have not been cited for purposes of brevity, but all remain extensions of, and share features with, the basic Cardan-style U Joint.

Figure 43:
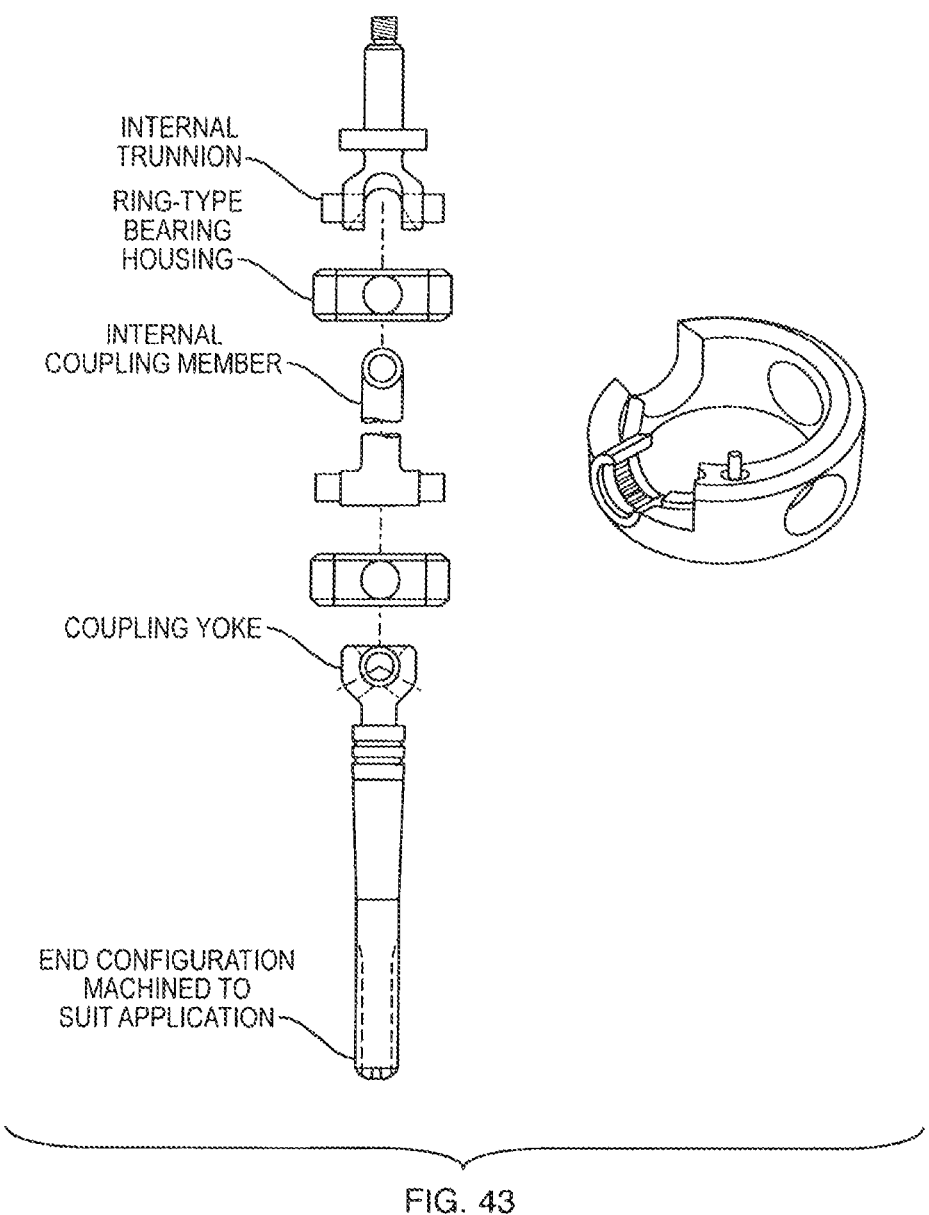
FIG. 43 shows another prior art universal joint.

Others appear to be searching for alternative designs to increase the operational angle of a Cardan-style U Joint. For example, a U Joint developed by the Apex Operation of Cooper Tools claims to have an angular operational range of 90° as shown in FIG. 43. This concept supposedly provides improvements that address the velocity and vibration issues currently encountered by contemporary U Joints that result from the basic design concept that produces a sinusoidal output at all angles. Ultimately, however, even this relatively new U Joint concept remains an extension of the Cardan-style concept introduced by Hooker.

The Curvilinear U Joint addresses problems of sinusoidal output, vibration, heat, and limited angular range currently experienced by conventional Cardan-style U Joints. The definition of a U Joint offered by the American Heritage Dictionary also applies to the Curvilinear U Joint. What is different between the Curvilinear U Joint and a more traditional U Joint is geometry and operating characteristics. Geometrically, the Curvilinear U Joint is not an extension of the Cardan-style concept; rather it is geometrically unique. This new geometry results in a simpler U Joint with fewer moving parts that has new and better operating characteristics, and possesses relatively greater strength.

Figure 44:
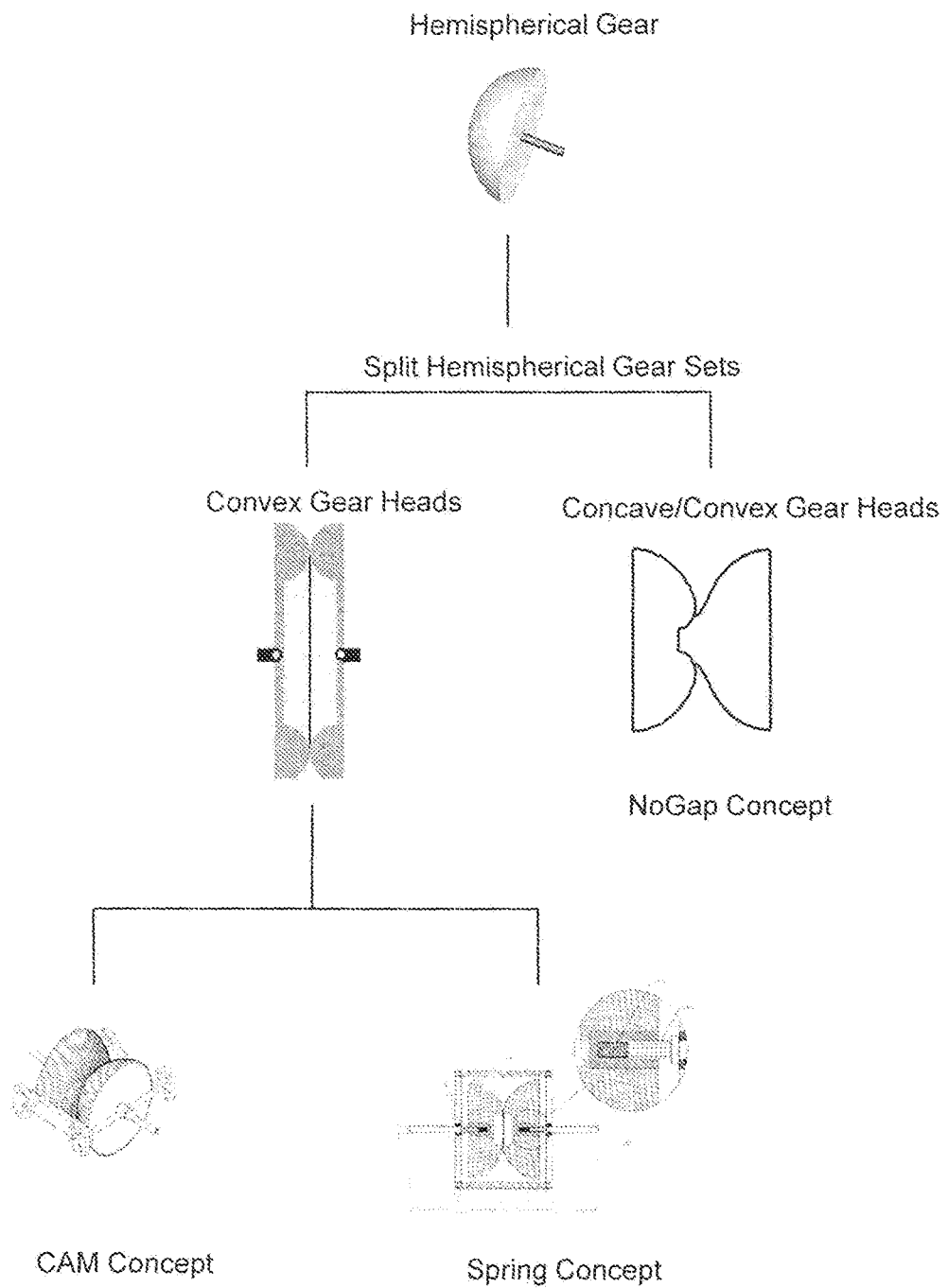
FIG. 44 shows curvilinear gear sets derived from different curvilinear gear configurations according to several embodiments of the disclosure.

FIG. 44 shows three illustrative embodiments of the Curvilinear U Joint disclosed herein. First, all three embodiments are derivatives of the hemispherical gear head. Other polynomial embodiments can be used, but the disclosed embodiments have been chosen to present the novel features of the invention. All three are further derivatives of the Split Hemispherical Gear Head embodiment (See Variation 2 of Embodiment 2 in FIG. 12) which has two variations, a convex gear head variation and a concave/convex variation. Both the spring embodiment and the CAM embodiment are versions of the convex gear head, while the NoGap concept is a version of the concave/convex variation.

2.2 Gear Head Design 2.2.1 Convex Gear Set

A key component of the Curvilinear U Joint is a Curvilinear gear head as described above. As explained, the curvilinear geometry of the gear head permits the point of interaction on a pair of gears to change continuously. This unique geometry and the unique functional characteristics associated with this geometry enables a Curvilinear U Joint to be constructed at any size so as to support a wider range of loads than conventional U Joints, and enables the Curvilinear U Joint to operate at +/−180°. Such an expansive operational range of motion is currently unattainable using conventional technology.

Figure 45:
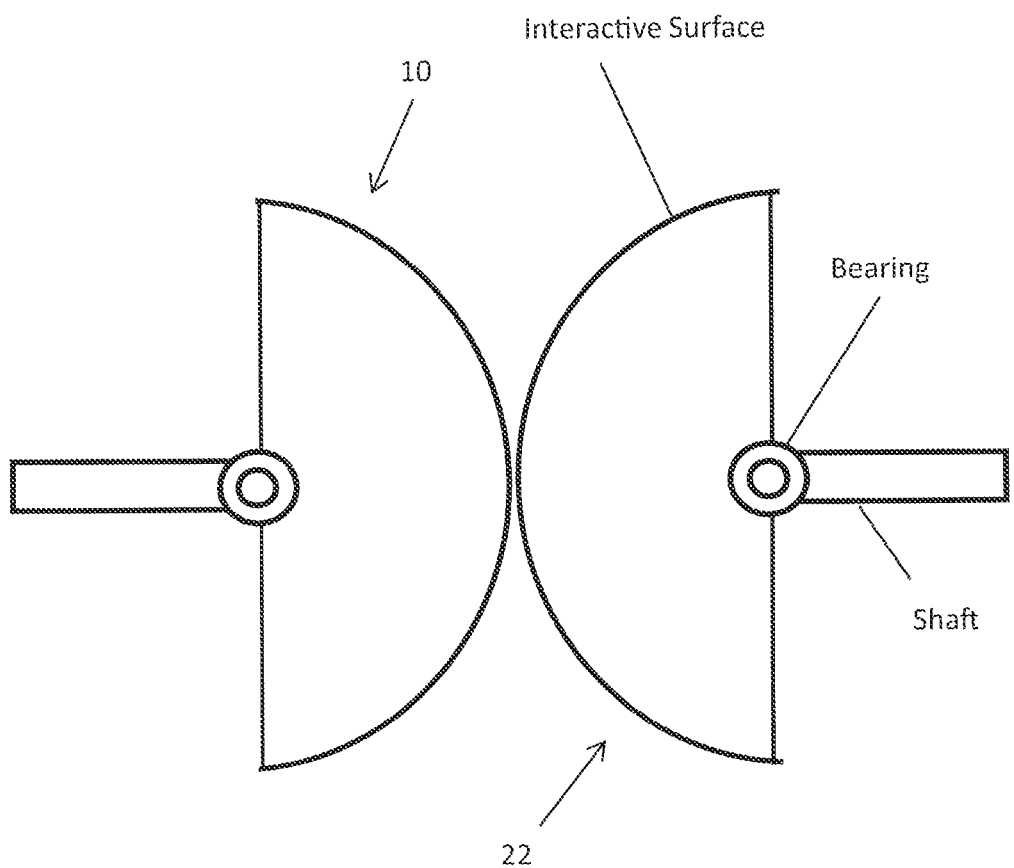
FIG. 45 shows a curvilinear U Joint according to one embodiment of the disclosure.

In one aspect of the disclosure, a Curvilinear U Joint is constructed with Curvilinear gear heads that have hemispherical shapes as shown in Variation 2 of Embodiment 2 in FIG. 12. The local coordinate system shown in FIG. 6 will be used to further describe the gear heads. As shown in FIG. 45, the basic components of the gears include a gear head as the interaction mechanism, a shaft to impart angular motion, and a bearing to permit the gear heads to rotate. As will be explained, using the curvilinear surface of the gear head is an important feature used to create a Curvilinear U Joint.

The ability to maintain contact between the heads of two hemispherical gears at any point on the hemispherical surfaces is important to creating an efficient U Joint that can be operated at any angle. The purpose of the gear head interaction is to have an input gear or pinion transfer its force and speed to an output gear at the point of interaction. Some gear head interaction options including, friction, splines, and teeth, as described herein, apply equally to gear heads employed in a Curvilinear U Joint application.

Figure 46:
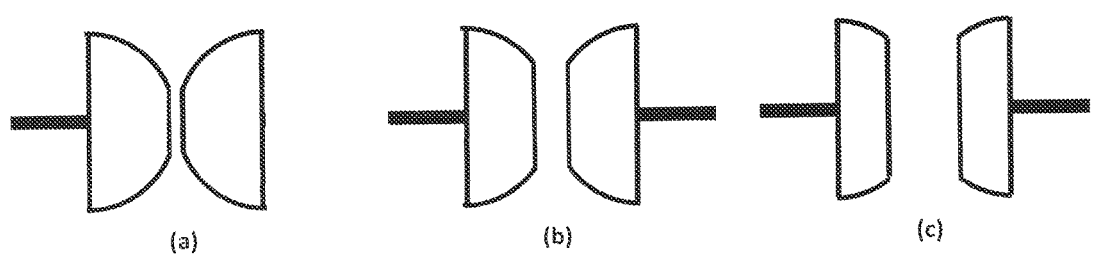
FIG. 46 is a sectional view of modified gear heads with three different modifications designated (a), (b) and (c) for a curvilinear U Joint system according to another embodiment of the disclosure.
Figure 47:
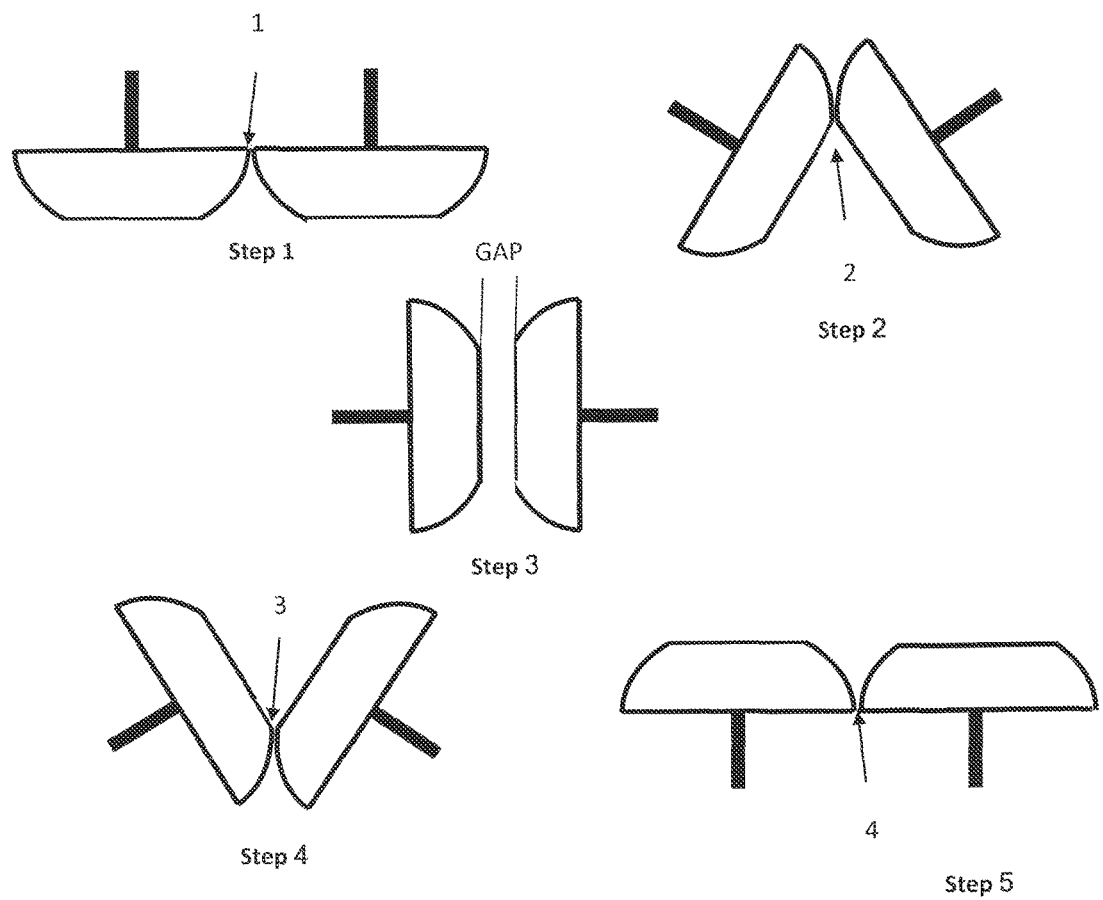
FIG. 47 is a sectional view of a curvilinear U Joint system with interacting modified curvilinear gear heads in different rotational orientations according to one embodiment of the disclosure.

When gear heads in a Curvilinear U Joint are positioned as shown in FIG. 46, a problem arises when taking into account the formula Torque (T)=Force (F)×Radius (R). When R=0 for any value of T, F goes to infinity. To prevent this, R cannot go to 0. One solution is to remove part of the hemispherical surface of the gear heads such as that shown in FIG. 46. For lower torque applications, the relatively small planar surface shown as (a) may be used. For higher torque applications, the larger planar surface of (c) may be used. The resulting planar surface has a radius, but creates a further problem when rotating the gear heads through their range of motion as shown in FIG. 47. A gap is created when rotating from step 2 to step 3 and from step 3 to step 4. These movements require the gear heads to physically move closer together whereas rotation from step 1 to step 2 and from step 4 to step 5 only requires the gear heads to move about their pivot points to maintain contact with each other.

One solution is to provide one or two gear head shafts that can move laterally about their axes. A telescopic shaft can be used for this purpose. The telescopic shaft can be lengthened and shortened with the use of an internal axial loaded spring to bias the gear heads against one another to maintain contact throughout their range of motion. Another option is to use a cam. The cam concept eliminates the need for a telescopic shaft. The cam concept allows the harness to expand or contract in order to maintain contact between the two gear heads. A further option is to use a combination of a biasing spring and a cam.

Figure 48:
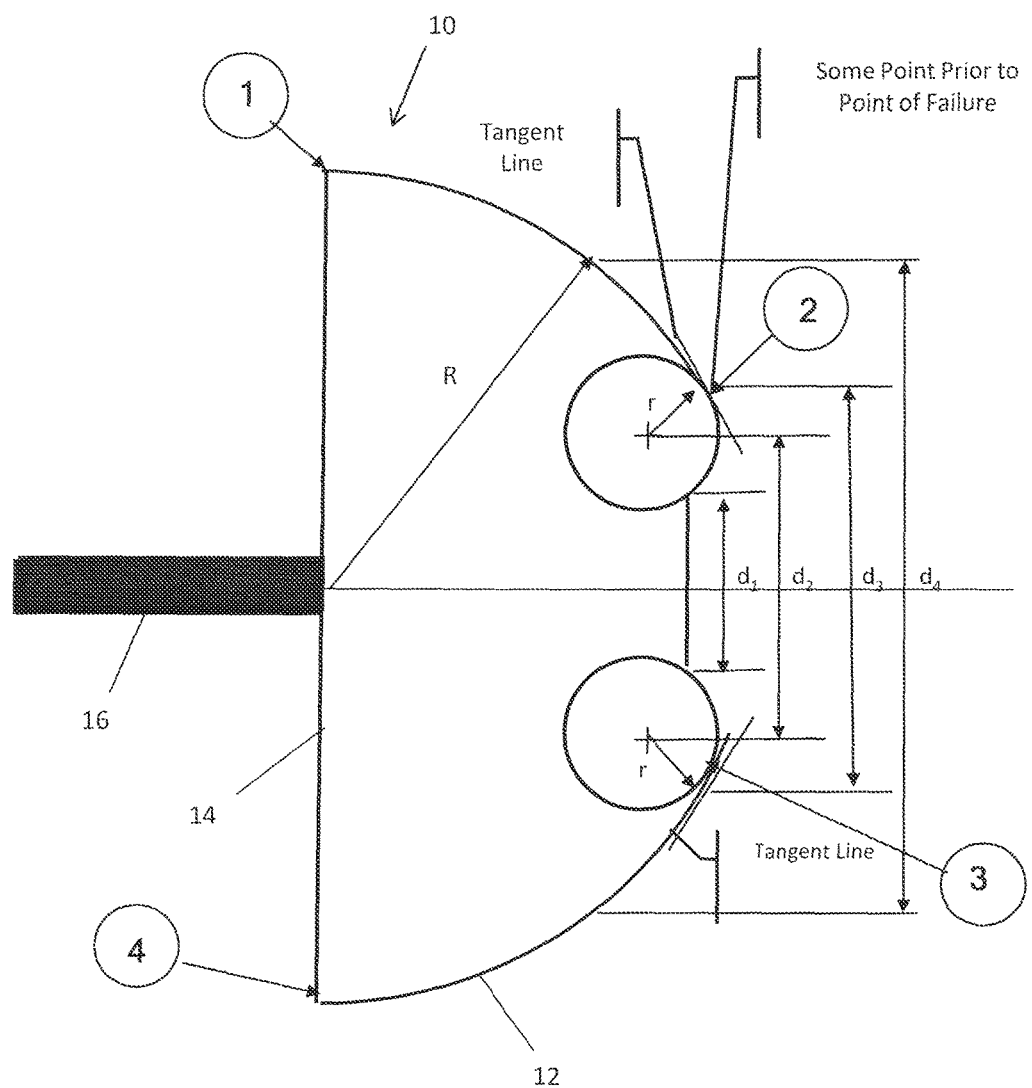
FIG. 48 is a sectional view of another modified curvilinear gear head for a curvilinear U Joint system according to further embodiment of the disclosure.

In a yet further aspect of the invention, a modified hemispherical gear head 10, shown in FIG. 48, is used to allow the lever arm to always have a value greater than "0". As shown in FIG. 48, points 1-4 correspond to the same points shown in FIG. 47. At point 2, where the curvature of the curvilinear gear head surface meets the planar surface, a sharp change in tangent angle results. A sharp edge formed from the transition between the curvilinear surface and the planar surface is undesirable to allow the gear heads to transition smoothly from one point interaction on the curvilinear surface to the planar surface. To address this, a radius "r" of the planar surface can be created that starts at the same tangent angle as radius "R" of the curvilinear surface.

The application of a radiused edge forms an indented planar surface having a diameter d1. The point where the curvilinear surface transitions to the radiused surface has a diameter d2. D1 can equal d2, but should not when the gear head is used to support a spline. D3 represents the diameter that must precede the point of tooth (or spline) shear failure and coincides with the tangent angle shared by "R" and "r". D4 represents one of multiple diameters that may be used to provide additional strength to the gear head and to provide the full operating range.

With this high load hemispherical U Joint gear head design, two interacting gears should be geometrically identical as shown in FIG. 49B. To determine the amount of gap between hemispherical gear heads, the following illustrative formula can be applied to the gear head shown in FIG. 49A. Example:

To make the calculation, R=4", r=1", theta 1=theta 2=60°, and theta 3=theta 4=30°.

$$L1 = (R-r)\cos 30° = 2.6"$$

$$L2 = R \cos 30° = 4 \times 0.866 = 3.46"$$

$$L3 = (R-r)\cos 30° + r = 3(0.866) = 3.6"$$

and $$d1 = ((R-r)\sin 30° - r) \ast 2 = (3(0.5) - 1) \ast 2 = 1"$$

$$d2 = ((R-r)\sin 30°) \ast 2 = 3"$$

$$d3 = R \sin 30° \ast 2 = 2 \ast 2 = 4"$$

and

GAP (PER GEAR HEAD)=R−L3=4"−3.6"=0.4"
TOTAL GAP=2*0.4"=0.8"

Figures 50A, 50B:
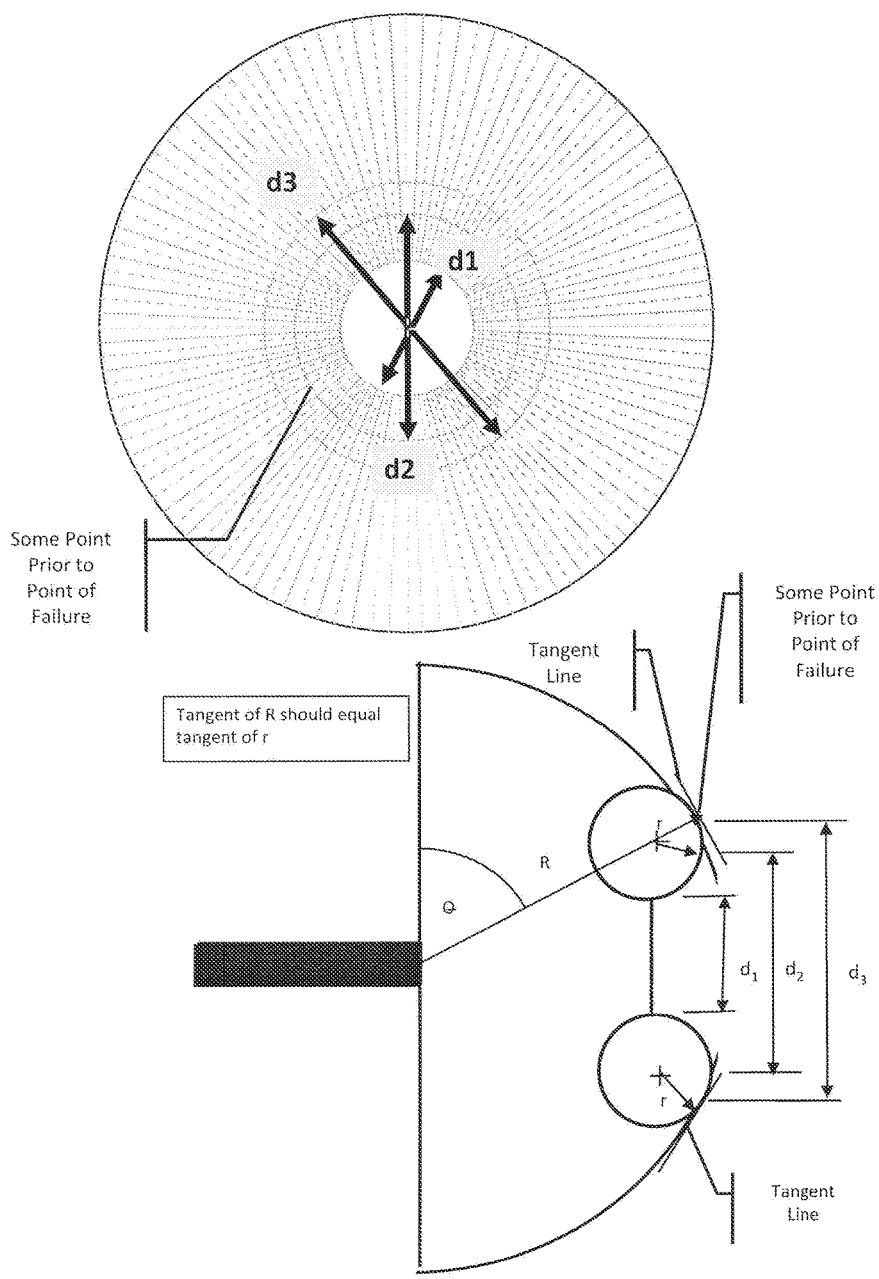
FIG. 50a shows sectional view of a spline system for a modified curvilinear gear head for curvilinear U Joint systems according to a further embodiment of the disclosure.
FIG. 50b shows a top view of a spline system for a modified curvilinear gear head for curvilinear U Joint systems according to a further embodiment of the disclosure.

In a high load application, some form of physical interaction is likely to be preferred. FIG. 50A illustrates one of several potential concepts; specifically, the spline concept described more fully below. There are other physical interaction concepts for dealing with high loads, for example tooth concepts as described herein.

Figure 51A:
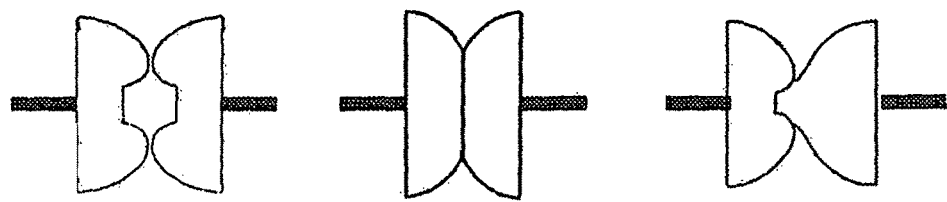
FIG. 51a shows three alternative gear head embodiments in cross section for curvilinear U Joint systems according to multiple embodiments of the disclosure including the NoGap embodiments.
Figure 51B:
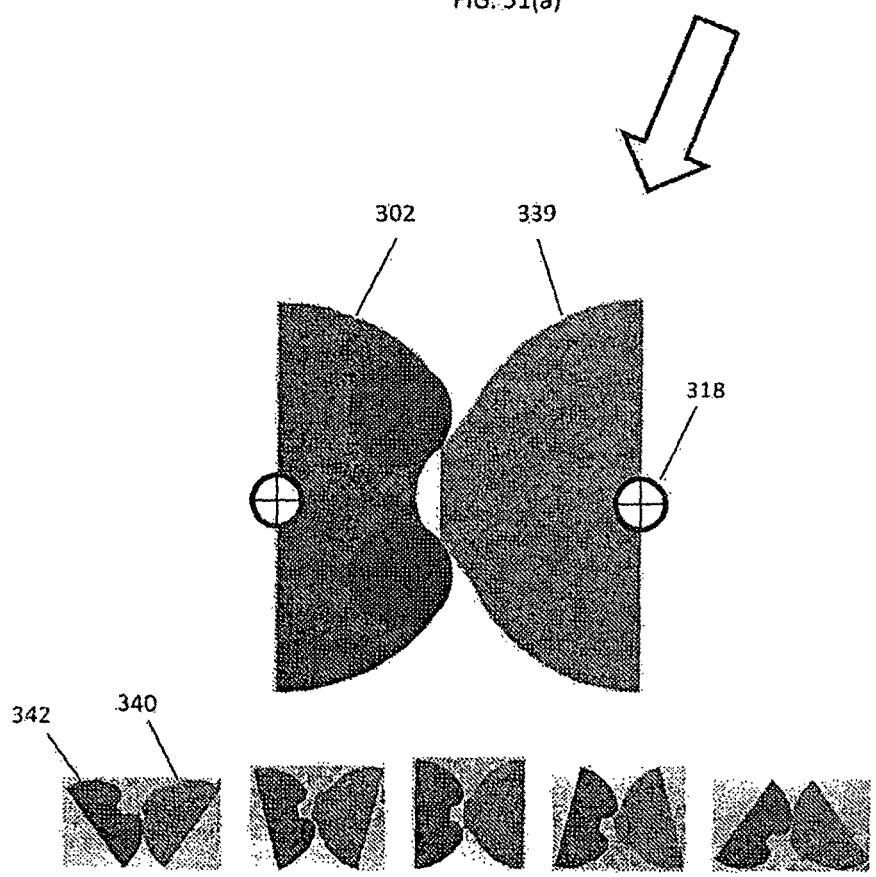
FIG. 51b shows the third alternative gear head embodiment in FIG. 51a in cross section for curvilinear U Joint systems according to one of the NoGap embodiments of the disclosure.

The basic design can be modified to accommodate high and low torque applications, and to support differences in friction and physically driven gear heads. Illustrative embodiments are shown in FIG. 51. For moderate to high torque applications the embodiment shown in FIG. 51(*a*) having a radiused transition between the curvilinear surface and the planar surface may be used with gears that physically interact with features such as gear teeth, or splines. For friction driven applications, the embodiment shown in FIG. 51(*b*) may be used. It should be noted that this embodiment may also support physically driven gear head configurations. The embodiment shown in FIG. 51(*c*) is the concave/convex gear head arrangement. It too, can be driven using friction, gear teeth, or splines.

Figure 49:
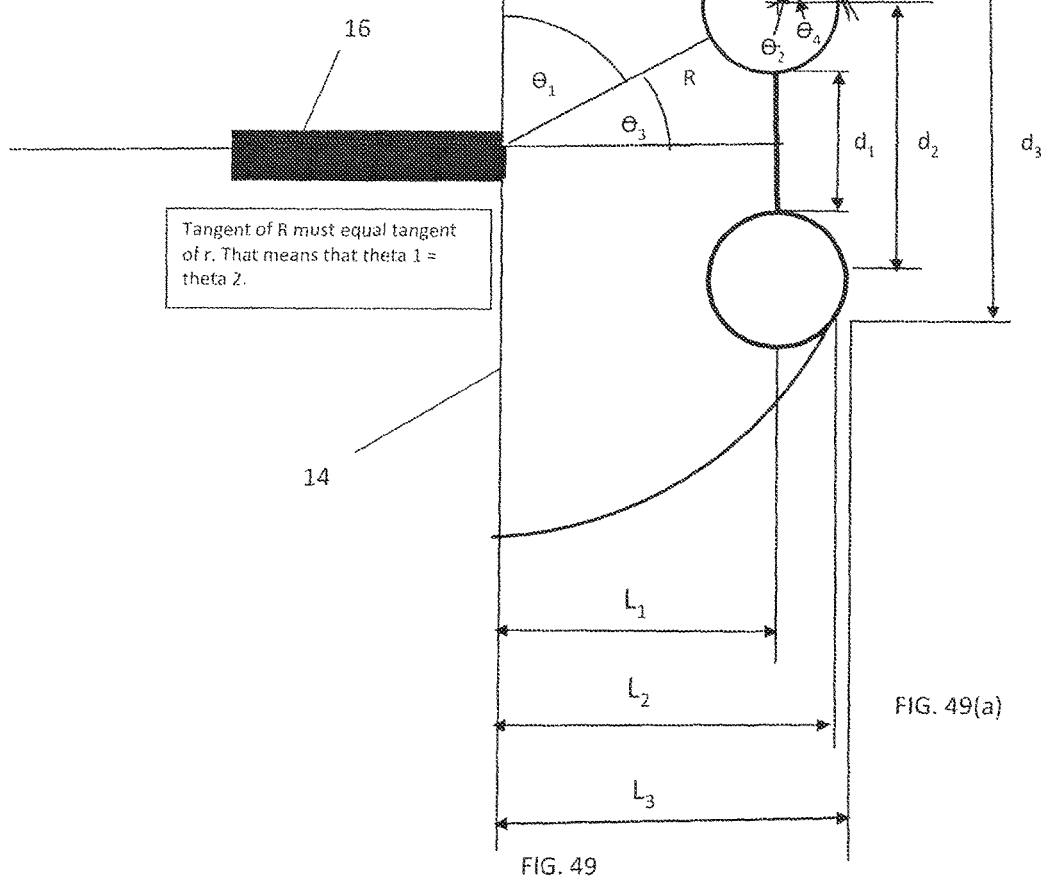
FIG. 49a shows a sectional view of a modified curvilinear gear head for a curvilinear U Joint according to a further embodiment of the disclosure.
FIG. 49b shows a curvilinear U-joint according to a further embodiment of the disclosure.

With respect to the low or friction load gear head, the only significant difference from the high load gear head is that L1 and d1 do not exist, and a friction surface replaces the physical interaction mechanism, such as splines. As shown in FIG. 49, a planar surface is formed without the radiused transition surface of the high load gear head. Like the high load gear head, interacting low load gear heads should be geometrically identical as shown in FIG. 52B. The same formula used to calculate the gap for the high load gear head is used to calculate the gap for the low load gear head.
Example:
Again, to make the calculation, it is assumed that R=4", r=1", theta 1=theta 2=60°, and theta 3=theta 4=30°.

$$L2 = R \cos 30° = 4 \times 0.866 = 3.46"$$

$$L3 = (R-r)\cos 30° + r = 3(0.866) = 3.6"$$

and $$d2 = ((R-r)\sin 30°) * 2 = 3"$$

$$d3 = R \sin 30° * 2 = 2*2 = 4"$$

and
GAP (PER GEAR HEAD)=R−L3=4"−3.6"=0.4"
TOTAL GAP=2*0.4"=0.8"

2.2.2 NoGap Gear Set

The embodiment shown in FIG. 51(*c*) includes one gear head having a radially-extended curvilinear projection and a second gear head having a cavity that physically corresponds to the radial projection. This embodiment eliminates the gap that occurs when using two unaltered hemispherical curvilinear gear heads. This enables the gear head pivot points to remain fixed without compromising the ability for the two gear heads to remain in contact throughout their operational range of motion.

Figure 53B:
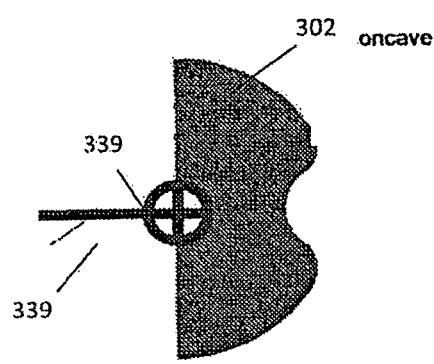
Figure 53A:
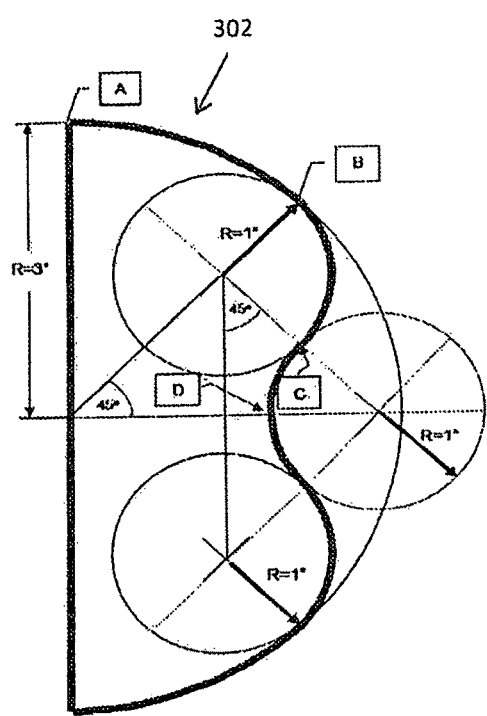

Referring now to FIG. 53, the geometry of the concave gear head 302 is described. Each half of the cross-sectional profile of the gear head comprises three arcs designated AB, BC, and CD. The arcs are shown for the upper half and have mirror images repeated in the bottom half. Arc AB is formed using the radius of the hemispherical gear head. Arc BC is formed using a radius 1/3 the length of the hemispherical radius in one embodiment. Arc CD is formed using the same radius as Arc BC and ends with a tangent line that is perpendicular to the axis of rotation. Arc CD creates a void, the surface of which does not interact with the surface of a corresponding convex gear head of a curvilinear U-joint.

The position of points A, B, C, and D are variable and dictated by the strength requirements of a particular application. Based on the equation F (Force)=T (Torque)/R (Lever Arm Length), the force increases as the length of the lever arm decreases. The cross section of a spline also decreases as the lever arm length decreases. This means that as the length of the lever arm decreases the probability of shear failure increases.

Arc AB does not produce a gap. Arc BC produces a gap between interfacing gear heads that must be addressed in order to have a functioning U-joint. As stated, Arc CD does not engage the surface of an interfacing gear head as shown in FIG. 51(*d*). The angle of rotation of gear head 302 relative to the convex gear head is +/−90°.

Figure 54:
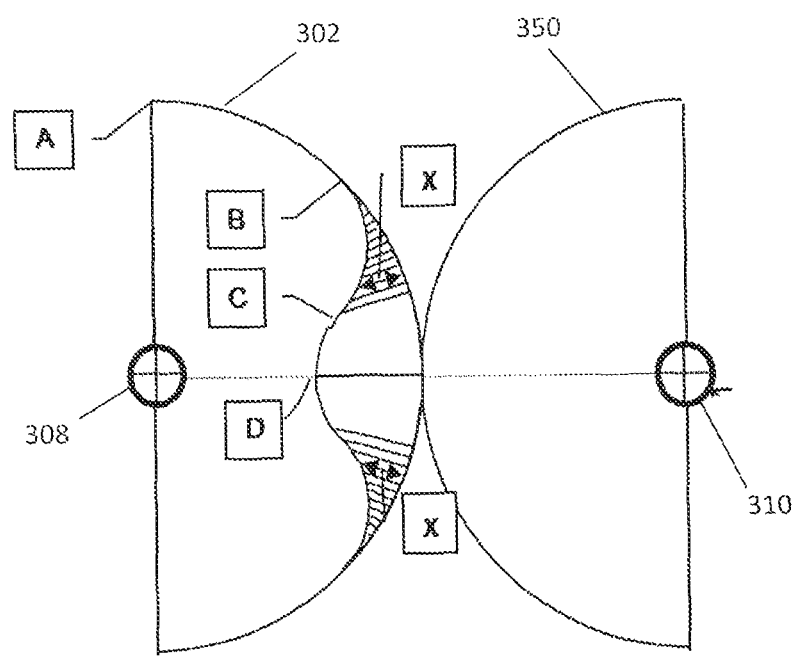
FIG. 54 shows the space in a concave head that must be filled by a projection of a convex head in a curvilinear gear system according to another embodiment of the disclosure.
Figure 55:
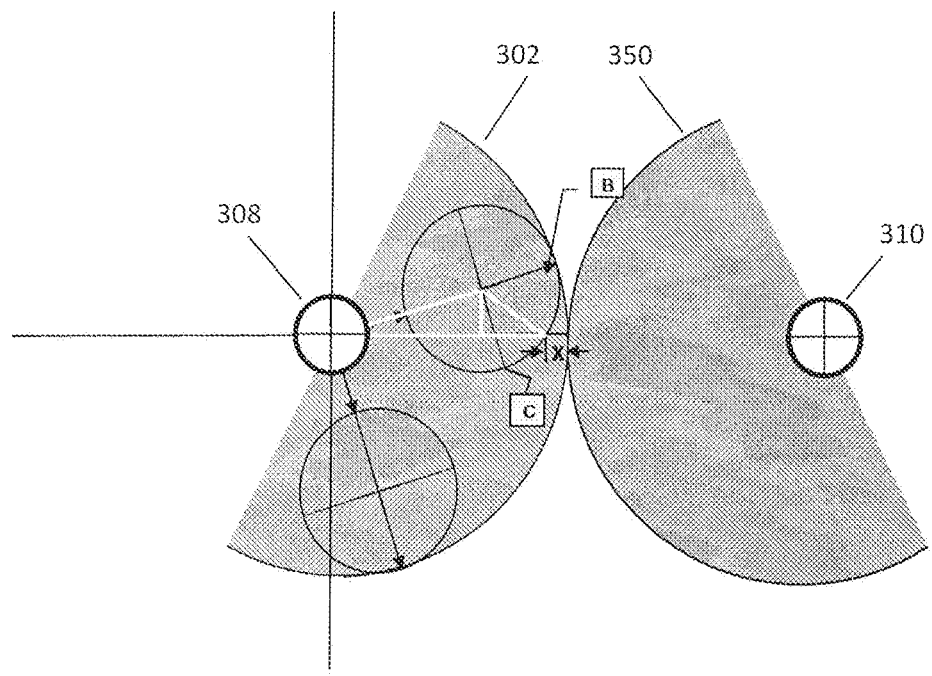
FIG. 55 shows the geometric parameters that can be used to compute the gap in the curvilinear gear system of FIG. 54.
Figure 56:
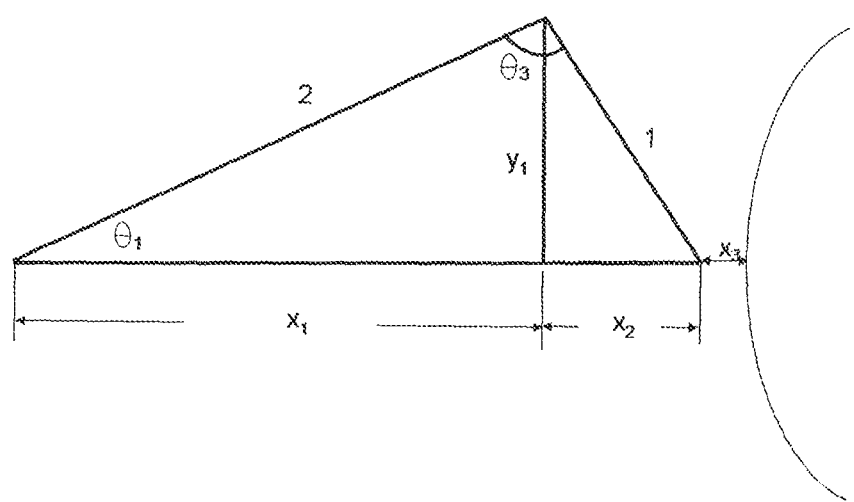
FIG. 56 illustrates the geometric details used to compute the gap for the curvilinear gear system of FIG. 54.

Referring to FIG. 54, construction of the concave gear head 302 results in the formation of a gap between gear head 302 and convex gear head 350. The gap, designated as "x" in the drawing, has to be accounted for in order for the gear heads to interact throughout their respective ranges of angular rotation so that torque and velocity can be transferred from one gear head to the other. FIG. 55 illustrates the geometric consideration (shown in exploded view in FIG. 56), compute the numeric value of "x. As illustrated in FIG. 56, when the complimentary gear heads pivot from pt. B to pt. C, the radius shown as $x_1+x_2$ decreases in size. To compensate for this change, the radius of the convex head must increase in size by the value of "x" to maintain contact between the two gear heads. The value of "x" can be computed as follows:

$$X_3 = 3 - (X_1 + X_2)$$

Where
3 is the radius from the axis of rotation of the concave gear head to Pt A
And $$X_1 = 2 * \cos \theta_1, \text{ and}$$

$$X_2 = (1 - Y_1^2)^{1/2}$$

Where $$x_1^2 + x_2^2 = x_3^2$$

Therefore:
$X_3 = 3 - (2*\cos \theta_1 - (1 - Y_1^2)^{1/2})$ over an angular range between Pt B and Pt C which is 26.6°.

Figure 57:
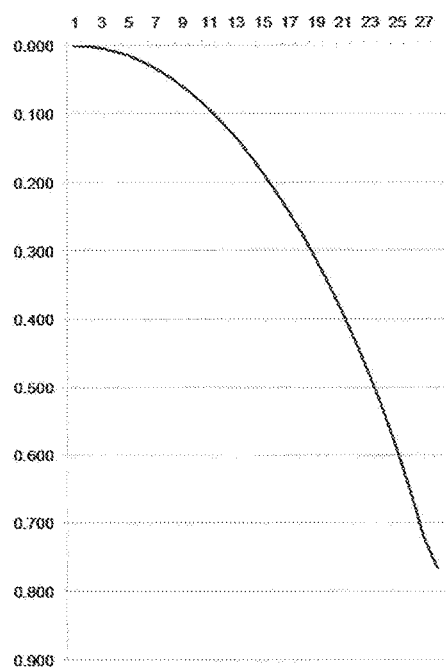
FIG. 57 shows the results of applying the gap calculations to the curvilinear gear system of FIG. 54.

It should be noted that when the radius from the pivot point to pt. B is in the horizontal position, the angle $\theta_1$ is zero and the angle $\theta_3$ is 180°. When the radius from the pivot point to pt. C is in the horizontal position, the angle $\theta_1$ equals 26.6°, which is the angle with a tangent of ½ or 0.5 because angle $\theta_3$ equals 90°. FIG. 57 shows the results of applying the equation over the range of 26.6°.

2.3 Spline

Figure 58A:
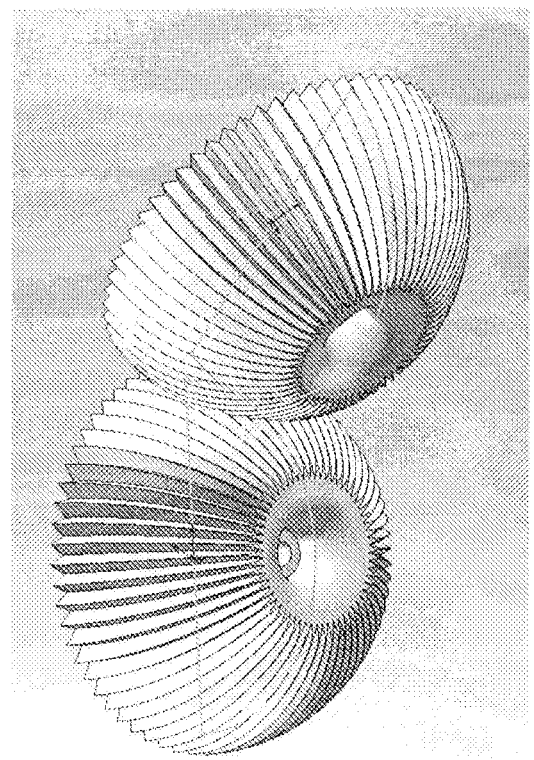
FIG. 58a is a perspective view of a spline configuration for a curvilinear U Joint according to an embodiment of the disclosure.
Figure 58B:
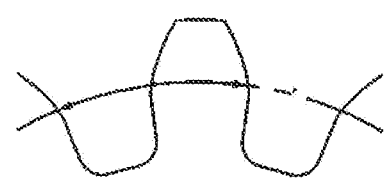

To create mechanical interlocking surfaces on the interacting gear heads for the CVT direct drive embodiment, a variety of options are available. Two are of particular relevance, splines and gear teeth. As shown in FIG. 58A, splines oriented in a latitudinal direction with equal numbers of splines on each gear head achieve the desired result. The width of each spline changes continuously from one end of the spline to the other with the narrowest width being at the gear head apex. The cross-section of each spline will have the shape of a typical gear tooth as shown in FIG. 58B.

This design concept results in the longitudinal cross-section of each gear head to take on the shape of a typical gear, e.g., a spur gear, of approximately zero thickness. FIG. 27 shows an example of such a cross-section. Each gear head can be considered to be comprised of an infinite number of near zero width gears of incrementally different diameters being laminated together to form the shape of a curvilinear gear head. A gear head with this configuration demonstrates smooth transition of torque and angular velocity from one gear head to another complimentary one.

Figure 58C:
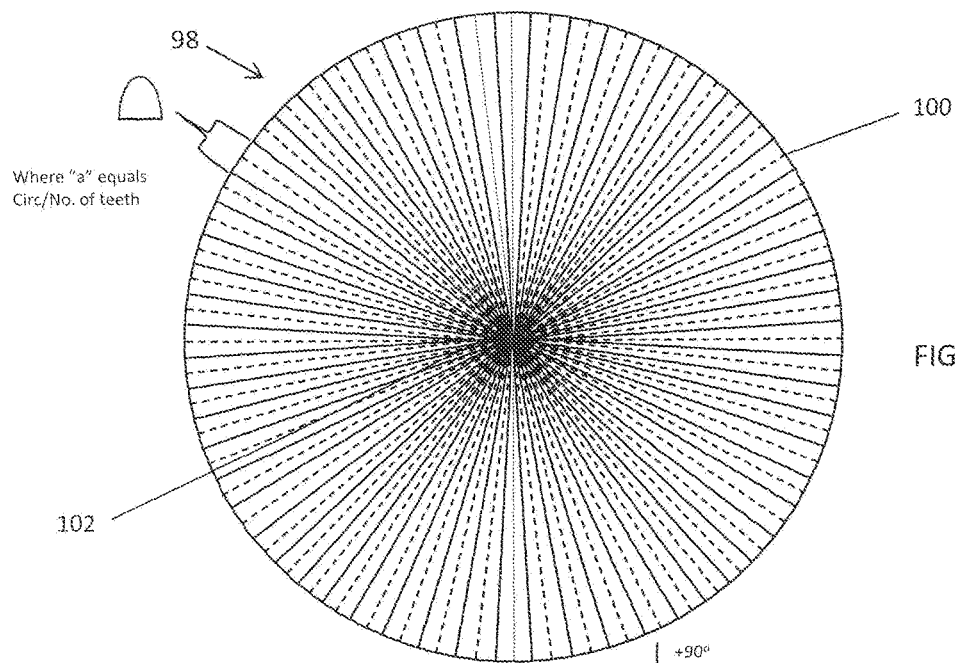
FIG. 58c is a top plan view of a spline embodiment for the surface of a curvilinear gear head used in curvilinear U Joint systems according to another embodiment of the disclosure.
Figure 58D:
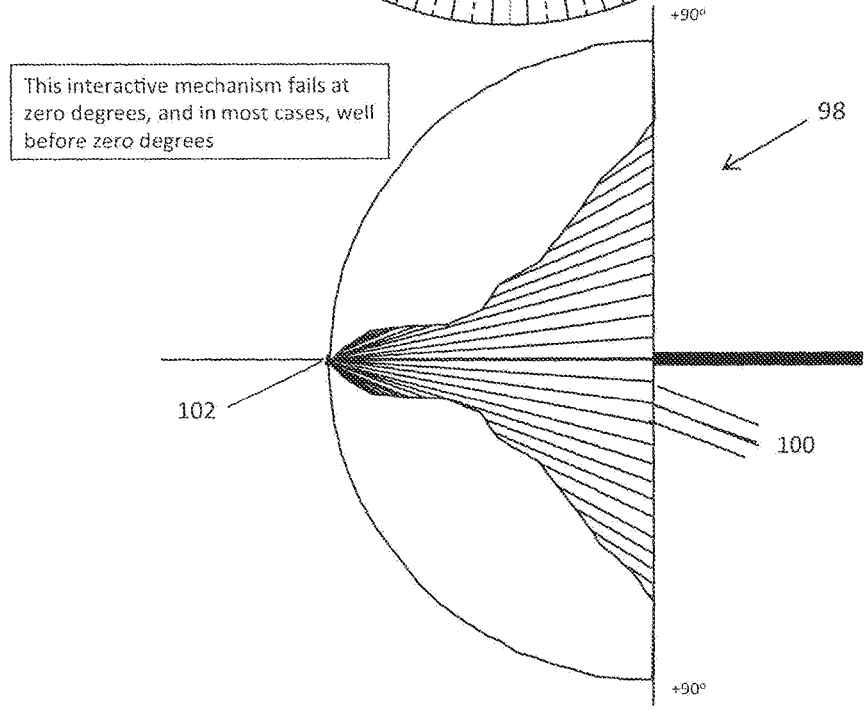
FIG. 58d shows a partial sectional view of the performance range of a spline embodiment for the surface of a curvilinear gear head used in curvilinear U Joint systems according to another embodiment of the disclosure.

In another aspect of the invention, as shown in FIGS. 58C and 58D, splines 100 are formed as radial arrays that extend from an outer diameter of gear head 98 to an apex 102. Illustratively, the cross-sectional shape of the spline can be configured in the form of conventional gear teeth, such as those formed on a spur gear and even helical and double helical gears. The cross-sectional shape may also take on some more general form, such as a semicircle, an ellipse or some other linear or polynomial form.

With respect to the use of splines as the physical interaction mechanism, as shown in FIG. 58D, the interactive mechanism fails at 0°, and in many embodiments, fails well before 0°. Modification of gear head 98 with a planar surface and radiused curvilinear/planar junction as shown in FIGS. 50A and 50B solves the problem at 0° with an unaltered hemispherical curvilinear gear head that includes splines. The problem is further resolved by introducing at least one involute surface on a gear head that interacts with gear head 98 such as curvilinear gear head 97 shown in FIG. 59D. The involute surface provides a smooth transition and consistent contact as the gear heads rotate through their angular ranges of rotation.

An important feature of the embodiment shown in FIG. 50A is the size of the teeth at d2. The size of teeth at d2 will be substantially smaller than the size of a tooth at the outer diameter "R". It is important to dimension the size of teeth at d2 to have the shear strength necessary for the particular application.

One way of increasing tooth strength in a particular diametral range is to decrease the number of teeth in that range. For example, the number of teeth used between d2 and d3 can be reduced to provide larger and stronger teeth. The number of teeth in the range between d2 and d1 can be further reduced to allow for larger stronger teeth that can withstand the expected shear forces.

2.4 Harness Options

Figure 59:
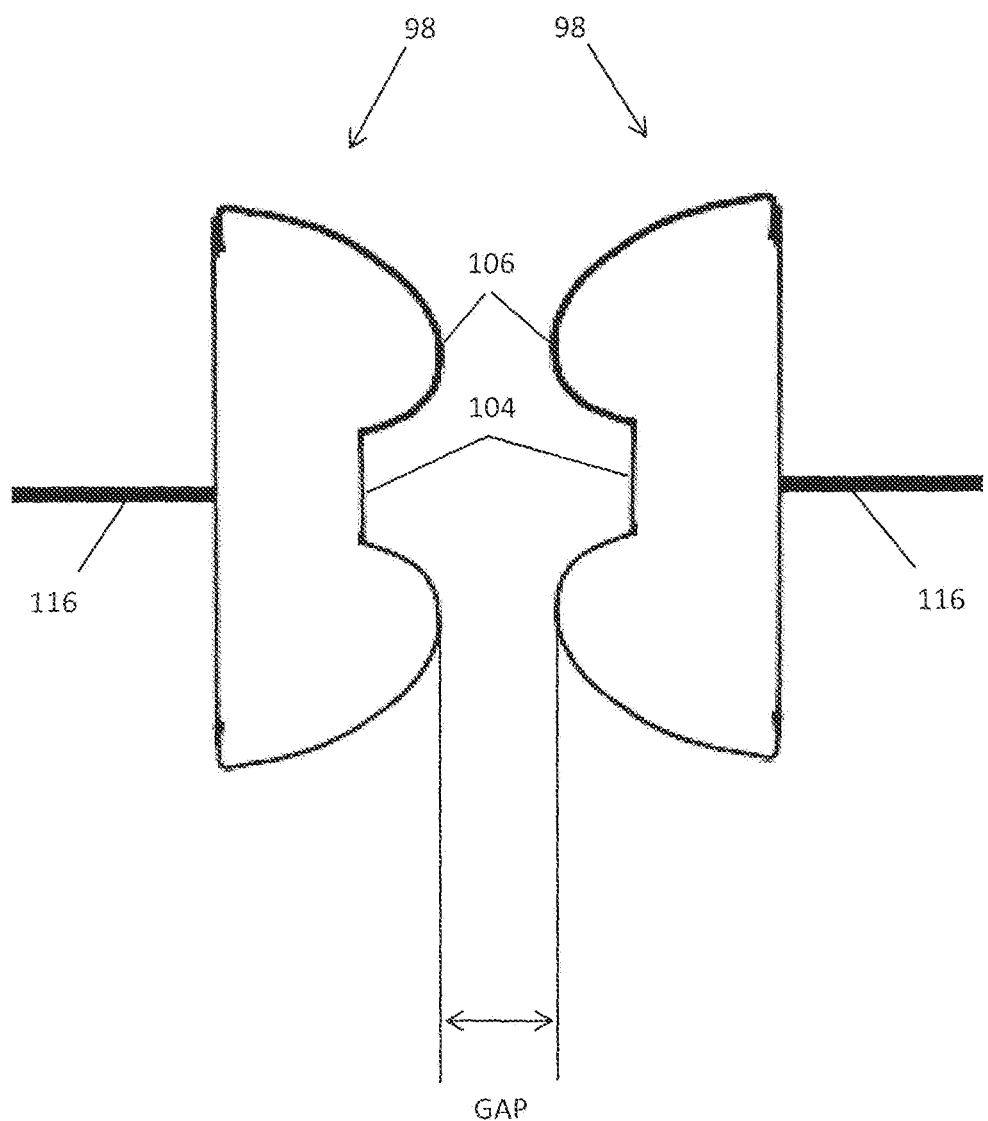
FIG. 59 shows a side sectional view of a curvilinear U Joint system with modified curvilinear gear heads according to a further embodiment of the disclosure.

Having described a curvilinear gear head with a planar surface having a radiused junction, attention is drawn to the gap that forms when two such gear heads interact and rotate about their pivot points as shown in FIG. 59. To close the gap and maintain gear head interaction, one of two illustrative solutions may be used, an extendible shaft spring system, or a cam system.

2.4.1 Spring System

Figure 60:
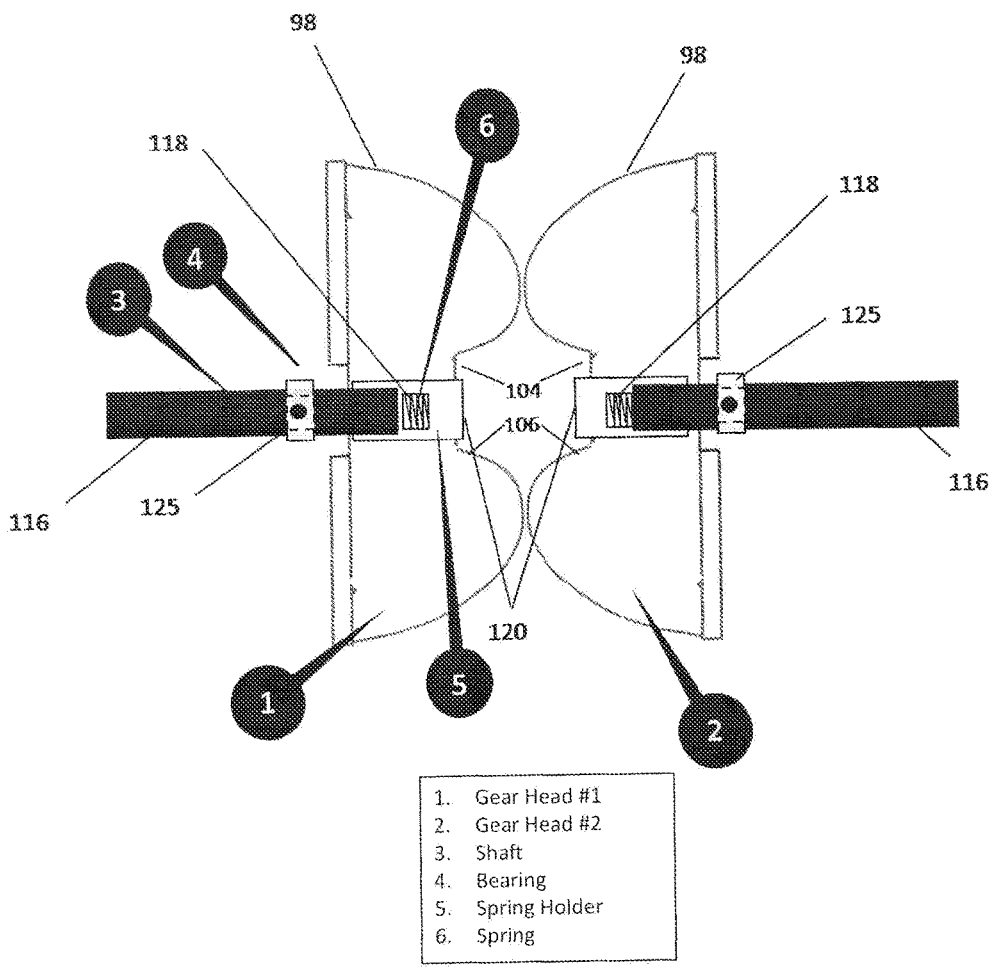
FIG. 60 shows a side sectional view of a curvilinear U Joint system with modified curvilinear gear heads and movable shafts according to yet another embodiment of the disclosure.
Figure 60A:
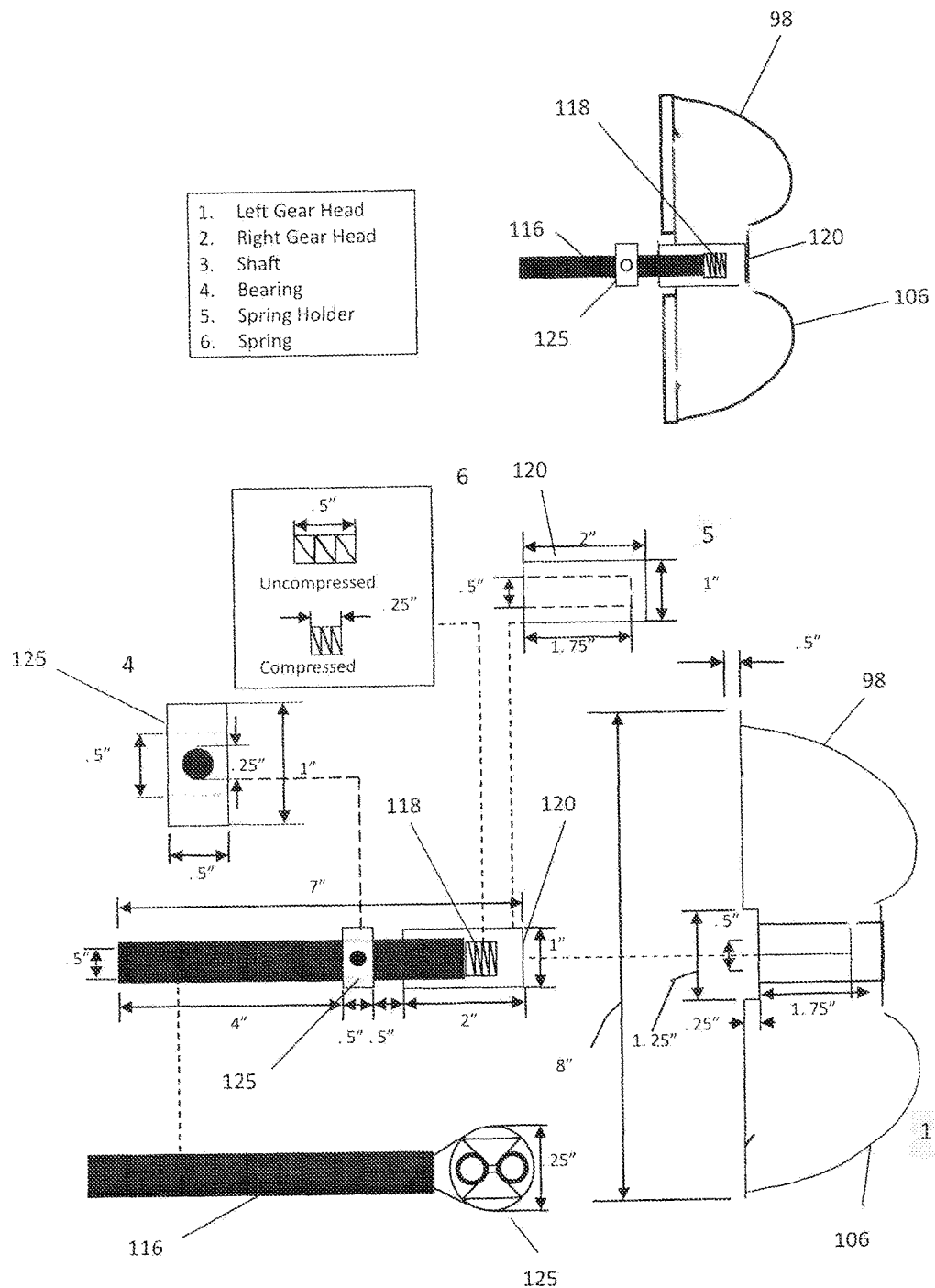
FIG. 60A shows an exploded sectional view of a modified curvilinear gear head and movable shaft according to yet another embodiment of the disclosure.
Figure 60B:
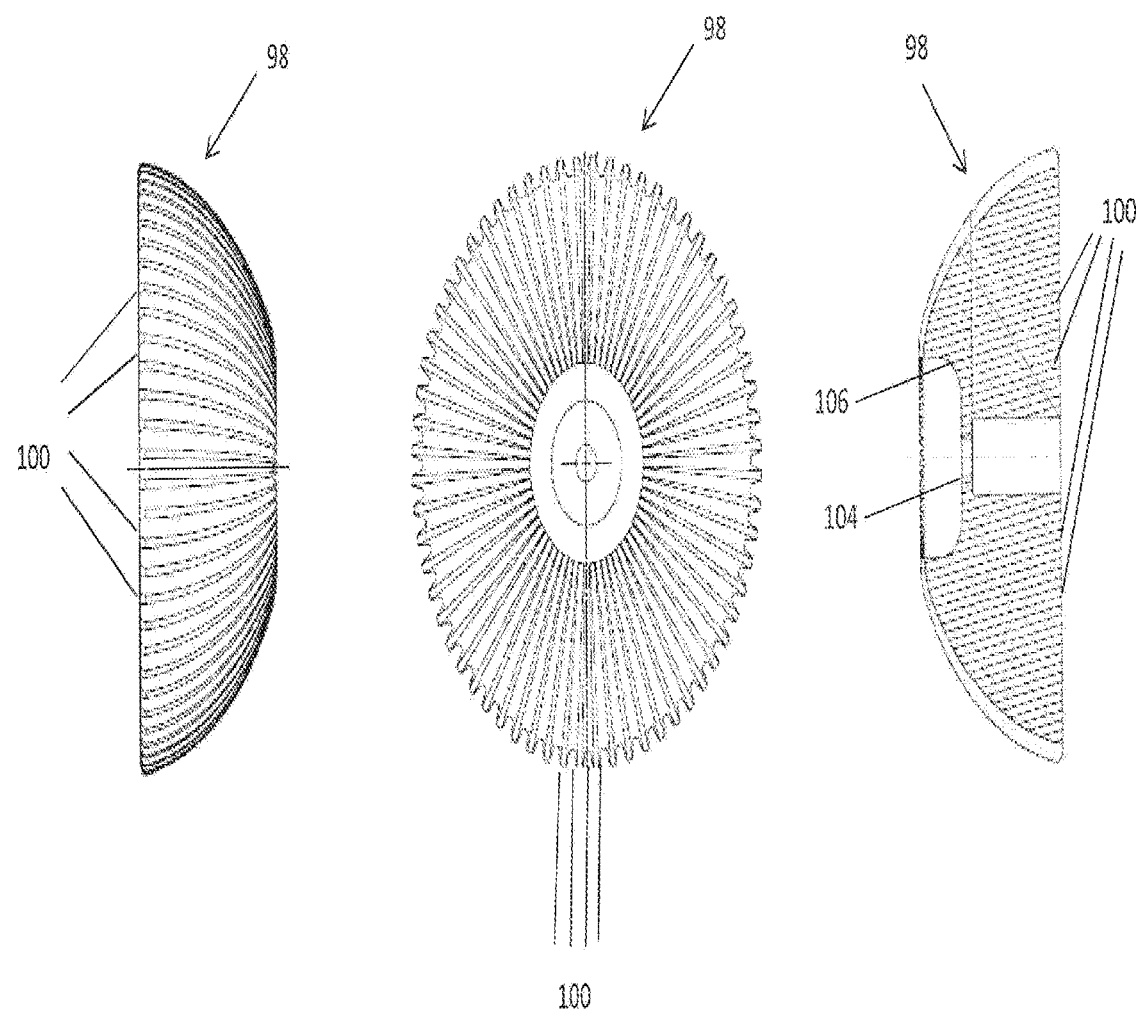
FIG. 60B shows a side, top and sectional view of a modified curvilinear gear head according to yet another embodiment of the disclosure.
Figure 60C:
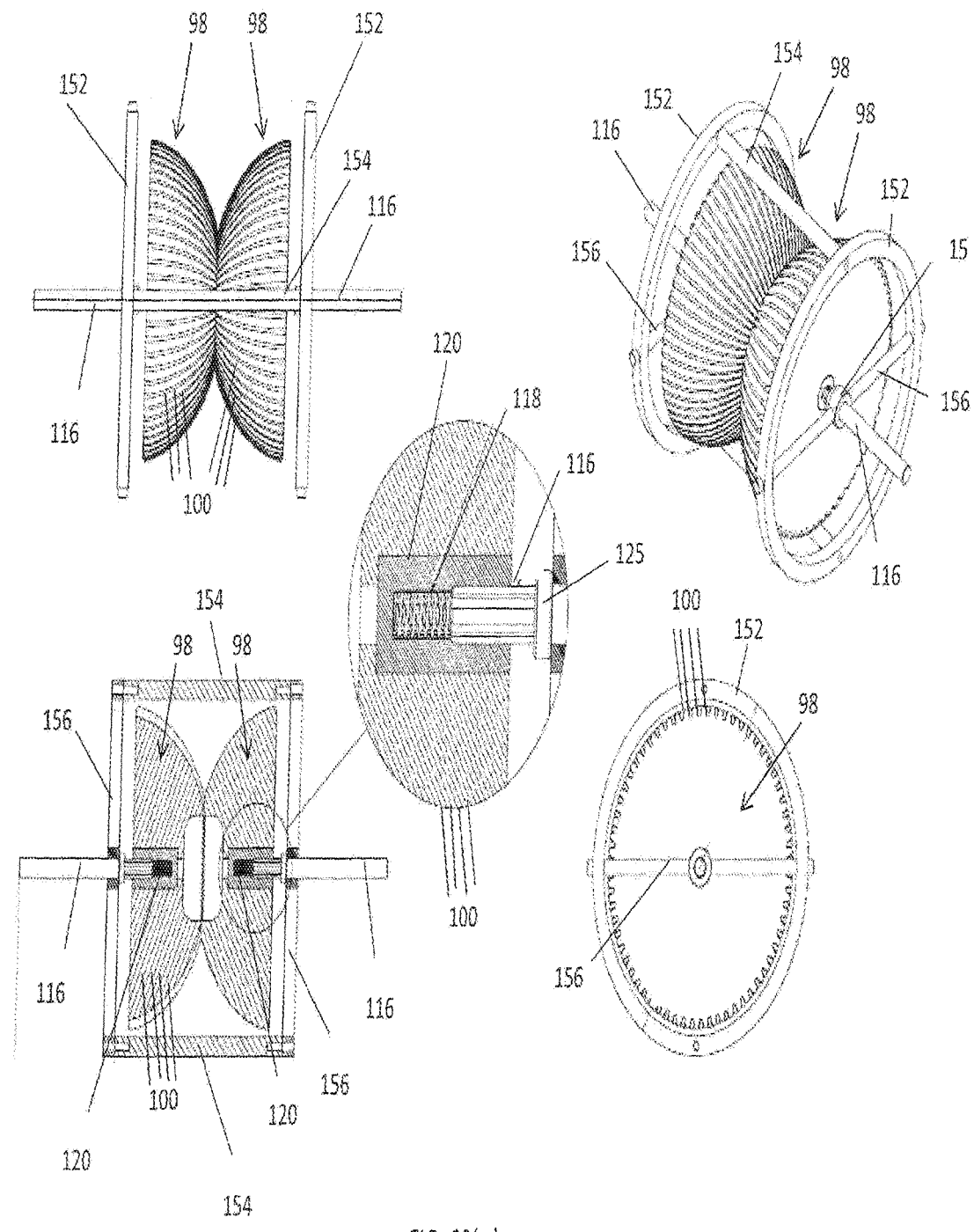
FIG. 60C shows multiple views of a curvilinear U Joint system with modified curvilinear gear heads and movable shafts according to yet another embodiment of the disclosure.
Figure 60D:
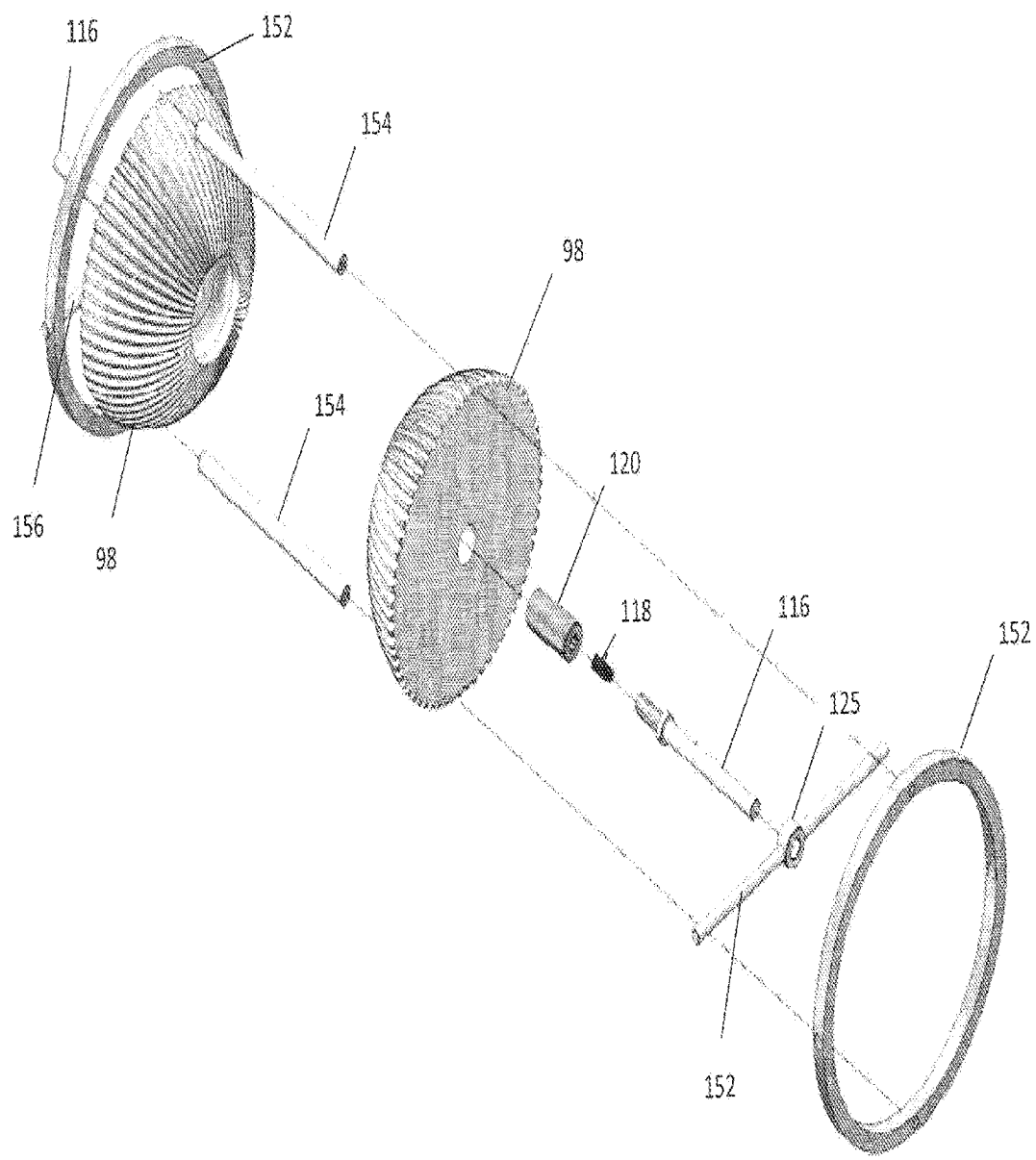
FIG. 60D shows an exploded view of a curvilinear U Joint system with modified curvilinear gear heads and movable shafts according to yet another embodiment of the disclosure.

Referring to FIGS. 60, 60A, 60B and 60C, a Curvilinear U Joint is shown having two gear heads 98 having planar surfaces 104 that have radiuses 106 that transition planar surfaces 104 to the curvilinear surfaces of gear heads 98. Shafts 116 are attached to gear heads 98 via pivot bearings 125. Proximal ends of shafts 116 extend within gear heads 98 in bores dimensioned to allow shafts 116 to move freely laterally within gear heads 98. Axial force springs 118 are positioned against proximal tips of shafts 116 at one end and register against spring retaining caps 120 secured within bores formed in planar surfaces 104. Springs 118 bias gear heads 98 against each other by urging gear heads 98 away from the proximal ends of shafts 116. Springs 118 allow gear heads 98 to maintain constant interaction throughout their operational ranges of rotation. An illustrative example of the components needed and the cooperation of the components to create the spring embodiment of a hemispherical U Joint is shown as an assembly drawing in FIG. 60D.

2.4.2 CAM System

Figure 61:
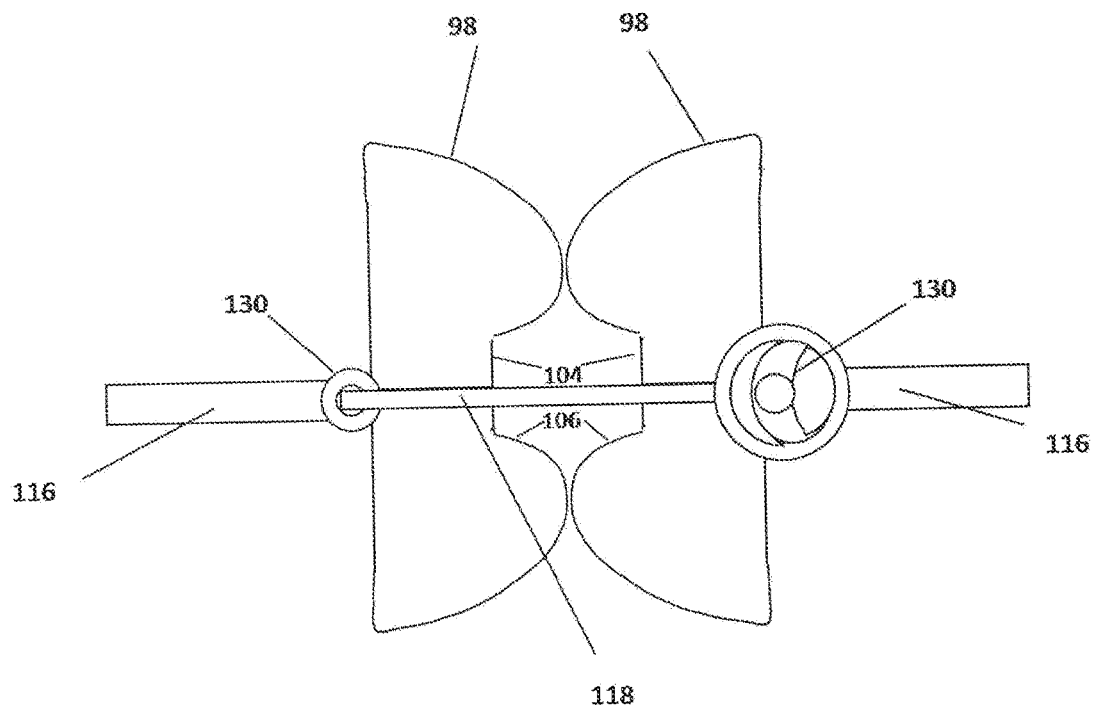
FIG. 61 shows a side sectional view of a curvilinear U Joint system with modified curvilinear gear heads and cam actuated shafts according to a further embodiment of the disclosure.

In another aspect of the invention, a cam system shown in FIG. 61 urges gear heads 98 against each other in a controlled manner dictated by the cam's surface configuration to maintain constant interaction between the gear heads throughout their operational ranges of rotation. A shaft or gap rod 118 is connected to a cam 130 via a small gear positioned at one of the pivot points of one of the gear heads 98. The cam has cam surfaces dimensioned to correspond with the outer surfaces of the gear heads so when the gear heads rotate the cam rotates and urges one of the pivot points to move toward or away from the other so as to maintain contact and interaction between the gear heads.

Figure 61A:
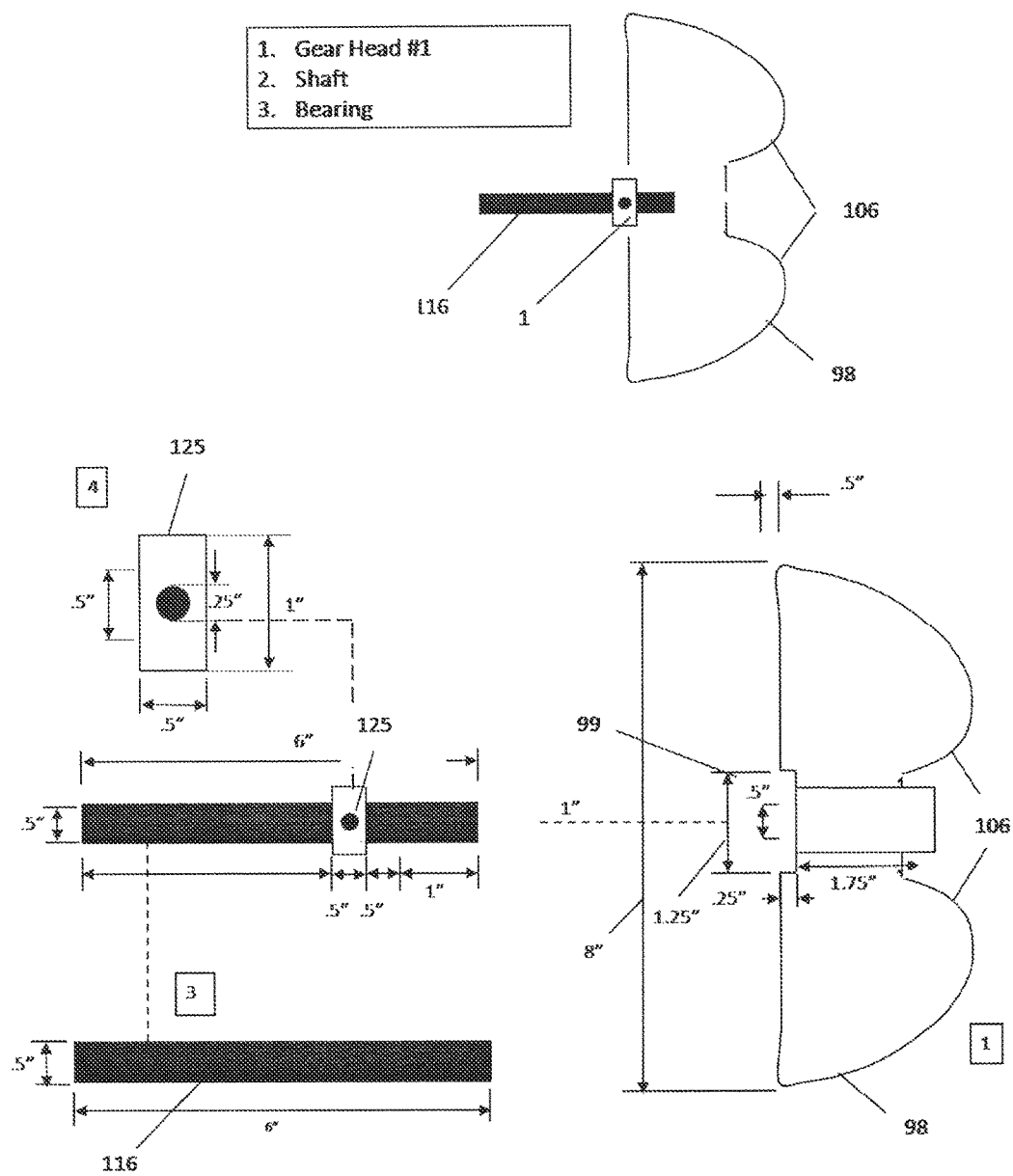
FIG. 61A shows a side sectional view and an exploded sectional view of a modified curvilinear gear head and shaft assembly used in a cam actuated curvilinear U Joint system according to a further embodiment of the disclosure.
Figure 61E:
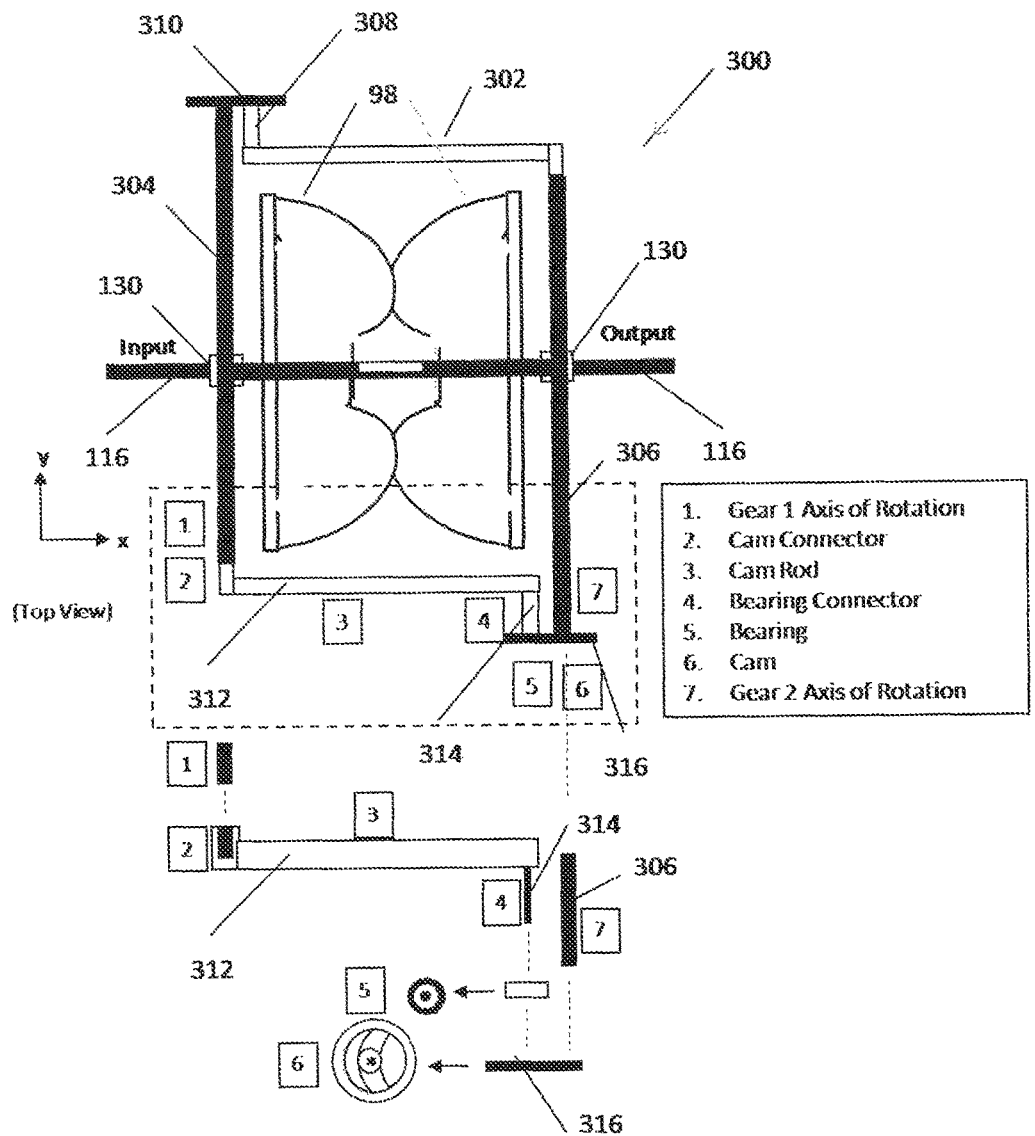
FIG. 61E shows a top sectional view and exploded view of a harness system for a cam actuated curvilinear U Joint system according to a further embodiment of the disclosure.

The cam system in its simplest form involves a curvilinear U Joint that includes two gear heads, each with a shaft and a bearing that connects the shaft to the gear head and supports rotation about the axis of rotation and the rotation of one gear head relative to the other. Referring to FIG. 61A, gear head 98 has a portion defining a gear head bore 99 for receiving bearing 125.

Figure 61F:
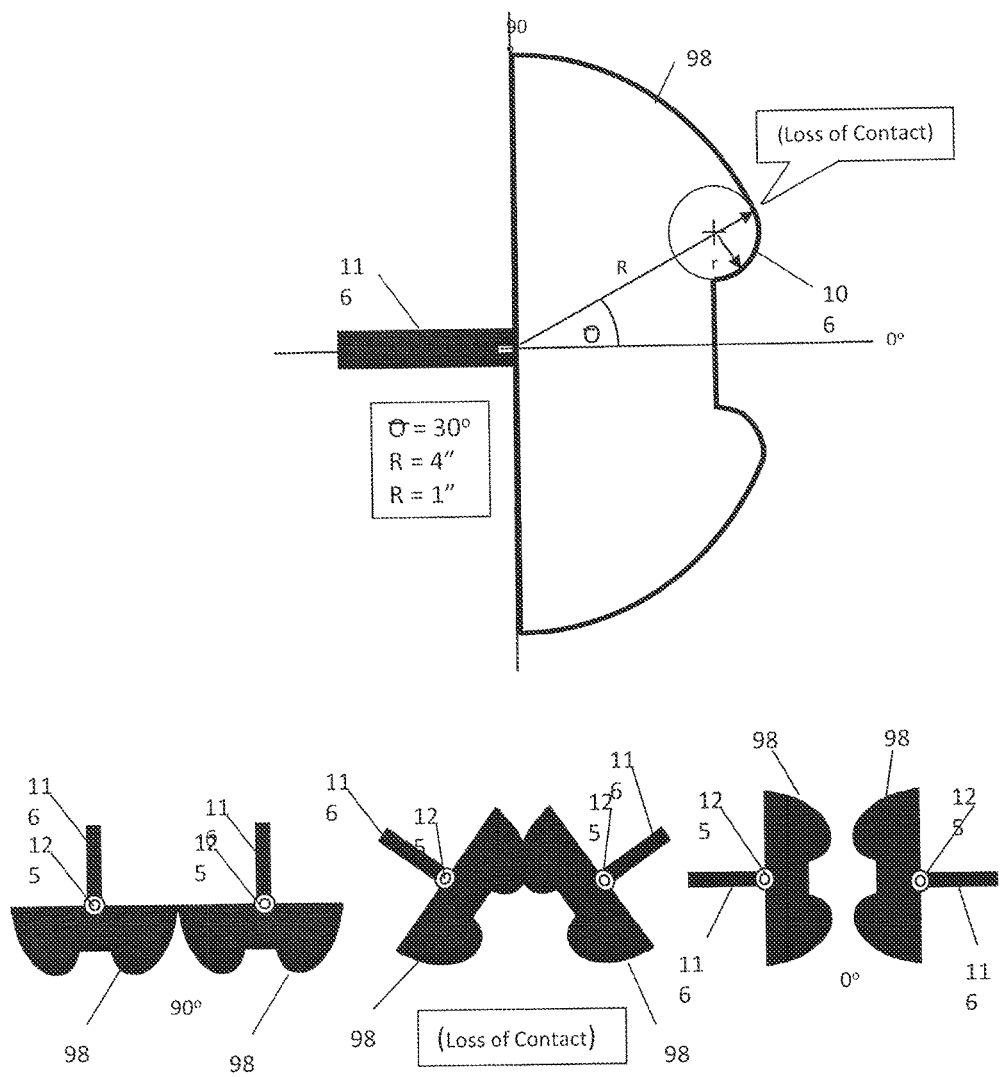
FIG. 61F shows a side sectional view of a modified curvilinear gear head used in a curvilinear U Joint system and a curvilinear U Joint system with interacting gear heads oriented in different angles of rotation according to a further embodiment of the disclosure.
Figure 61G:
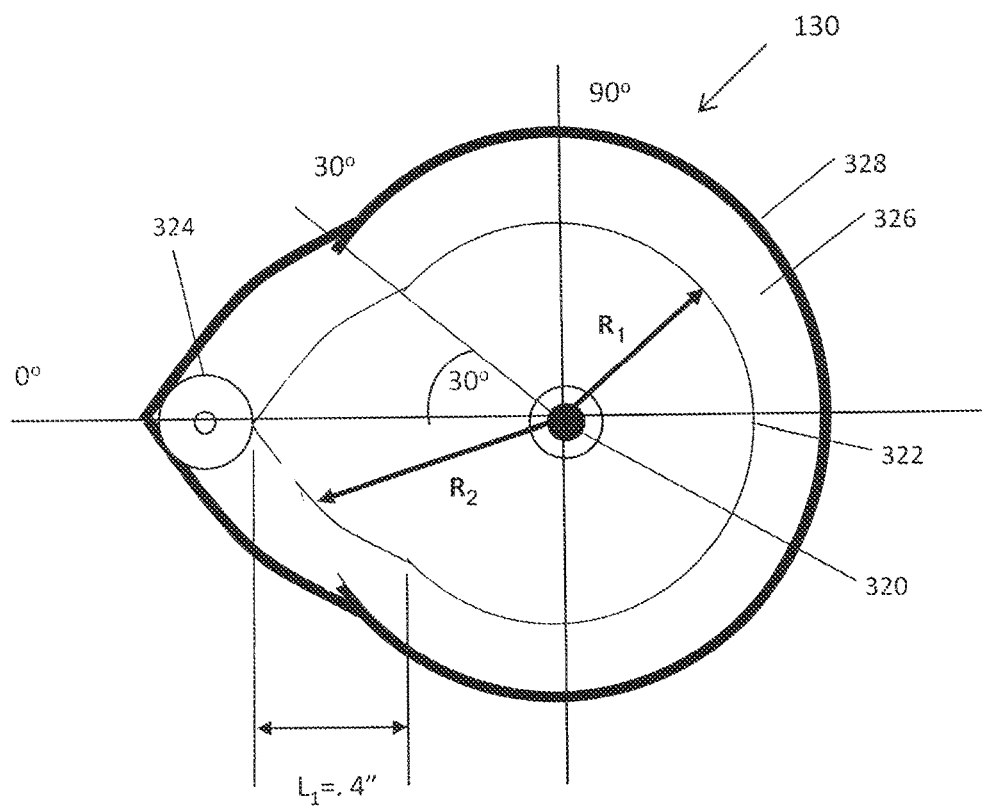
FIG. 61G shows a cam for a cam actuated curvilinear U Joint system according to a further embodiment of the disclosure.
Figure 61B:
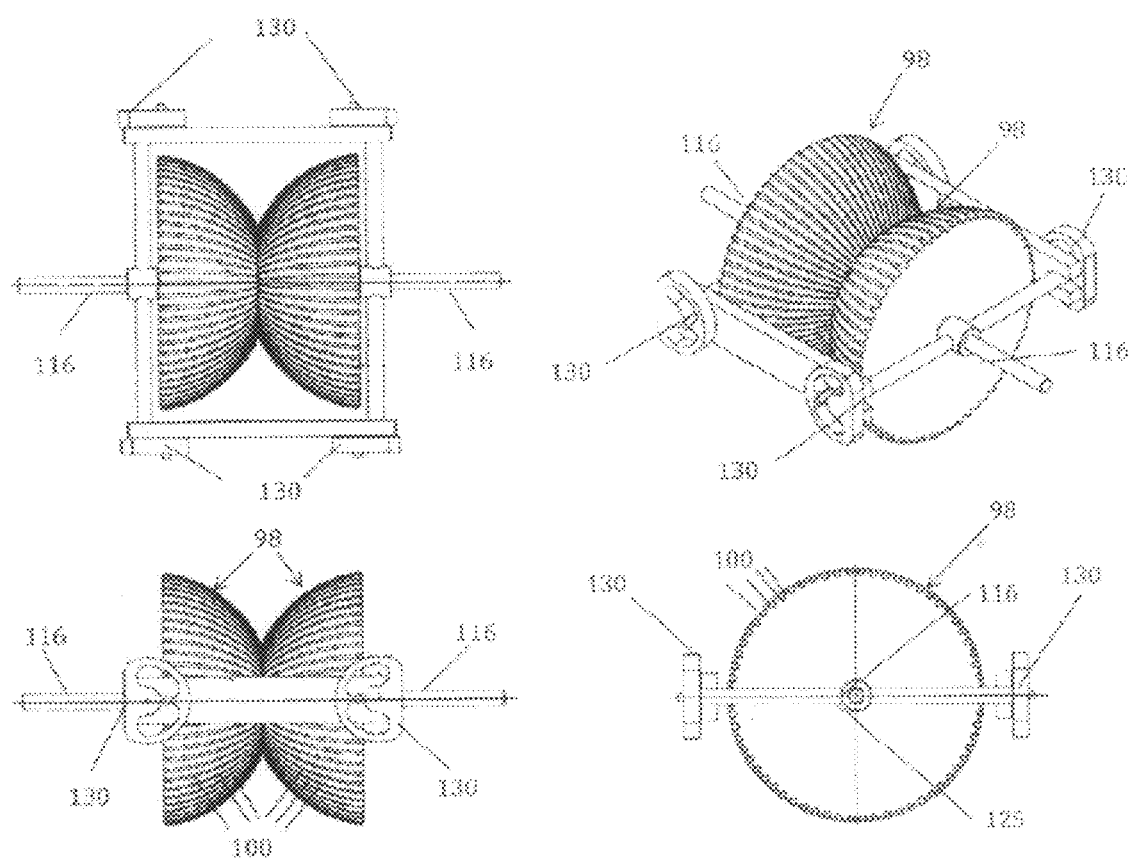
FIG. 61B shows a top sectional view of a cam actuated curvilinear U Joint system with harness according to a further embodiment of the disclosure.

To implement a cam system to the curvilinear U Joint, a variable width harness, shown generally as 300 in FIG. 61B, is required to allow movement of the gear head pivot points to eliminate the creation of a gap during gear head rotation. Referring to FIGS. 61B-61E, harness 300 includes a top brace 302 connected to an input brace 304 and an output brace 306. Top brace 302 has a brace extension 308 that slides within a slot in a brace connector 310 that connects to an end of input brace 304.

Harness 300 also has a bottom brace 312 also connected to input brace 304 and output brace 306. Bottom brace 312 has a bottom brace extension 314 that slides within a slot in a bottom brace connector 316 that connects to an end of output brace 304. Referring to FIG. 54E, in one embodiment, input brace 304 slides into a bore formed in bottom brace 312, which performs as a cam rod that pulls or pushes one gear head relative to the other. Bottom brace extension 314 acts as a bearing connector that connects to brace connector 316 that performs as a bearing. The bearing interacts with the cam 130 to move bottom brace or cam rod 312 to move the gear heads so as to maintain physical contact between the gear heads as they rotate through their entire angular range of motion. The top sliding brace and its related components perform the same function as the bottom brace. The combination of the top sliding brace and bottom sliding brace accommodate lateral movement of the gear head pivot points.

The cam 130 is connected to the output axis of rotation to provide a spring-less system for connecting curvilinear gears. To illustrate what the cam accomplishes, a gap forms when two curvilinear gear heads move through their angular ranges of rotation as shown in FIG. 61F. The loss of contact occurs when the curvilinear surface transitions to the planar surface and reaches a maximum at 0°.

Figure 61I:
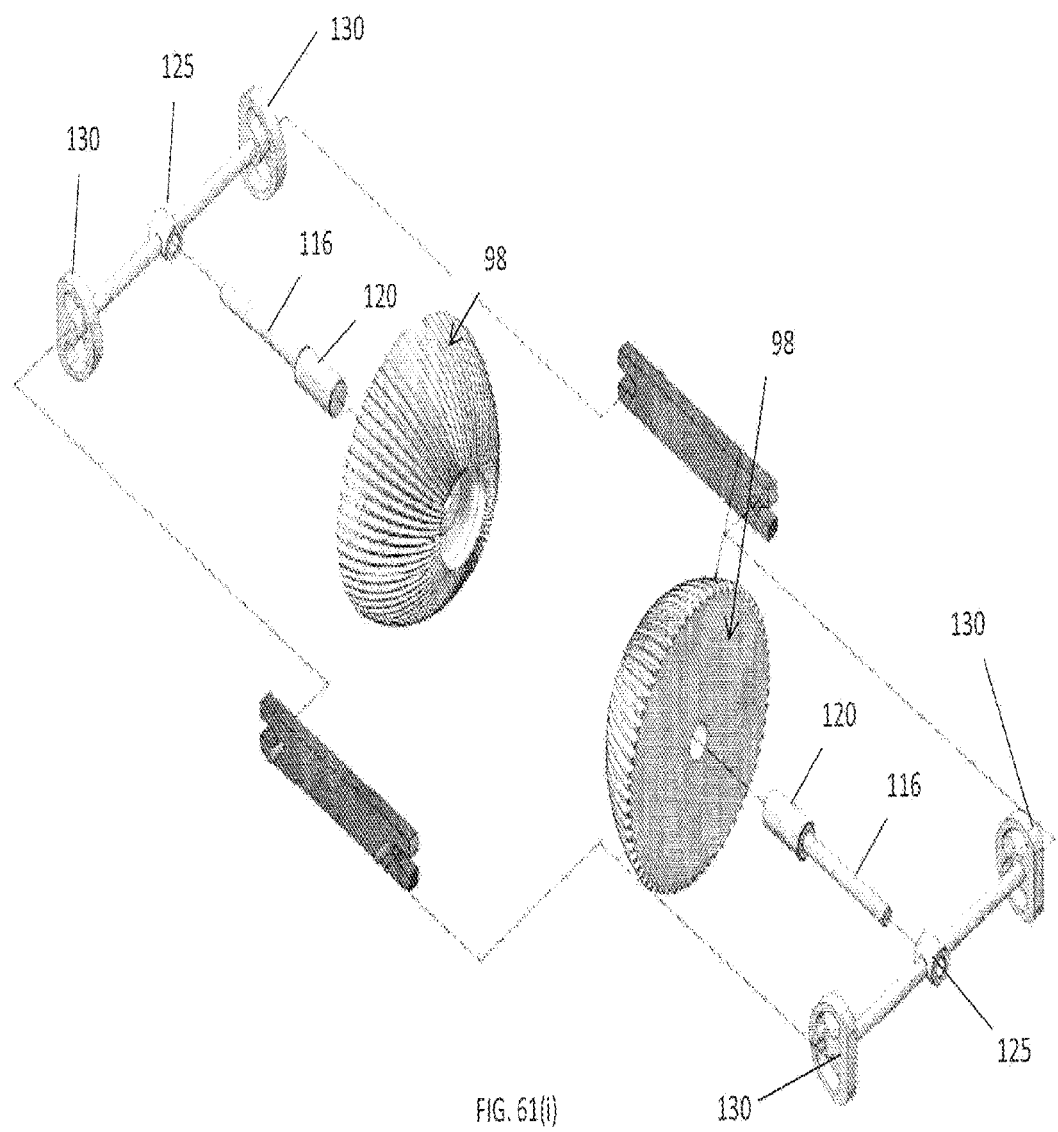
FIG. 61I shows an exploded view of a harness system for a cam actuated curvilinear U Joint system according to a further embodiment of the disclosure.

Referring to FIG. 61G, cam 130 includes a pivot point 320 about which cam surface 322 rotates. A bearing 324 moves within a bearing channel 326 formed within a cam housing 328. Radius designated $R_1$ in FIG. 61G may have any value between 30° and 90°, but must remain a constant value throughout the angular range. The distance $L_1$ should always equal half the length of the full gap between gear heads. In the illustrative example, the amount is 0.4". The second radius designated as $R_2$ represents the required increase in $R_1$ when moving from 30° to 0°, the approximate range in which a gap condition occurs. The increase in $R_1$ is determined by the following equation: R2=R=((R−r)cos(theta)+r. It should be noted and understood that the cam concept can be combined with the extendable shaft concept to eliminate or substantially reduce the formation of a gap between rotating curvilinear gear heads. An illustrative embodiment of a cam version of a hemispherical U Joint is shown in FIG. 61H. FIG. 61I shows the assembly drawing of same.

2.4.3 NoGap System

Figure 62:
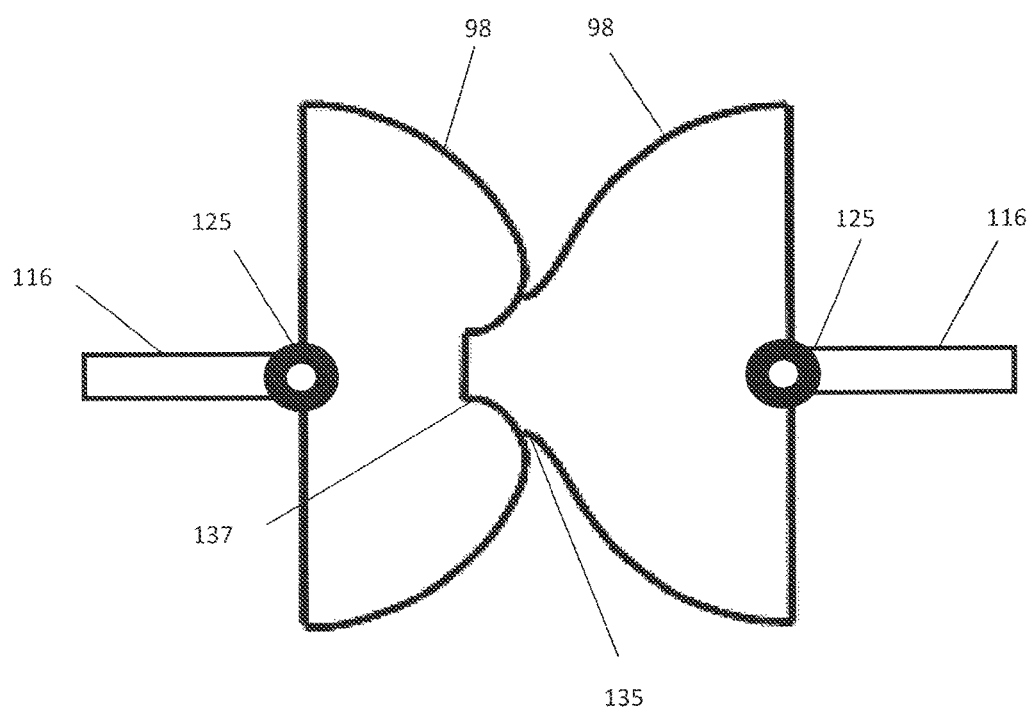
FIG. 62 shows a side sectional view of a further modified curvilinear gear head in a curvilinear U Joint system according to yet another embodiment of the disclosure.

In a yet further aspect of the invention, a curvilinear U Joint system includes gear heads 98 having interlocking surfaces as shown in FIG. 62. In this embodiment, one gear head has a radial projection 135 that fits within a cavity 137 formed on the surface of the other gear head 98 that is dimensioned so that a substantial portion of the surface area of cavity 137 interacts with a substantial portion of projection 135 when the gear heads are aligned at their 0° points. This configuration eliminates the creation of a gap at any point when the gear heads are rotated through their entire range of rotation.

Figure 63:
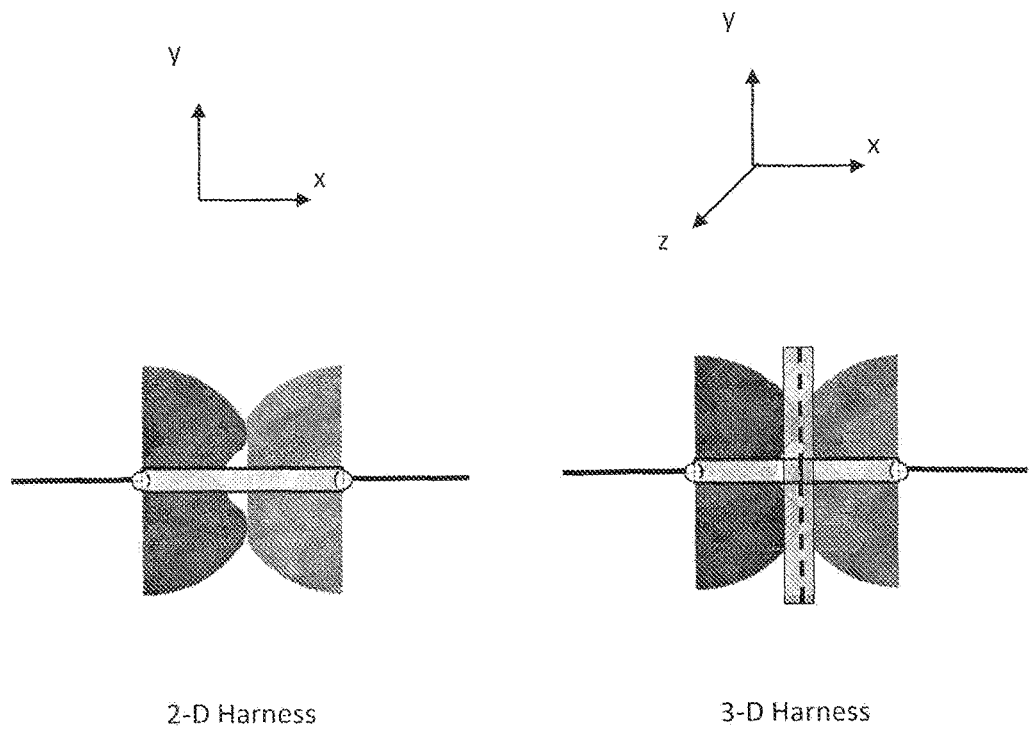
FIG. 63 shows side views of 2-D and 3-D curvilinear U Joint harnesses and axes of orientation according to another embodiment of the disclosure.

FIG. 63 illustrates two harness concepts that have been developed for the "no gap" configuration, a 2-D concept and a 3-D concept The 2-D concept is intended to be used in two dimensional applications, while the 3-D concept is designed to be used in three dimensional applications. The advantages of making this distinction will become apparent when the concept of serially linked U Joints is described.

2.4.3.1.1 Two Dimensional Harness

Figure 64:
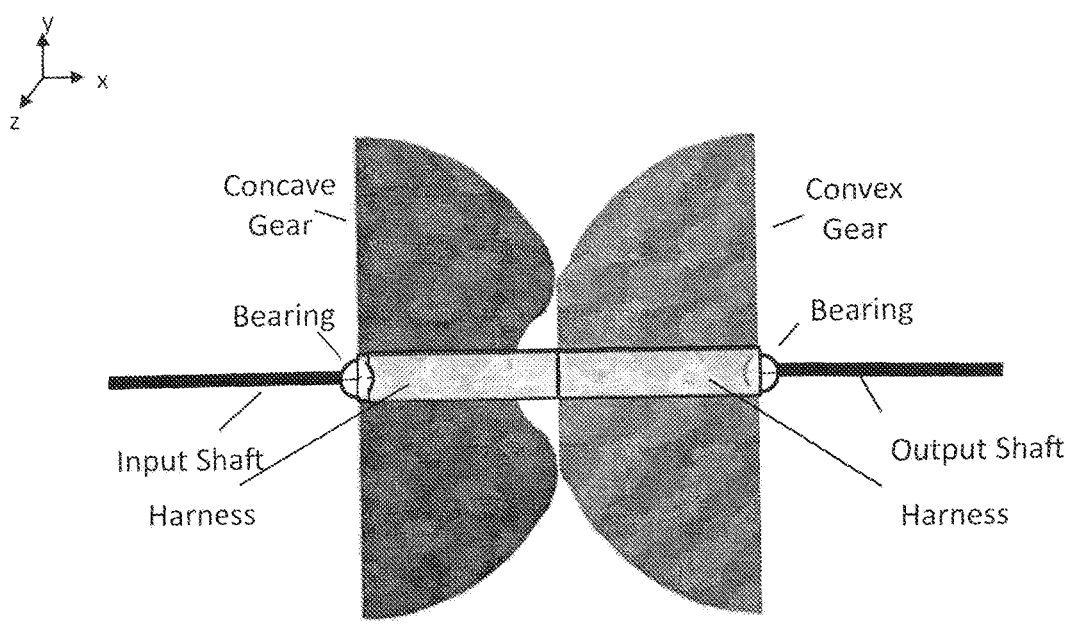
FIG. 64 shows features a 2-D curvilinear U Joint harnesses according to an embodiment of the disclosure.
Figure 65B:
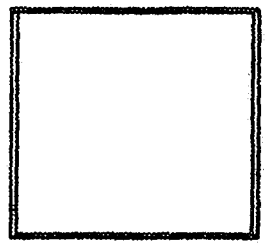
FIG. 65b shows a top view of a 2-D curvilinear U Joint harness according to an embodiment of the disclosure.
Figure 65A:
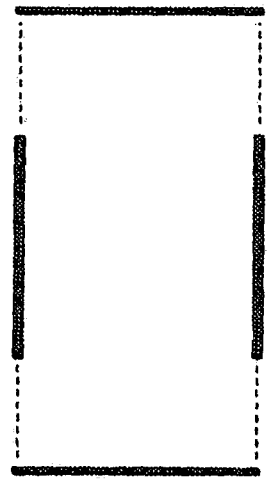
FIG. 65a shows an exploded top view of a 2-D curvilinear U Joint harness according to an embodiment of the disclosure.

The 2-D harness is used with U Joints intended to operate in two dimensional space. FIG. 64 shows a side view of this configuration harness assembly, and FIG. 65 shows an exploded view of the harness.

2.4.3.1.2 Three Dimensional Harness

Figure 66:
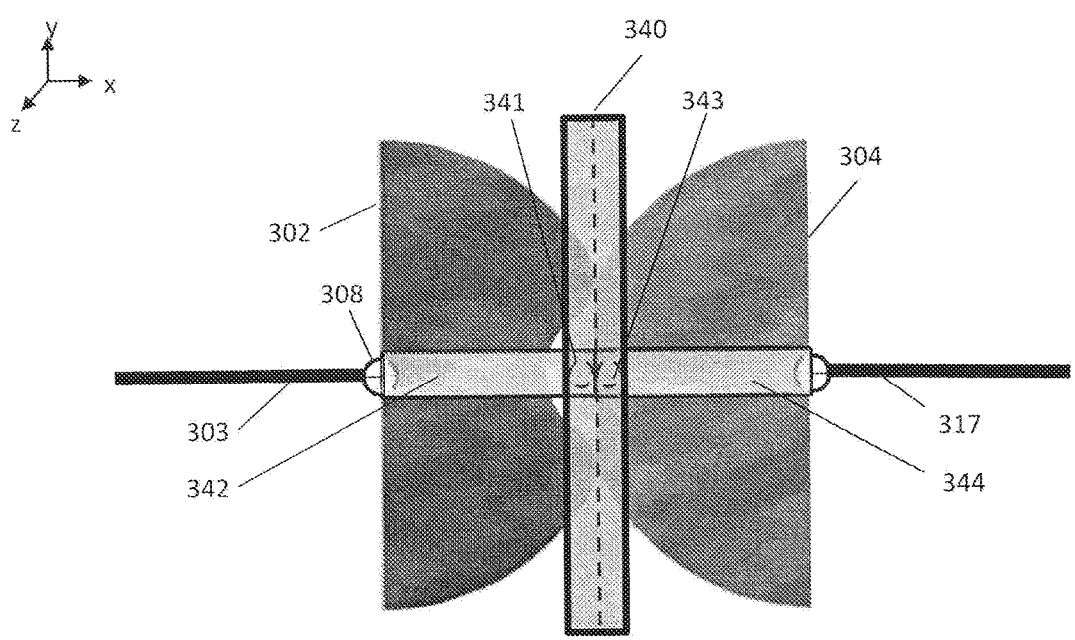
FIG. 66 is a side sectional view of a 3-D curvilinear U Joint harness according to yet another embodiment of the disclosure.

The 3-D harness is to be used with U Joints intended to operate in three dimensional space. FIG. 66 shows a side view of this configuration harness assembly, and FIG. 67 shows a top, front, and side view of the harness, and an exploded view of the harness. The only difference between the 2-D and 3-D configurations is that the 3-D configuration has a swivel track used to rotate the frame of the convex gear head independently of the frame of the convex gear head about the x-axis.

To maximize spatial variability of operation, a harness and swivel track system is employed to maximize the freedom of movement of the gear heads. Referring again to FIG. 66 and also FIG. 67, a first harness 342 is secured to gear head 302 via bearing 308. A second harness 344 is secured to gear head 304 via bearing 318. As shown in FIGS. 123 and 124, the harnesses are essentially square u-shaped configurations with pairs of roller bearings fixed to each end, 341 and 343, respectively.

To enable complete rotational freedom relative to the y-z plane, an annular swivel track 340 is provided with two independent, substantially parallel tracks to receive the roller bearings fixed to the harnesses. Placement of the roller bearings in the adjacent tracks allows for unfettered rotational movement of the gear assembly without any separation between the interacting gear heads.

2.5 Serially Linked U Joints

U-joint configured in accordance with this disclosure can be serially linked to permit the path from the input shaft to the output shaft to be modified to any shape. Serial linking also permits the path to be serially adjusted. A further advantage over conventional serially linked U-joints is more flexibility without diminished strength. FIGS. 68 and 69 show two different embodiments for serially linked joints, links with equal length, and links with unequal lengths.

Unlike the 2-D version, the 3-D serially linked design permits the I/O shafts of each link to be independently rotated in the y-z plane. This feature permits a string of curvilinear U Joints to easily move in 3-D space.

2.6 Advantageous Aspects of Serially-linked U Joints

The substantial advantages of the curvilinear U Joint over conventional Cardin-style U Joint are as follows:
1. Conventional U Joints have a small operational range. The curvilinear U Joint operates easily at any angle in three dimensional space
2. Conventional U Joints produce an output that is sinusoidal. The output of a curvilinear U Joint exactly replicates the input values.
3. Conventional U Joints are prone to get hot. This is caused by interacting parts rubbing against one another. The curvilinear U Joint has few moving parts, and the interacting surfaces role relative to one another.
4. Conventional U Joints are more complex in design that the curvilinear U Joints.
5. Conventional U Joints are made from more parts than a curvilinear U Joint.
6. Conventional U Joints tend to vibrate more as the operational angle increases. Curvilinear U Joints operate like a gear, which means that vibration is not an issue.
7. Curvilinear gears can be made to any size, which means they can be made to support any strength.

3. Direct Drive Continuously Variable Transmission [CVT]

Figure 70:
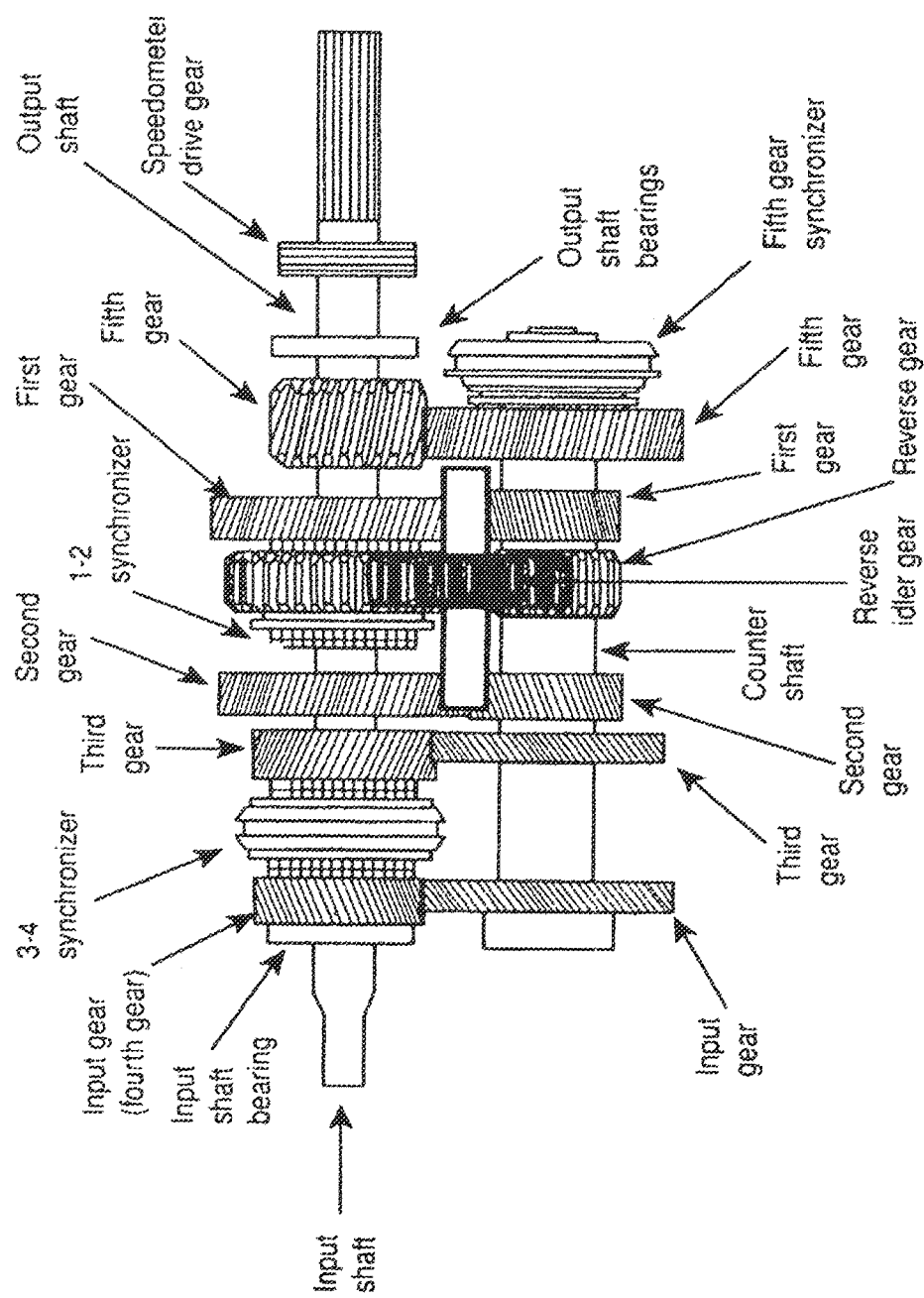
FIG. 70 shows a conventional manual transmission.

Having described the curvilinear gear and curvilinear U Joint, attention will be drawn to incorporating these concepts into a practical application, a transmission. A transmission is defined as a device that transfers power from an engine with a series of gears to change torque and angular velocity in a drive train. FIG. 70 illustrates a prior art transmission in which a series of gears interact to impart changes in torque and angular velocity as is well known in the art.

Conventional transmissions continue to be improved by new emerging designs, such as the Continuously Variable Transmission (CVT). Like a curvilinear gear set, current CVT concepts are capable of continuously changing gear ratios between two limits. Unlike the curvilinear gear set, CVTs are limited to smaller load applications because the CVTs are predominantly friction driven that limits the amount of torque that can be handled by the CVT. Thus, large transportation and industrial equipment, for example, are unable to take full advantage of this technology until the load problem is solved. The curvilinear gear and curvilinear U Joint can be used to address the torque issue, and in so doing extend the concept and the features of conventional CVTs.

Figure 71:
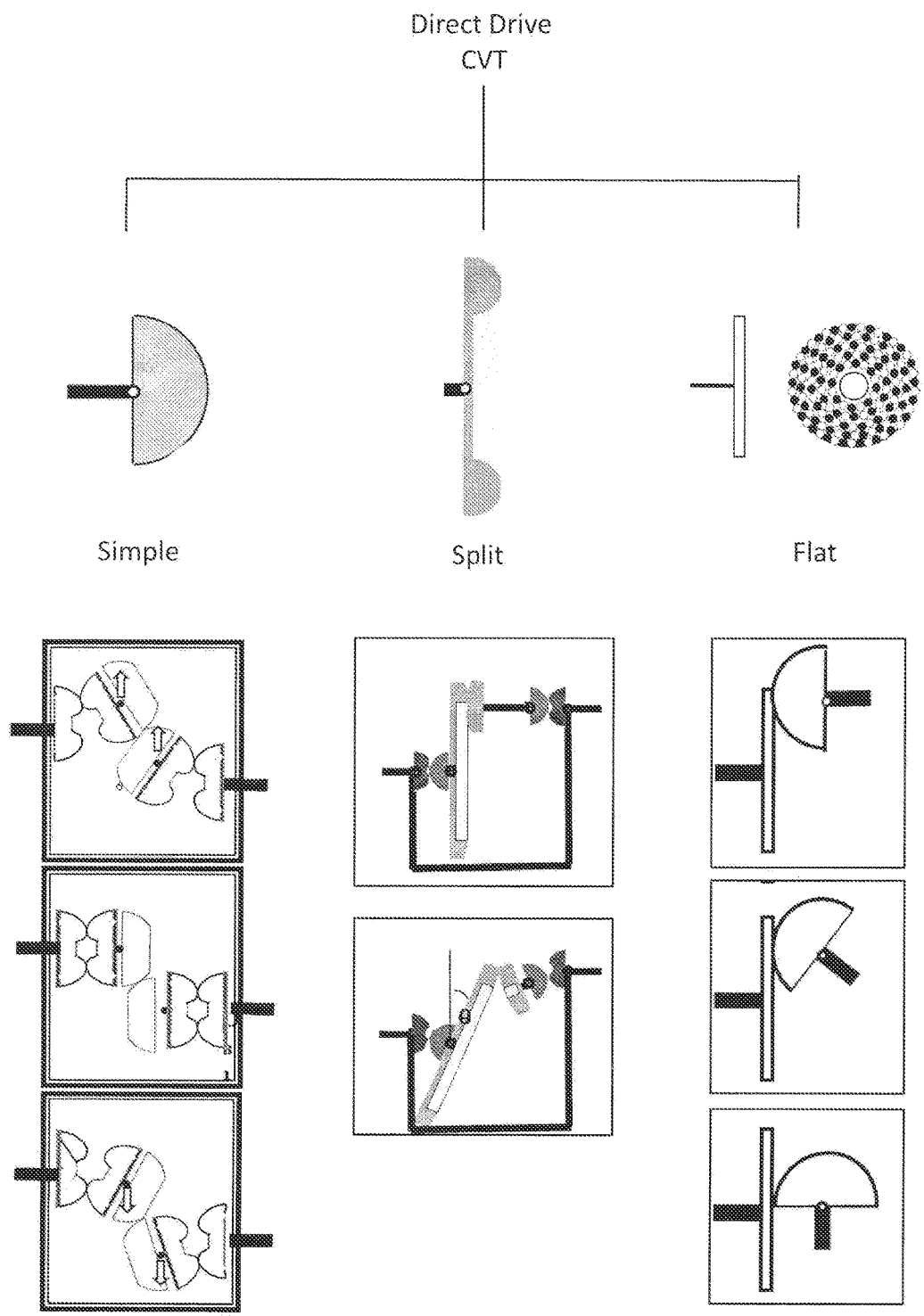
FIG. 71 shows three embodiments of a CVT according to three embodiments of the disclosure.

To fully understand the application of the curvilinear gear and curvilinear U joint designs to solve problems associated with CVT's, a brief explanation of the basic operational concept along with a description of three technical issues associated with prior art CVT systems is provided. Thereafter, three different embodiments of the novel CVT design are disclosed including one based on the hemispherical gear head, a second on the split gear head, and a third on the flat gear head. (See FIG. 71). A description for serially linking curvilinear CVT's is also included.

3.1 Issues

3.1.1 Floating Shaft Issue

Figure 72:
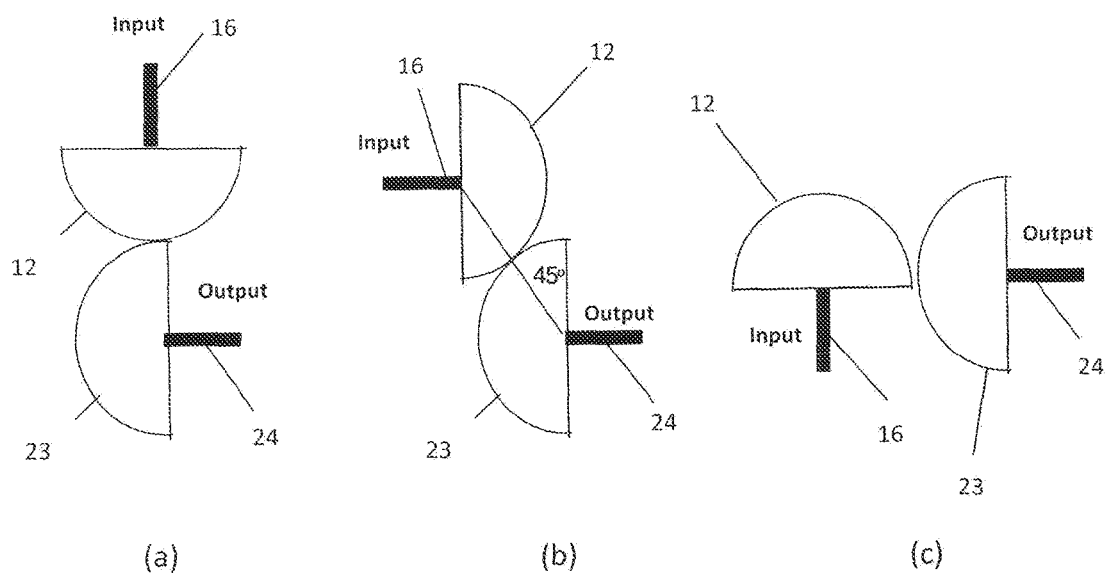
FIG. 72 shows a curvilinear gear system with gear heads oriented in different positions of angular rotation according to one embodiment of the disclosure.

Referring to FIG. 72, when curvilinear gear heads 12 and 23 interact, the shafts 16 and 24 of the gear heads are in continuous angular motion. To provide practical application, the axes of rotation for the input and output shafts have to be stabilized. This disclosure provides three alternatives to stabilize the shafts. It should be understood that the alternatives and embodiments thereof are illustrative and do not limit the scope of the appended claims as other alternatives and equivalents thereof are within the contemplation and scope of the claims.

Figure 73:
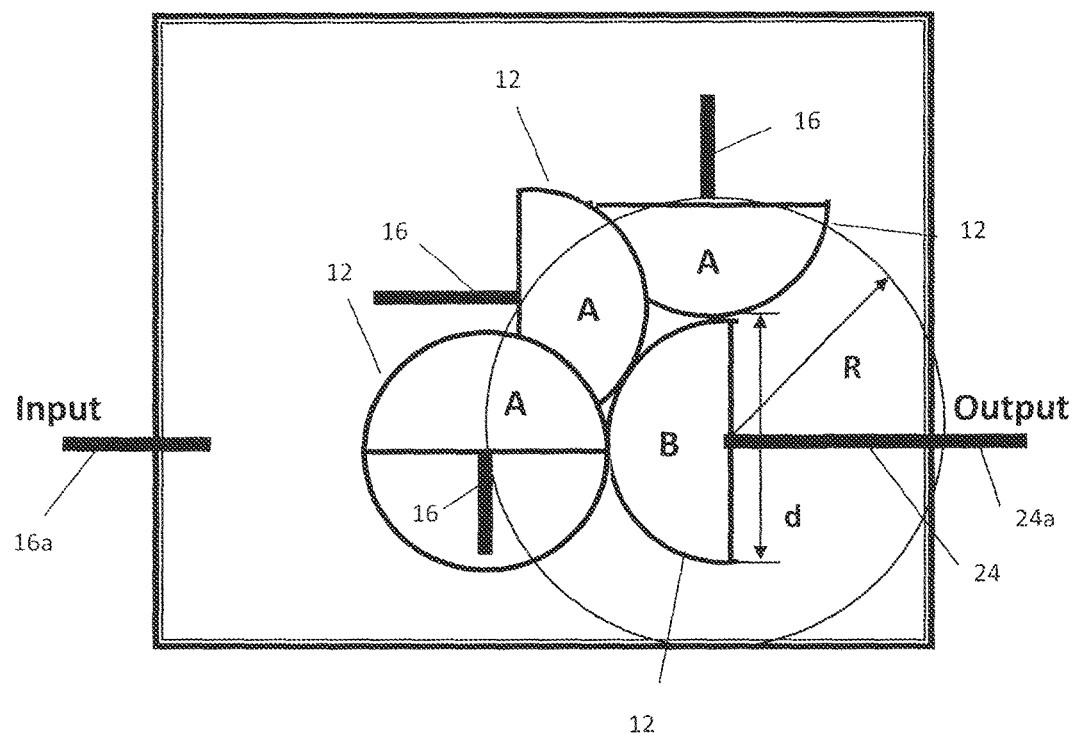
FIG. 73 shows a curvilinear gear system with a fixed output shaft and input gear head in multiple positions according to another embodiment of the disclosure.

Referring to FIG. 73, in accordance with one aspect of the invention, a fixed output shaft embodiment is shown in which a fixed output shaft 24a is connected directly to the output gear head 23. Input shaft 16a is not directly connected to input gear head 12 so that the pivot point of gear head 12 is not stable. The pivot point travels 90° along an arc having radius R, where R=d (the diameter of output gear head 23. For this embodiment, a kinematic mechanism is needed to connect input shaft 16 to fixed input shaft 16a. A means to connect the shafts is described below.

Figure 74:
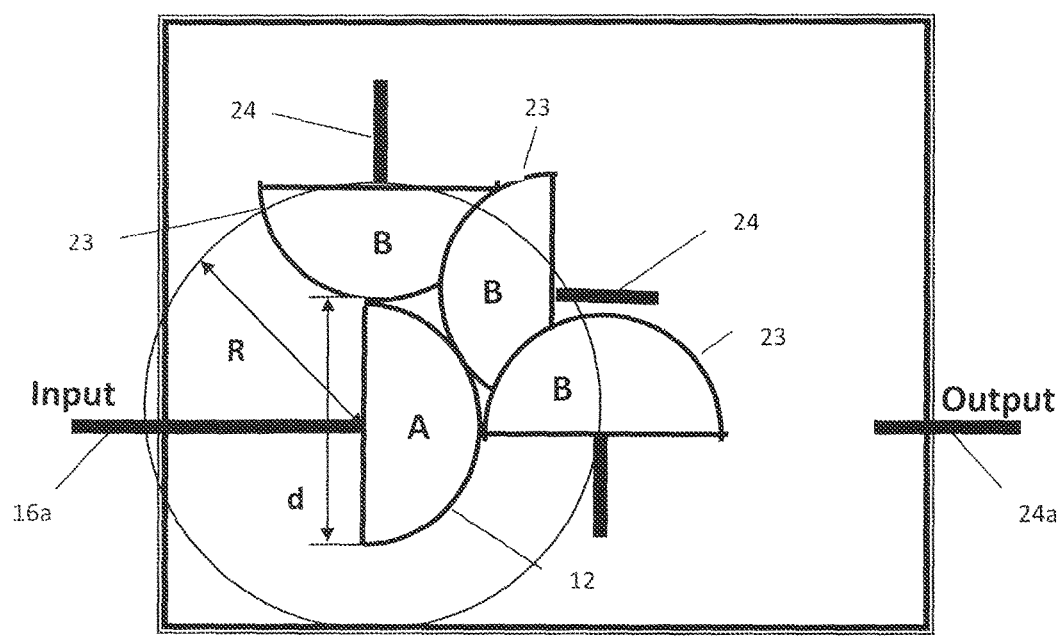
FIG. 74 shows a curvilinear gear system with a fixed input shaft and output gear in multiple positions according to another embodiment of the disclosure.

Referring to FIG. 74, in accordance with another aspect of the invention, a fixed input shaft embodiment is shown in which a fixed input shaft 16a is connected directly to the input gear head 12. In this embodiment, output shaft 24a is not directly connected to output gear head 23 so that the pivot point of gear head 23 is not stable. The pivot point travels 90° along an arc having radius R, where R=d (the diameter of input gear head 12. For this embodiment, a kinematic mechanism is needed to connect output shaft 24 to fixed output shaft 24a. A means to connect the shafts is described below.

Figure 75:
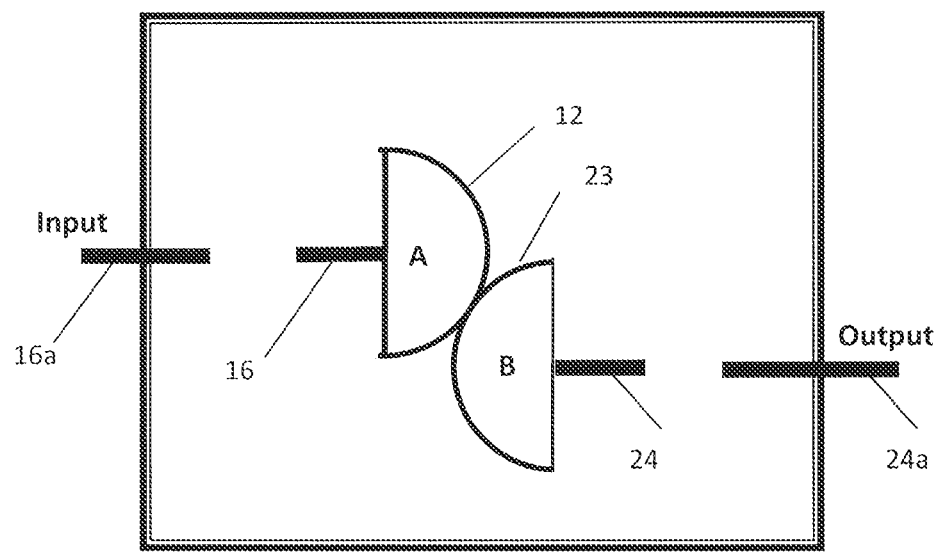
FIG. 75 shows a curvilinear gear system with both fixed input and output shafts disconnected from the curvilinear gear heads according to a further embodiment of the disclosure.
Figure 76:
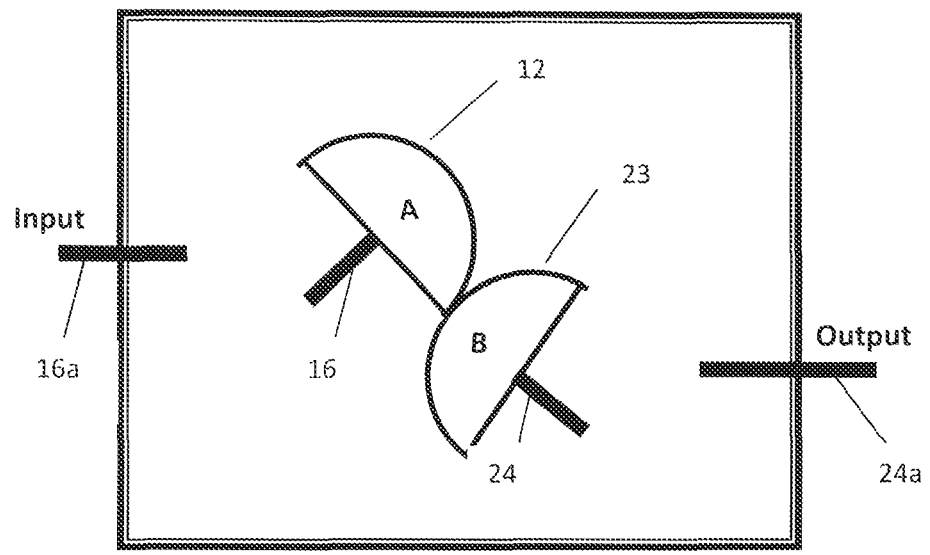
FIG. 76 shows the curvilinear gear system of FIG. 75 with the pinion gear at the 0° angle of rotation.
Figure 77:
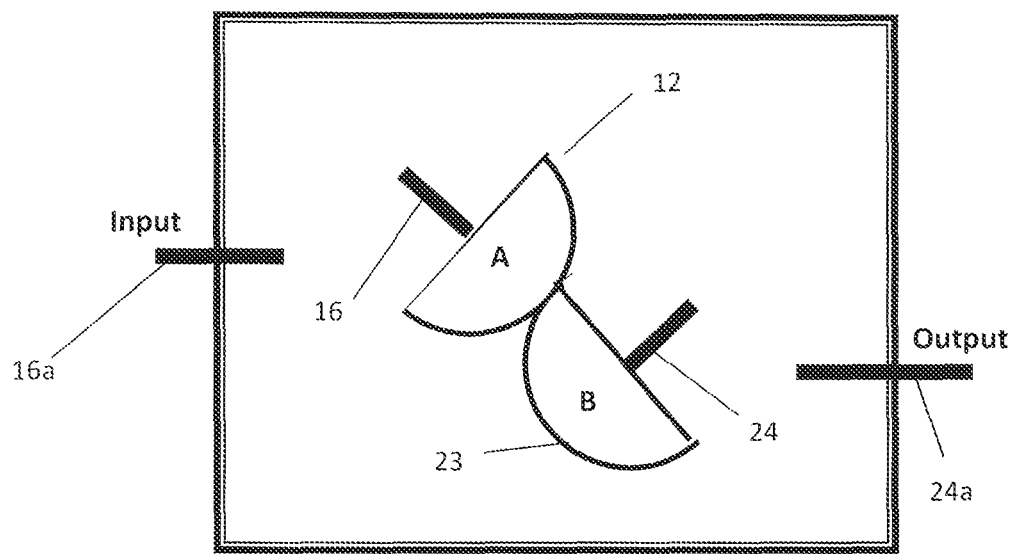
FIG. 77 shows the curvilinear gear system of FIG. 75 with the pinion gear at the 90° angle of rotation.

Referring to FIGS. 75, 76 and 77, in accordance with a further aspect of the invention, an embodiment is shown in which neither fixed shaft is directly attached to a gear head thus providing a variable input/output configuration. FIG. 75 shows gear heads 12 and 23 interacting each at 45°. FIG. 76 shows gear heads 12 and 23 interacting with the gears shifted plus 45°. And FIG. 77 shows gear heads 12 and 23 interacting with the gears shifted minus 45°. In this embodiment, both the fixed input and output shafts require a means for connection to the corresponding gear heads. It is noteworthy that the pivot point for each gear head is not stable. Each gear head travels 45° along an arc having a radius R, where R=d (the diameter of the output gear)/2. This embodiment reduces the variability of the angular travel of the shafts by approximately 50%, from about 90° to about 45°.

3.1.2 U Joint Issue

The 45° travel of the variable input/output configuration is a substantial increase over the efficient operational angles of standard universal joints that generally run 0° and 15° To connect the fixed shafts to the unstable shafts, two alternative solutions are presented. The first incorporates conventional universal joints as a connecting means. The second incorporates a hemispherical universal joint as a connecting means. It should be understood that either of these illustrative alternatives can be used with any of the three shaft stabilization embodiments.

Figure 78:
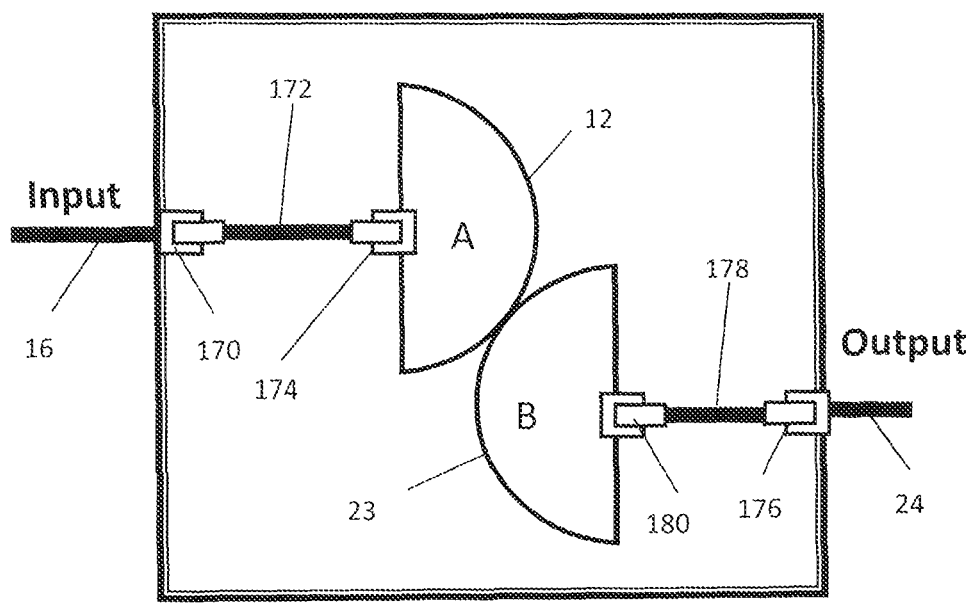
FIG. 78 shows the curvilinear gear system of FIG. 75 with the pinion gear at the 45° angle of rotation with each gear head attached to one of the fixed input and output shafts with conventional universal joints and a central shaft according to a yet further embodiment of the disclosure.

Referring to FIG. 78, conventional universal joint/shaft assemblies are used to connect the fixed shafts to the unstable shafts of the gear heads. In this embodiment, input shaft 16a is attached to a first input universal joint 170, which is attached to an input central shaft 172, which is connected to a first end of a second input universal joint 174. A second end of a second universal joint 174 is attached to input gear head 12 at its pivot point. Output shaft 24a is connected to a first output universal joint 176, which is attached to an output central shaft 178, which is connected to a first end of a second output universal joint 180. A second end of second output universal joint 180 is connected to output gear head 23 at its pivot point.

The universal joint embodiment has two known limitations. Due to the motion of the gear heads as they rotate through their ranges of angular motion, the two central shafts have to change in length to accommodate the lateral displacement of the shafts between the gear heads and the fixed static shafts 16a and 24a. One solution is to use telescopic shafts for the central shafts. A second solution is to change the geometry of the gear heads to something other than a hemispherical shape. This second solution is simply introduced to make the point that this new universal gear technology is a very flexible concept that can be altered to solve new problems as they are encountered.

Figure 79:
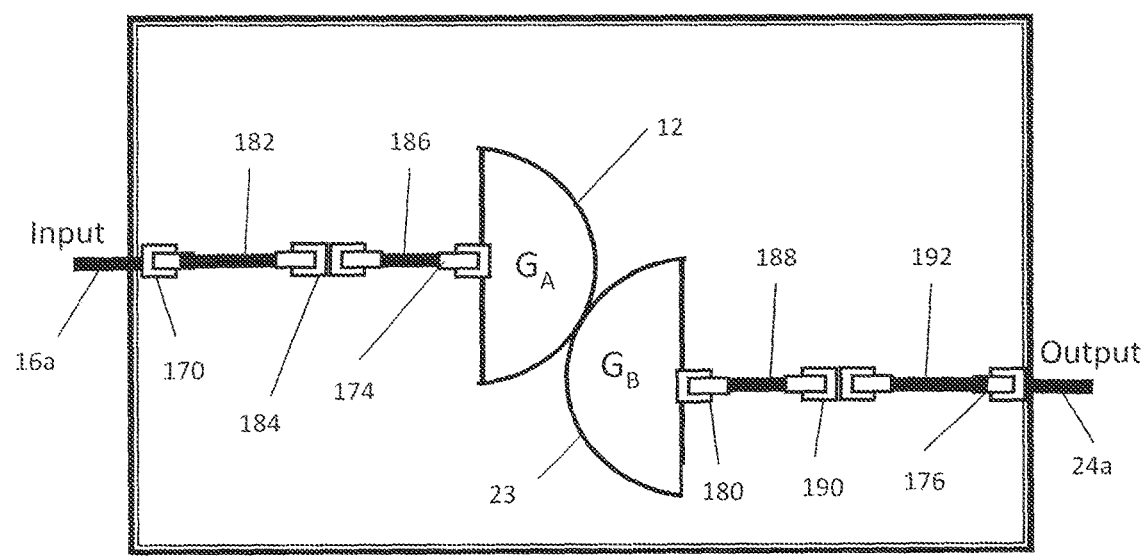
FIG. 79 shows the curvilinear gear system of FIG. 75 with the pinion gear at the 45° angle of rotation with each gear head attached to one of the fixed input and output shafts with two single conventional universal joints, one double conventional universal joint and two central shafts according to a yet further embodiment of the disclosure.
Figure 80:
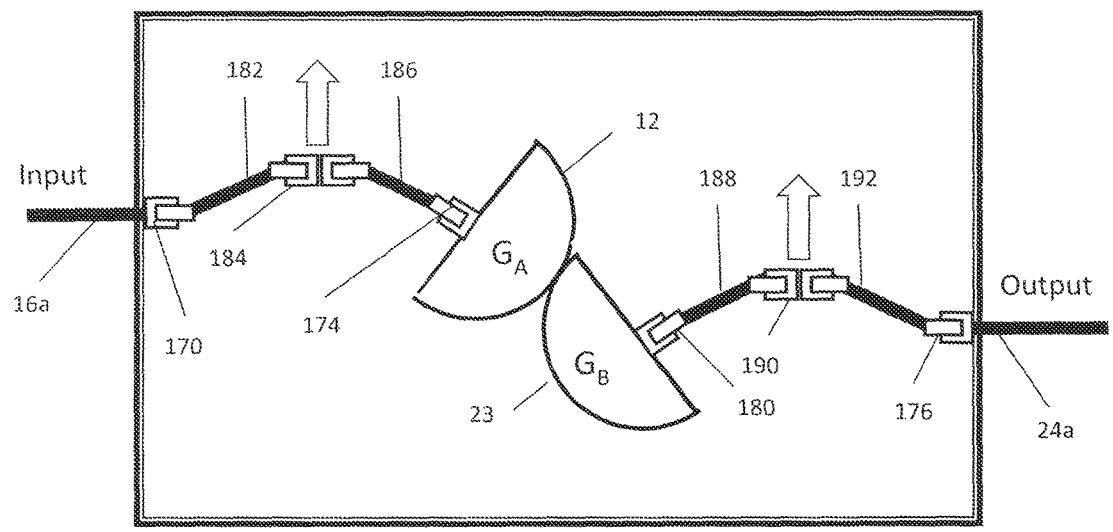
FIG. 80 shows the curvilinear gear system shown in FIG. 79 with the pinion gear head rotated to 90°.
Figure 81:
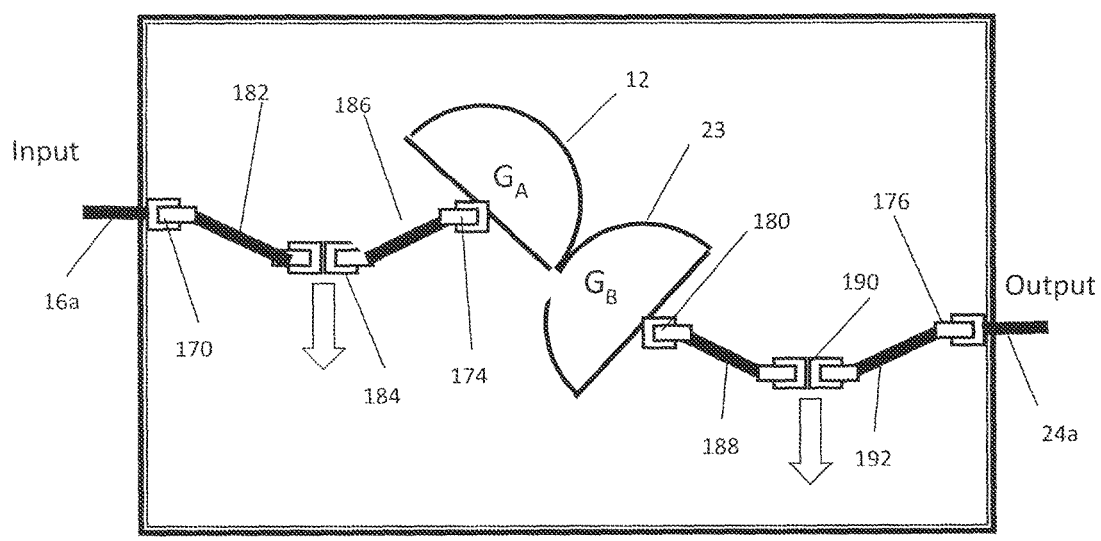
FIG. 81 shows the curvilinear gear system shown in FIG. 79 with the pinion gear head rotated to 0°.

The other limitation is that for the gear heads to move through their entire range of motion, 45°, the universal joints also have to move up to a 45° range. Because universal joints do not operate efficiently beyond about 15°, additional universal joint segments have to be incorporated into the gear system as shown in FIGS. 79-81. FIG. 79 shows input gear head 12 at 45° and output gear head 23 at 45°. FIG. 80 shows input gear head 12 at 90° output gear head 23 at 0°. FIG. 81 shows input gear head 12 at 0° and output gear head 23 at 90°.

Referring to FIGS. 79-81, the embodiment shown in FIG. 78 is further enhanced with the addition of a third input double universal joint 184 connected at a first end to first input central shaft 182, which is connected to first input universal joint 170. Universal joint 180 is connected at a second end to second input central shaft 186, which is connected to second input universal joint 174.

A third output double universal joint 190 is connected at a first end to a first output central shaft 192, which is connected to first output universal joint 176. Third output universal joint 190 is connected at a second end to a second output central shaft 188, which is connected to second output universal joint 180.

Figure 82:
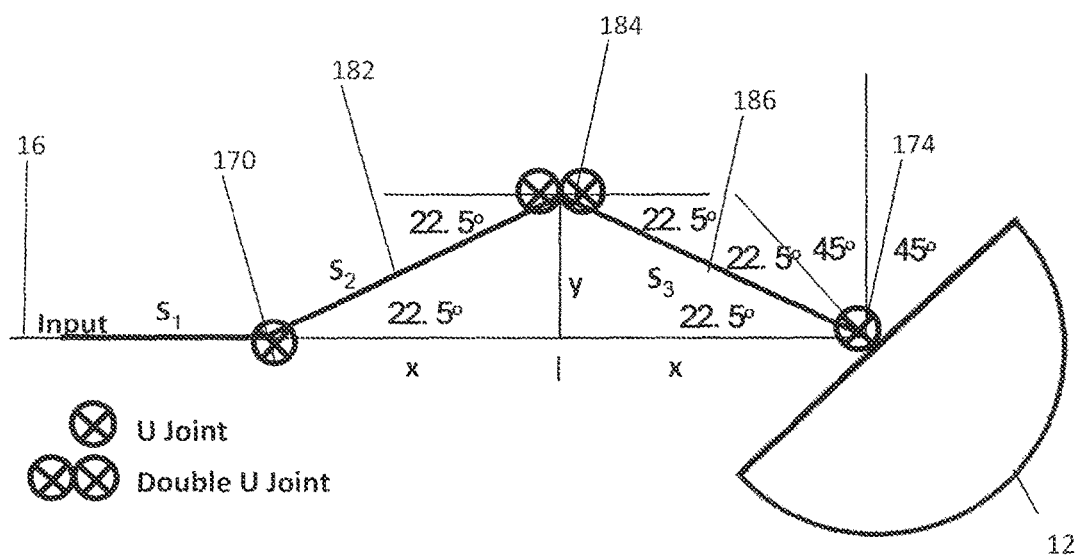
FIG. 82 shows a diagrammatical breakdown of the angles of rotation of the universal joints used in the curvilinear gear system shown in FIG. 79.

The addition of universal joints 184 and 190 reduces the working angle of all the universal joints as illustrated in FIG. 82. Rather than requiring a working angle of 45° for each universal joint when two universal joints are used per gear head, the addition of a third double universal joint reduces the operational angle range of each universal joint down to about 22.5°. As shown in FIG. 82, for any x-dimension, a y-dimension can be computed to achieve a desired universal joint working angle. This provides considerable flexibility to achieve a desired angle for any application of the gear system.

The working angle can be reduced by either increasing the value of "x" or decreasing the value of "y". Conversely, to increase the working angle of the universal joints, the value of "x" can be decreased or the value of "y" can be increased. The result is that the input and output shafts can be stabilized and connected the gear heads without requiring any connection shafts to be telescopic or have the property of variable length.

Figure 83:
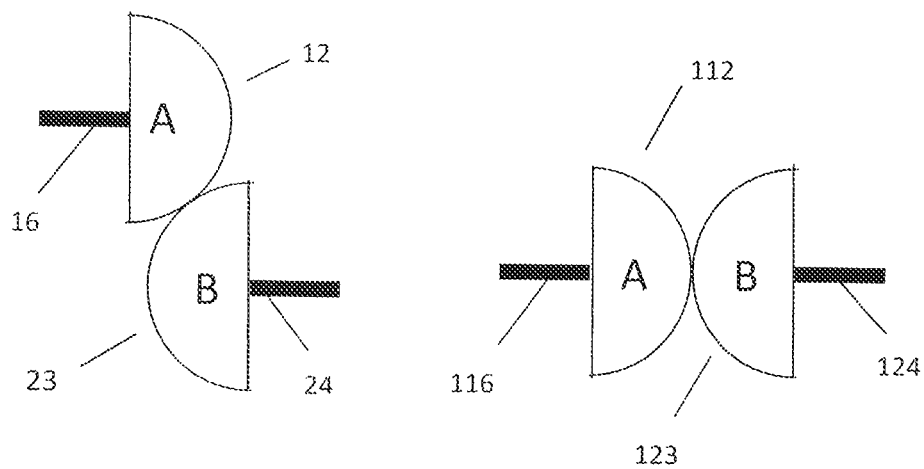
FIG. 83 shows a comparison between a curvilinear gear system and a curvilinear U Joint system according to embodiments of the disclosure.

A second alternative to stabilize the input and output shafts is to implement a hemispherical or curvilinear universal joint to stabilize the shafts and allow for the input and output gear heads to rotate through their entire ranges of angular travel. To understand the application of a curvilinear universal joint to stabilize the shafts, a distinction has to be made between a curvilinear gear and a curvilinear universal joint. As shown in FIG. 83, a curvilinear gear includes two interacting gear heads with the gear heads initially displaced and interacting at 45° so that their respective shafts have parallel, but different axes of rotation. In contrast, a curvilinear universal joint includes two interacting gear heads (hemispherical like the curvilinear joint gear heads) with the gear heads each aligned at 90° so that their respective shafts share the same axis of rotation.

Figure 84:
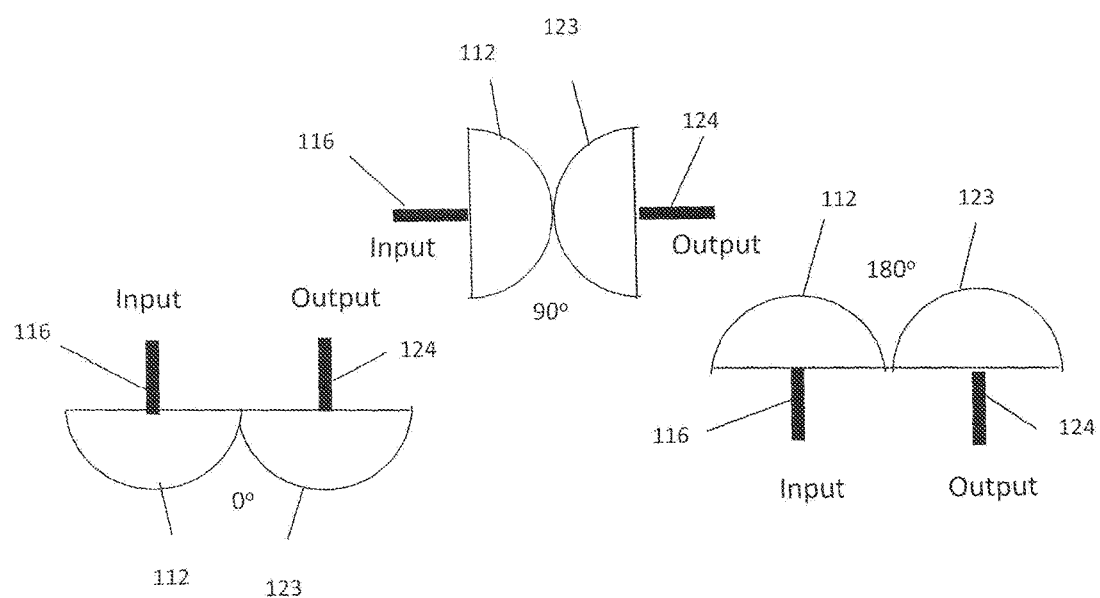
FIG. 84 shows a curvilinear U Joint system with interacting gear heads and fixed shafts rotated through different angles of orientation according to one embodiment of the disclosure.

Referring to FIG. 84, the operational range of motion for a curvilinear universal joint is 180°. Each gear head can rotate +/−90° with the lever arm of each universal joint gear head remaining the same throughout the gear heads range of angular motion. This results in the torque and angular velocity produced by the input gear being passed to the output gear, which is the desired effect of a universal joint.

3.1.3 Point Load

Tooth interaction for conventional gears involves dealing with line loads and point loads. Curvilinear gears deal exclusively with point loads. Transforming loads from a point to an area in a way that does not exceed the elastic properties of the gear material requires special design consideration. This issue is not addressed as part of this invention.

3.1.4 Wear

When the teeth of a curvilinear gear contact and interact, some slippage occurs. The slippage is small and can be controlled, but it does occur. Slippage is a problem that is also encountered with conventional CVTs, although the direct drive slippage problems are different than the friction driven slippage problems. One advantage the curvilinear gear has is that it minimizes slippage to any level, but at a cost. For example, by reducing row width by 50% slippage can be reduced by 50%, but at the expense of tooth/spline strength.

3.2 Operational Concept (by Type)

3.2.1 Simple Gear Head CVT

3.2.1.1 Basic Configuration

Figure 85:
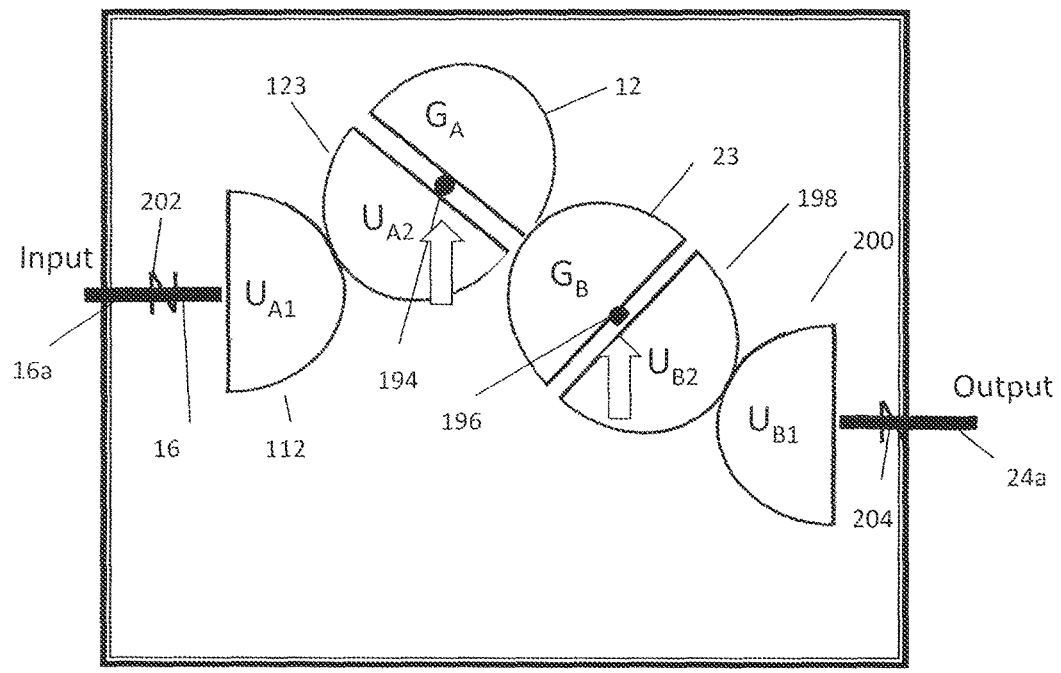
FIG. 85 shows a curvilinear transmission with a curvilinear gear system and two curvilinear U Joint systems according to a yet further embodiment of the disclosure.
Figure 86:
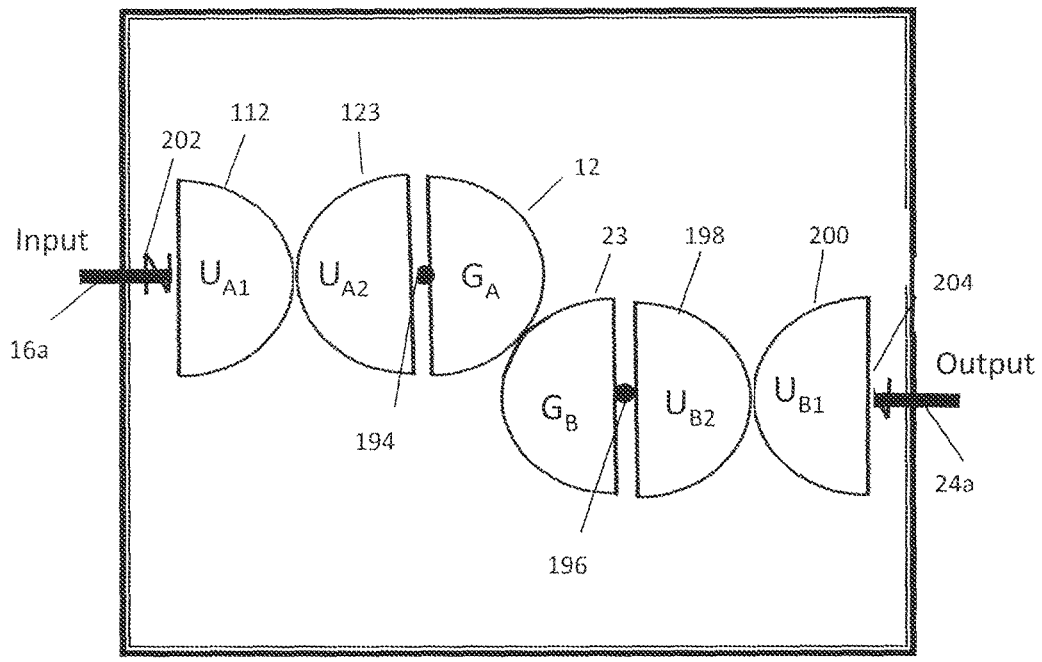
FIG. 86 shows the curvilinear transmission of FIG. 89 with the curvilinear pinion interacting with the curvilinear gear at 0°.
Figure 87:
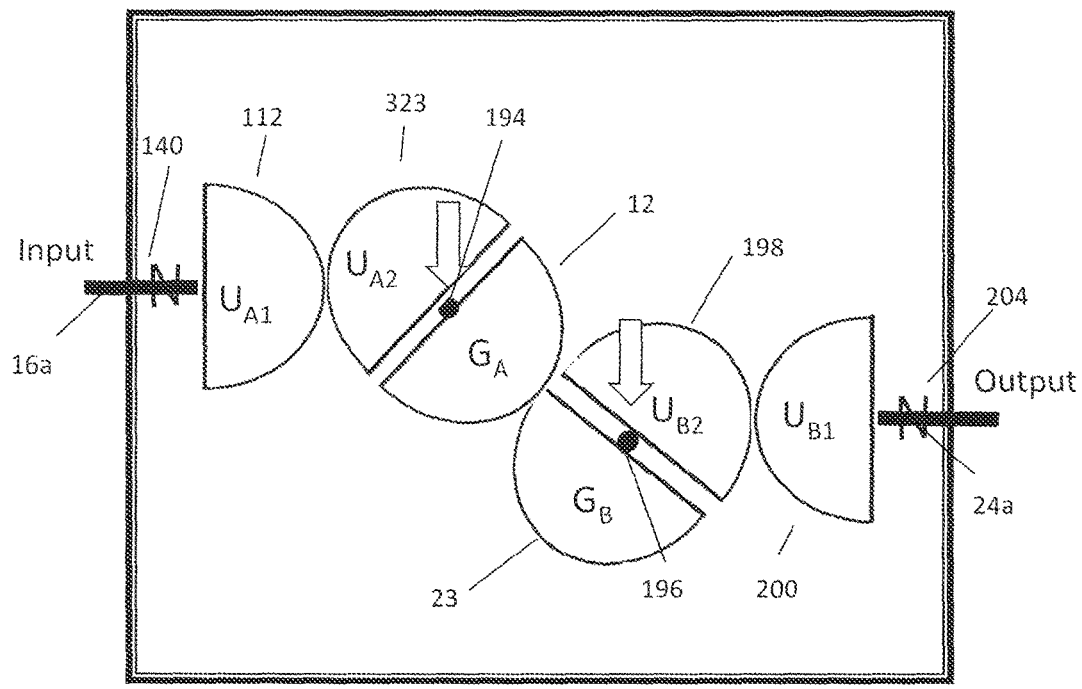
FIG. 87 shows the curvilinear transmission of FIG. 89 with the curvilinear pinion interacting with the curvilinear gear at 90°.

The properties of a curvilinear gear provide an advantageous solution to stabilize the shafts of the gear heads due to the large range of angular rotation. Referring to FIGS. 85-87, a gear system is shown including two curvilinear universal joints integrated with a curvilinear gear. FIG. 85 shows the gear system with gear head 12 at 0°. FIG. 86 shows the gear system with gear head 12 at 45°. FIG. 87 shows the gear system with gear head 12 at 90°.

With this configuration, gear head 12 shares a common pivot point 194 with universal gear head 123, and gear head 23 shares a common pivot point 196 with universal gear head 198. Each common pivot point can shift in tandem as shown by the direction arrows in FIGS. 88 and 90 to accommodate gear head rotation.

Another important consideration is the need for the fixed input/output shafts 16a and 24a to change length to accommodate rotation of the curvilinear universal joints. One solution is to incorporate an input spring 202 in input shaft 16a and an output spring 204 in output shaft 24a. Other alternatives include the gear head configurations described above with respect to curvilinear universal joints.

3.2.1.2 Gap Calculation—Example

Figure 28:
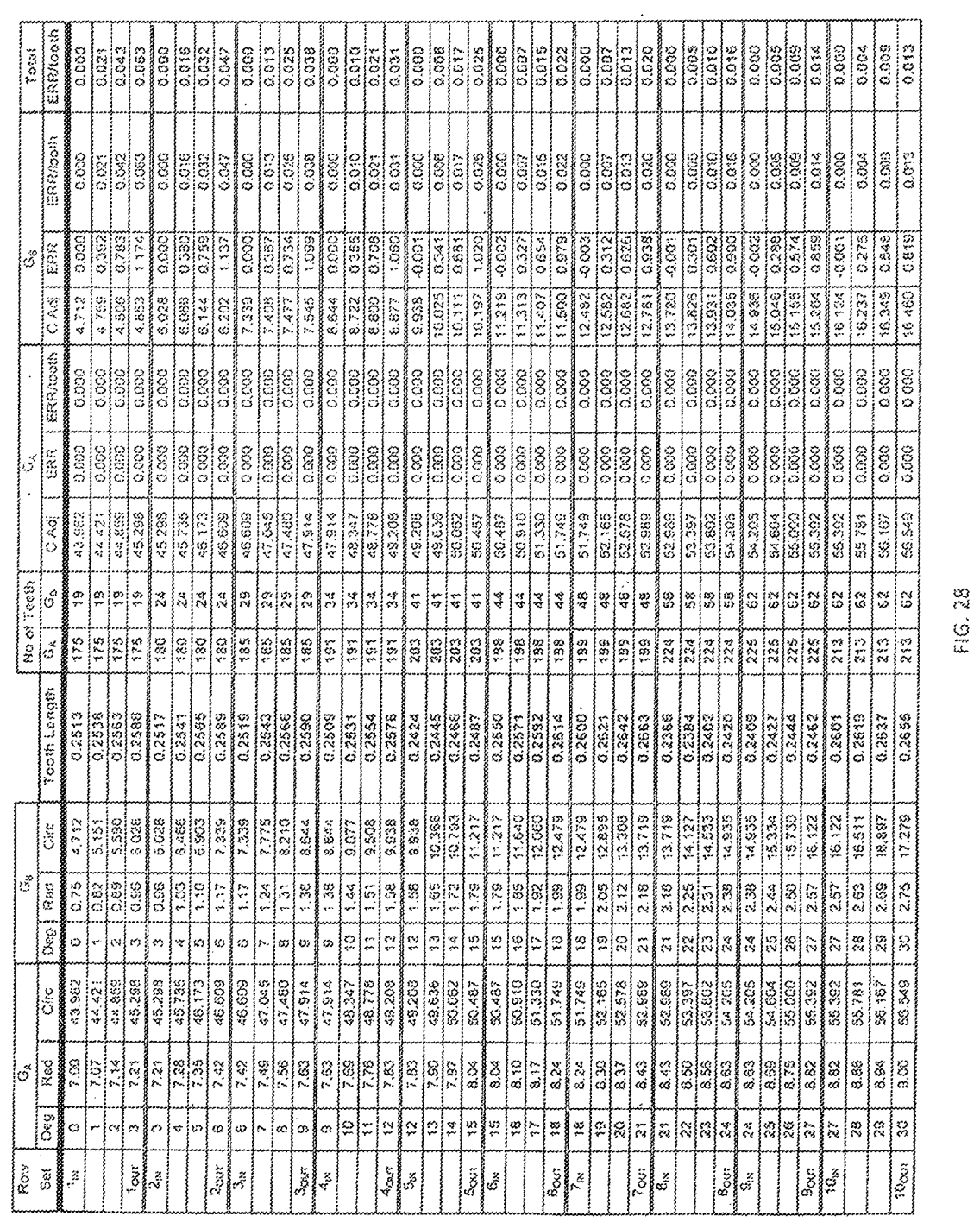
Figure 88:
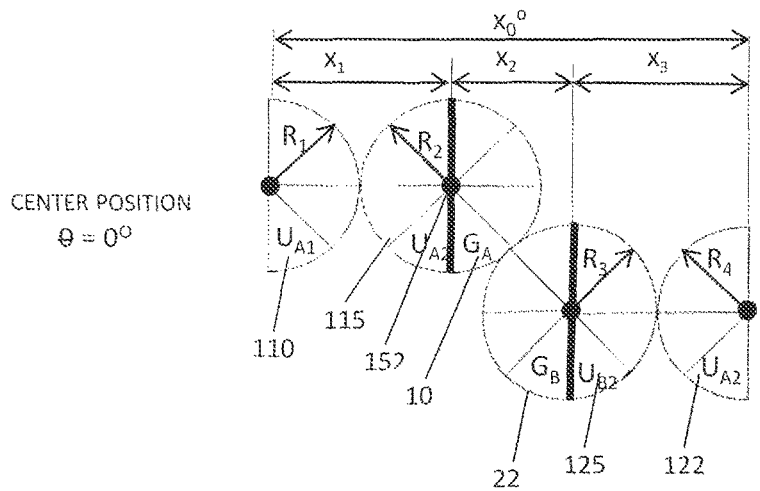
FIG. 88 shows a simple gear head CVT according to an embodiment of the disclosure
Figure 89:
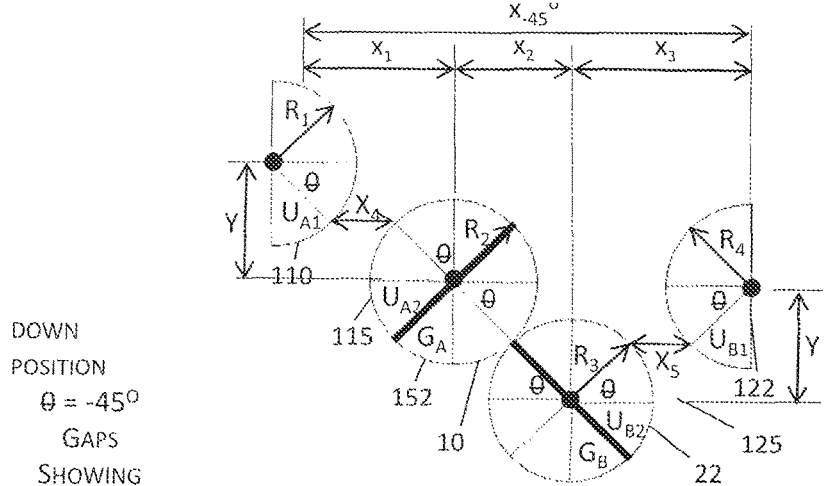
FIG. 89 shows gaps formed in the down position view of the simple gear head CVT of FIG. 88.
Figure 90:
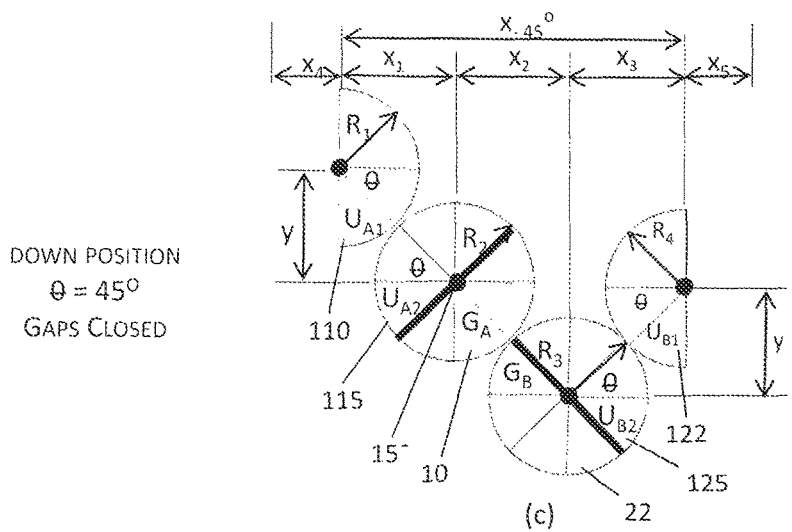
FIG. 90 shows gap resolution in the down position view of the simple gear head CVT of FIG. 88.

As previously shown in FIGS. 26-28, when curvilinear u-joints and curvilinear gears are assembled into a drive train, movement of the gears causes a change in the horizontal and vertical distances between the gears. The change in distances is shown in FIGS. 88, 89, and 90. In this illustrative embodiment, the radius of all the curvilinear universal joint hemispheres ($U_{A1}$, $U_{A2}$, $U_{B1}$, and $U_{B2}$), and the gear set ($G_A$ and $G_B$), each have the same diameter. It should be understood that friction drives can be developed where these values can be different; the embodiment represents the simplest form. Also, the initial positioning of the gear set is at 45°.

With all the gear heads having the same dimensions and positioned at 45°, this is the configuration in which the two gear heads making up the gear set come close to remaining in contact as the two pivot points move up and down vertically. But even with this embodiment, there is a small lateral gap created that must be accounted for. The horizontal gap is referred to herein as $\Delta x$. There is no vertical gap created; i.e., $\Delta y$.

Finding the values of $\Delta x$ and $\Delta y$ is used to determine the size of the gaps that must be addressed as the pivot points for $G_A$ and $G_B$ rotate +/−45°. This information is used to determine how either the spring, cam, or NoGap concept are applied to address this issue. The position of the gear heads at −45° will be used to establish the equations for computing the gap.

FIG. 88 shows the friction power train at center position; i.e., $\theta=0°$. FIG. 89 shows how gaps are formed in the full down position. And FIG. 90 shows how the gear sets are adjusted when in the down position to eliminate the gaps.

The following should be noted:

$$X_{Oo} = X_1 + X_2 = X_3;$$

where $$X_1 = R_1 + R_2$$

$$X_2 = R_2 \cos\theta + R_3 \cos\theta$$

$$X_3 = R_3 + R_4$$

FIG. 89 shows if the two pivot points that support $G_A/U_{A2}$ and $G_B/U_{B2}$ are moved an equal distance downward (some value of Y), $U_{A2}$ separates from UAL and $U_{B2}$ separates from $U_{B1}$. The gap that is formed is $X_4$ and $X_5$ where $X4=R_1(1-\cos\theta)+-R_2(1-\cos\theta)$ $X5=R_3(1-\cos\theta)+-R_4(1-\cos\theta)$ an $Y=R_1\sin\theta+R_2\sin\theta=R_3\sin\theta+R_4\sin\theta$ The total gap then becomes $\Delta x=X_4+X_5$ and $\Delta y=(R_1\sin\theta+R_2\sin\theta)-(R_3\sin\theta+R_4\sin\theta)=0$ Example:

If $R1=R2=R3=R4=4'',$ and $\theta=45°$

Then $X1=R1+R2=4''+4''=8''$ $X2=R2\cos\theta+R3\cos\theta=4\cos 45°+4\cos 45°=4\times(0.707)+4\times(0.707)=2.828+2.828=5.656''$ $X3=R3+R4=4''+4''=8''$ and $X0°=X1+X2=X3=8+5.656=8=21.656''$ Also, $X4=R1(1-\cos\theta)+-R2(1-\cos\theta)=4(1-\cos 45°)+4(1-\cos 45°)=4(1-0.707)+4(1-0.707)=2(4\times0.293)=2.344''$ $X5=R3(1-\cos\theta)+-R4(1-\cos\theta)=X4=2.344''$ $Y=R1\sin\theta+R2\sin\theta=R3\sin\theta+R4\sin\theta=4\sin 45°+4\sin 45°=8\times0.707=5.656''$ And $\Delta x=X4+X5=2.344+2.344=4.688''$ $\Delta y=R1\sin\theta+R2\sin\theta-R3\sin\theta+R4\sin\theta-=-5.656-5.656=0,$ and $X90°=X0°-(X4+X5)=21.656''-4.688''=16.968''$

3.2.1.3 Curvilinear Transmission

Figure 91:
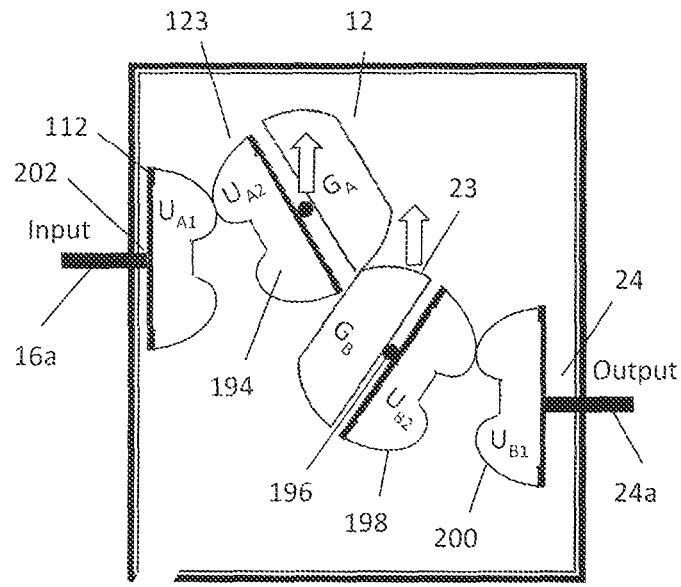
FIG. 91 shows a side sectional view of the curvilinear transmission shown in FIG. 89 with modified U Joint gear heads with the curvilinear pinion at +45° according to a further embodiment of the disclosure.
Figure 92:
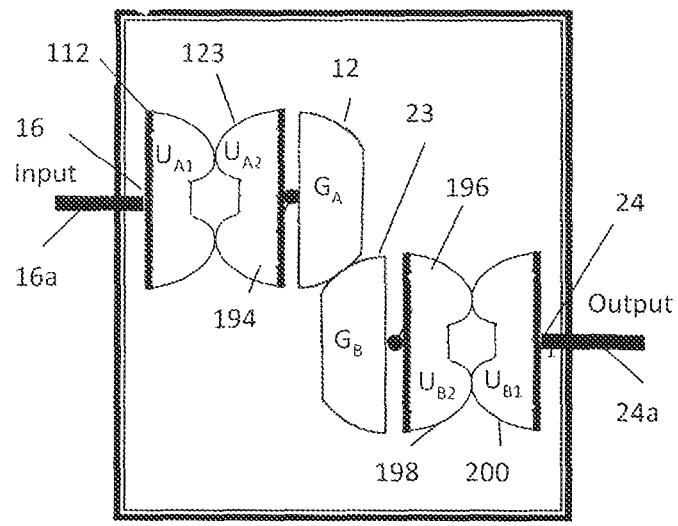
FIG. 92 shows a side sectional view of the curvilinear transmission shown in FIG. 85 with modified U Joint gear heads with the curvilinear pinion at 0° according to a further embodiment of the disclosure.
Figure 93:
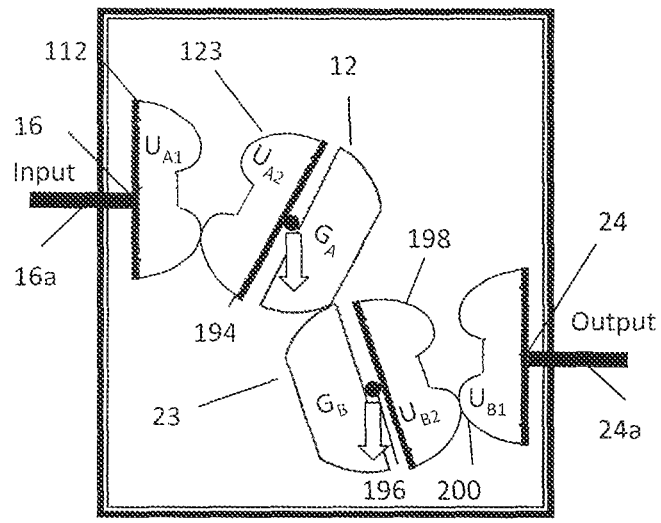
FIG. 93 shows a side sectional view of the curvilinear transmission shown in FIG. 85 with modified U Joint gear heads with the curvilinear pinion at −45° according to a further embodiment of the disclosure.
Figure 94:
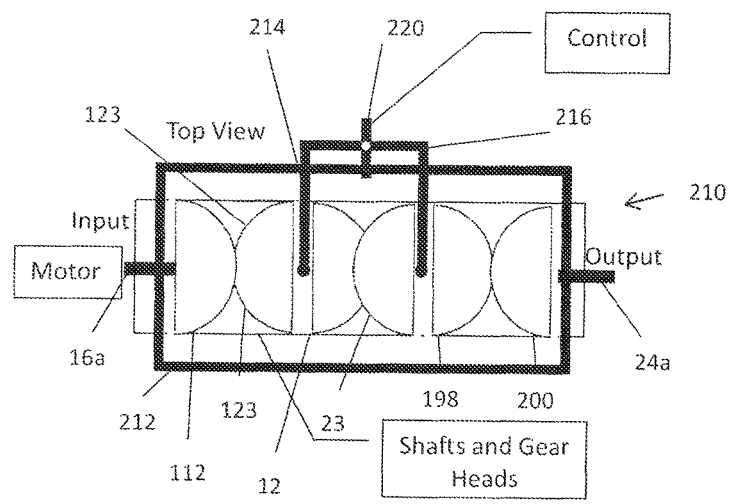
FIG. 94 shows a top view of a control system and an enclosure for the curvilinear transmission shown in FIG. 89 according to one embodiment of the disclosure.
Figure 95:
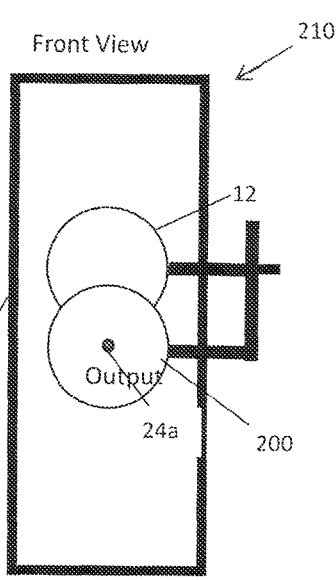
FIG. 95 shows a front elevational view of a control system and an enclosure for the curvilinear transmission shown in FIG. 89 according to one embodiment of the disclosure.
Figure 96:
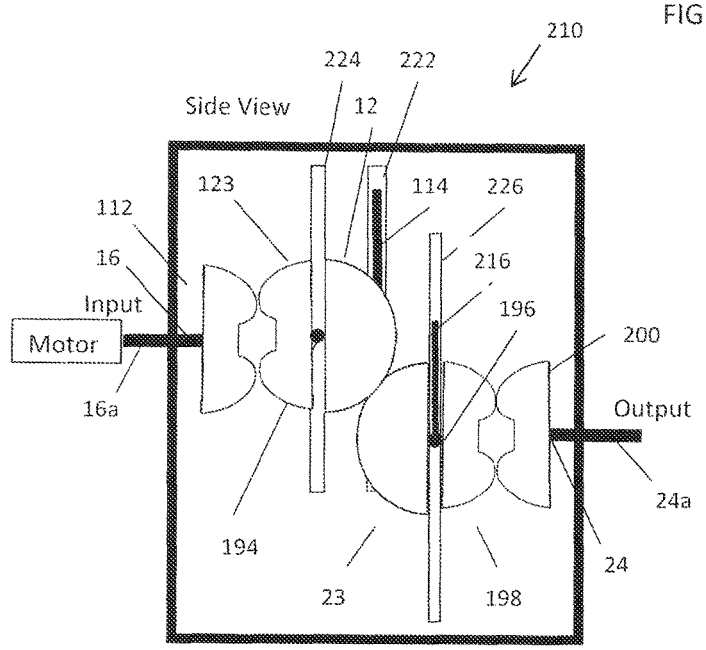
Figure 100:
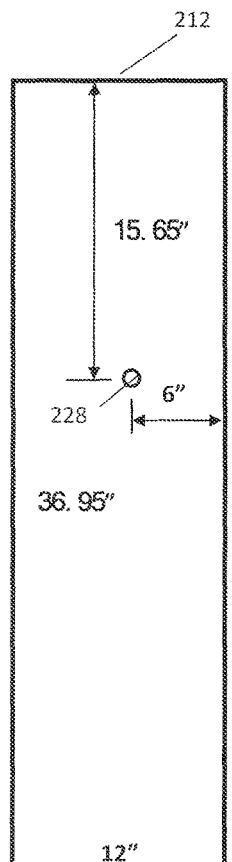
Figure 101:
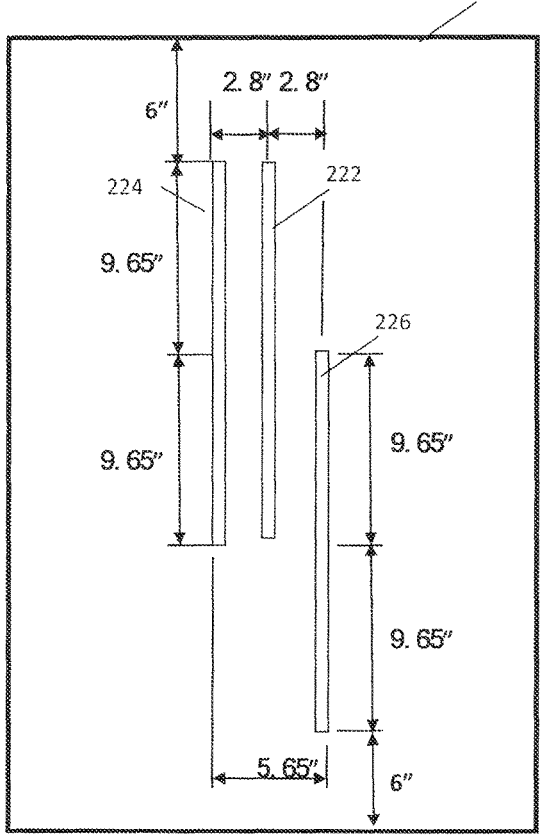
Figure 102:
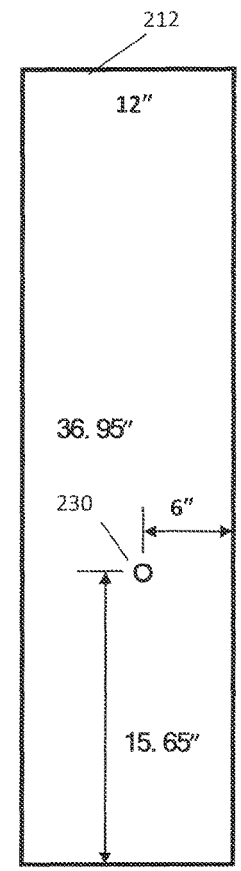
Figure 103:
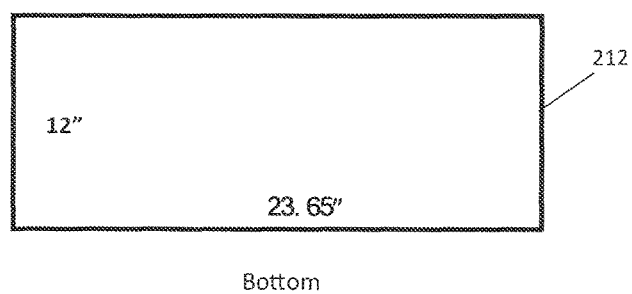
Figure 104:
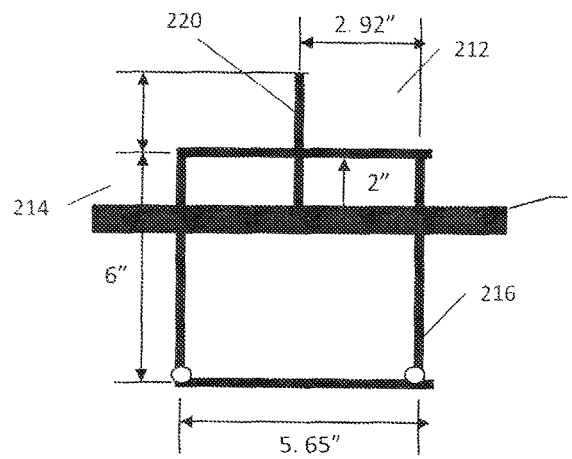
Figure 105:
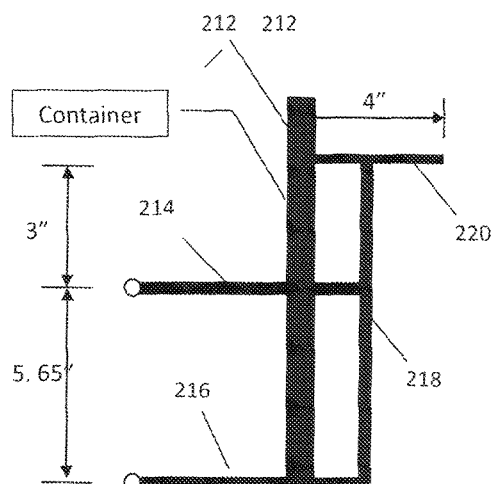
Figure 106:
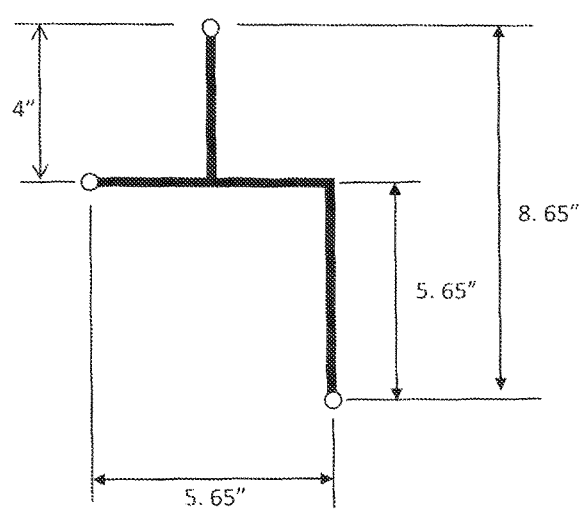
Figure 107:
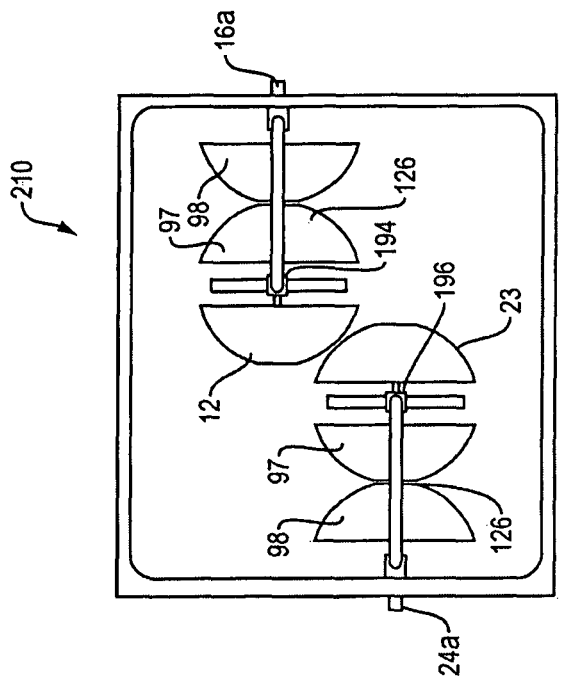

FIGS. 91-93 provide the general configuration of a curvilinear transmission apparatus, and further illustrate the operational concept of the apparatus. More specifically, as shown in FIGS. 94-110, the gear heads are contained in a gear casing 212 that includes apertures dimensioned to receive input and output shafts, 16a and 24a, so that the shafts rotate freely in the apertures. Casing 212 includes slots 222, 224 and 226 to receive control shafts that control movement of the common pivot points 194 and 196 in a vertical direction in the exemplary embodiment. The slot lengths are dimensioned to allow the pivot points to move throughout the full range of motion to allow the gear heads of the curvilinear gear segment and the curvilinear universal joint segments to rotate throughout the entire range of motion.

An input control shaft 214 connects to common pivot point 194 to control the rotation of input gear head 12 and input universal joint gear head 123. Moving control shaft 214 upwardly results in gear head 12 rotating to 0°. Conversely, moving control shaft 214 in a downward direction results in gear head 12 rotating to 90°.

An output control shaft 216 connects output common pivot point 196 to control the rotation of output gear head 23 and output universal gear head 198. Moving output control shaft 216 upwardly results in gear head 23 rotating to 90°. Conversely, moving control shaft 216 in a downward direction results in gear head 12 rotating to 0°.

To move control shafts 214 and 216 in unison, a shaft connector 218 is used. Shaft connector 218 is connected to ends of shafts 214 and 216. A center shaft 22 is used to manipulate the control shafts in a controlled uniform manner.

3.2.2 Split Gear Head CVT

3.2.2.1 Basic Configuration

As shown in FIG. 111, the basic geometry of the split gear head CVT is very similar to that of the simple gear head CVT. The difference is that the simple gear set used in the simple gear head CVT is replaced with a split gear set. Because the split gear set operates differently than the simple gear set, some new issues arise. The following is a description of the split gear head concept and issues related thereto.

The concept of using curvilinear set of gears that are physically interlocked will now be described. FIGS. 112 to 114 show an interlocking mechanism being used to drive a power train. It should be noted that the radius of the gear set ($G_A$ and $G_B$) is different. In this embodiment, the radius of $G_A$ is larger than the radius of $G_B$. In a different embodiment, $G_B$ may be the larger of the two gear heads. For this embodiment, $G_A$ and $G_B$ cannot have the same dimensions.

For purposes of discussion, the initial positioning of the gear heads is at 90°. This is different than the initial positioning of the gear set used in the simple gear head drive, and the same as the initial positioning of the curvilinear universal joint described herein.

To ensure the interaction between $G_A$ and $G_B$ remains correct, an axle is added to connect $G_B$ to $U_{B2}$. It should be noted that the length of the shaft is equal to y i.e. the vertical distance between the input and the output shafts. This permits $\Delta y$ to remain "zero" as explained below.

The combination of the three points shown in FIG. 113 results in a gap $\Delta x$ being formed that can be closed in similar fashion to the friction simple gear head drive embodiment Maintaining contact between the two gear heads of the gear set can be accomplished in a number of different ways including: (1) a spring concept, (2) a cam concept, (3) a constant lateral pivot point concept as previously disclosed, and (4) changing the geometric shape of the U Joints so they perform both as a U Joint and as a cam. The interacting surface can have any geometry as long as one property is satisfied; that property being that one gear head surface is the complete inverse of the other gear head surface.

$\Delta x$ and $\Delta y$ represent the size of the gaps that must be addressed as the pivot points for $G_A$ and $G_B$ rotate from 0° to 45°. This information is used to determine how either the spring, cam, or NoGap concept can be applied to address this issue. $\Delta x$ represents any horizontal gap that occurs between $G_A$ and $G_B$, while $\Delta y$ represents the vertical gap, which will be proven to always be "zero". The position of the gear heads at −45° will be used to establish the equations for computing the gap.

FIG. 115 shows the interlocking surface power drive at center position; i.e., where $G_A$ and $G_B$ are in the full vertical position. FIG. 116 shows the separation of $G_A$ and $G_B$ in the full down position; i.e., where $G_A$ and $G_B$ are in the full horizontal position. And FIG. 117 shows how $G_A$ and $G_B$ must be adjusted to remove the gap.

3.2.2.2 Gap Calculation $\Delta x$ and $\Delta y$ represent the size of the gaps that must be addressed as the pivot points for $G_A$ and $G_B$ rotate from 0° to 45°. This information is used to determine how either the spring, cam, or NoGap concept can be applied to address this issue. $\Delta x$ represents any horizontal gap that occurs between $G_A$ and $G_B$, while $\Delta y$ represents the vertical gap, which will be proven to always be "zero". The position of the gear heads at −45° will be used to establish the equations for computing the gap.

FIG. 115 shows that $$X_0 = X_1 + X_2 + X_3, \text{ where}$$

$$X_1 = R_1 + R_2$$

$$X_2 = R_{A1} + R_{B1} + Y;$$

where Y is the distance between the pivot points of $G_A$ and $G_B$, and the length of the axle between $G_B$ and $U_{B2}$, and $$X_3 = R_3 + R_4$$

Therefore, $$X_0 = (R_1 + R_2 + R_3 + R_4) + (R_{A1} + R_{B1}) + Y$$

FIG. 116 shows a gap that is formed as the position of $U_{A1}$ is fixed and $U_{A2}$ is permitted to rotate 45° while maintaining contact with $U_{A1}$. Similarly, $U_{B1}$ is fixed while $U_{B2}$ is permitted to rotate 45° while maintaining contact with $U_{B1}$. The size of the gap that is formed is computed as follows:

$$\Delta x = X_0 - X_0$$

$$\Delta x = X_0 - (R_1 + R_2) \cos 0 + (X_A/2) \cos 20 + R_A + (R_3 + R_4) \cos 0 + Y_2 \cos 20 + R_{B1}$$

$$\Delta x = X_0 - (R_1 + R_2 + R_3 + R_4) \cos 0 + ((X_A/2) + (X_B/2)) \cos 20 + R_{A1} + R_{B1} + Y_2 \cos 20$$

And following is the proof that no gap is formed in the Y-direction and the value of Y remains constant and the same is true between the pivot points of $G_A/U_{A2}$ and $G_B/U_{B2}$. First, compute the value of $Y_1$ $$Y_1 = (X_A/2 - X_B/2)$$

Next, compute the value of Y2 for any value of 0

$$Y_0 = -(R_1 + R_2) \sin 0 + (X_A/2) \sin 20 = -(R_3 + R_4) \sin 0 - Y_2 \sin 20 + (X_B/2) \sin 20$$

$$Y_2 \sin 20 = (-R_1 - R_2 + R_3 + R_4) \sin 0 + (X_A/2 - X_B/2) \sin 20$$

$$Y_2 = ((-R_1 - R_2 + R_3 + R_4) \sin 0 + (X_A/2 - X_B/2) \sin 20)/\sin 20 =$$

$$Y_2 = (X_A/2 - X_B/2)$$

If we let $R_1 = R_2 = R_3 = R_4$, then
$Y_1 = Y_2$

Example:
Referring to FIG. 118,
Given:
$R_1 = R_2 = R_3 = R_4 = 4"$
$R_{A1} = R_{B1} = 2"$
$D_{GA} = 10"$
$D_{GB} = 6"$
$X_A = 6"$
$X_B = 2"$
$0 = 45°$ $$Y_1 = Y_2 = X_{A/2} - X_{B/2} = 3" - 1" = 2"$$

Compute the Gap Size $$\Delta x = X_0 - X_0,$$

Where $$X_0 = X_1 + X_2 = X_3 = (R_1 + R_2) + (R_{A1} + R_{B1} + Y_2) + (R_3 + R_4)$$

$$X_0 = (4" + 4") + (2" + 2" + 2") + (4" + 4") = 22"$$

And $$X_0 = (R_1 + R_2 + R_3 + R_4) \cos 0 + ((X_A/2) + (X_B/2)) \cos 20 + R_{A1} + R_{B1} + Y_2 \cos 20$$

$$X_0 = (4" + 4" + 4" + 4") \cos 45° + (6/2 + 2/2) \cos 2 \times 45° + 2" + 2" + 2" \cos 2 \times 45°$$

$$X_0 = (16 \times 0.707) + (4 \times 0) + 2 + 2 + (2 \times 0) = 11.312 + 4 = 15.312"$$

And $$\Delta x = X0 - X_0 = 22" - 15.312" = 6.688"$$

3.2.2.3 Prototype Design (Use Functional Prototype)

In another embodiment of the disclosure, a curvilinear gear set is combined with U joints to form a direct drive continuously variable transmission (CVT) that provides increased flexibility in low and high torque applications with the ability to be serially linked. One embodiment of the general design concept is shown in FIG. 119, in which a CVT, shown generally as 300, includes a gear harness 334 that encases a pair of curvilinear U joints, 306 and 316, engaged to opposite ends of a curvilinear gear set 320. The U-joints are used to stabilize the input and output axes when the gears become laterally displaced during rotational movement through their angular ranges. The gear set allows for the smooth continuous change of torque and angular velocity over a pre-defined range. The range is defined as the range of gear ratios between Pt A and Pt B. For high torque applications, a physical interlocking mechanism is used to interlock the three gear head sets.

Power to operate the CVT is generated by a motor 326 that transfers rotational power to U joint 306 via input axle 303, which is connected to motor 326 at one end, and to first U joint gear 302 via input bearing 308 at a second end. First U joint gear 302 registers against second U joint gear 304 so as to enable second gear 304 to receive any torsional force created by first gear 302. Second U joint gear 304 is connected to a first curvilinear gear 322 via a bearing 310. The gears are fixed together so as to rotate in unison in substantially the same plane throughout the rotational movement of gear set 320.

First curvilinear gear 322 registers against second curvilinear gear 323 so as to receive any torsional force transferred from first gear 322. Second gear 323 is connected to a third curvilinear U joint gear 312 via an intermediate axle 324 via a bearing 319. Axle 324 is a telescopic shaft that accommodates the expansion and contraction of the distance between the gear set and second U-joint that results when the gear set rotates within its angular range. Torsional force generated by gear 323 is transferred directly to third curvilinear U joint gear 312 via axle 324. A fourth curvilinear U joint gear 314 registers against third gear 312 so as to receive any torsional force generated by third gear 312. Torsional force generated within CVT 300 is transferred out of the transmission via output axle 317, which is connected to fourth gear 314 via output bearing 318.

As shown in FIG. 120-121, the novel configuration of a gear set with two U-joint sets allows a continual smooth transition through gear ratios via rotation of the curvilinear gears through a range of angular displacements represented by angle e. The allowable operational angle is variable, which corresponds directly with the length of the CVT and the length of the telescopic shaft. The smaller the operational angle range, the shorter the CVT and the shorter the telescopic shaft will be, which can be used to control the size of the unit for specific applications. If size limitations are imposed due to a specific application, the size limits can be met by limiting the range of angular motion of the gears.

3.2.3 Flat Gear Head CVT

For higher torque values, alternatives such as splines or gear teeth can be used. The following application of the flat gear illustrates its value. FIGS. 122-124 show a drive train that uses one curvilinear universal joint, two gear heads, and two flat gears. As can be seen, the result is a drive train with very few moving parts. By simply moving the axes of rotation for each gear head/U Joint head up (FIG. 122) and down (FIG. 124), one can continuously vary the gear ratio of the transmission between two set limits.

3.3 Serial Linking

In another aspect of the disclosure, a CVT made in accordance with the disclosure can be further modified by serially linking a series of CVT's. It should be noted that the CVTs need not be identical to be serially linked. As shown in FIG. 125, a series of CVT assemblies are linked together by connecting the output shaft of a first CVT assembly to the input shaft of an adjacent, subsequent CVT assembly, or by making the output shaft of the first CVT, the input shaft of the adjacent CVT. With this arrangement, the range of torque and angular velocity can be multiplied by the number of individual CVT's serially linked. Although this can be achieved with conventional transmissions, they can only do so by following a step function. Conventional CVTs can also achieve this, their functional torque ranges are considerably limited relative to the curvilinear gear based CVT. With mechanical locking interfaces, the direct drive embodiment of the curvilinear CVT can achieve much higher torque ranges.

Size of a CVT assembly is determined by both the size of the gears used and the angle of operation. By serially linking CVTs, gear head size can be controlled.

While the present invention has been described in connection with one or more embodiments thereof, it will be apparent to those skilled in the art that many changes and modifications may be made without departing from the true spirit and scope of the invention. Accordingly, it is intended by the appended claim to cover all such changes and modifications as come within the true spirit and scope of the invention.

Having thus described my invention, what I claim as new and desire to secure by United States Letters Patent is:

1. A curvilinear transmission system comprising:
    at least one curvilinear gear system comprising a first gear having a curvilinear hemispherical surface and a flat surface opposite the hemispherical surface; a first shaft or first bearing attached to the flat surface at an axis of rotation for the first gear; a second gear having a second curvilinear hemispherical surface and a second flat surface opposite the second hemispherical surface; and, a second shaft or second bearing attached to the second flat surface at an axis of rotation for the second gear wherein outer surfaces of the hemispherical surfaces of the gears register against one another and interact to transmit torque and speed; and,
    a first universal joint connected to the first shaft or first bearing at a first end of the first universal joint; and,
    an input axle attached to a second end of the first universal joint;
    a second universal joint connected to the second shaft or second bearing at a first end of the second universal joint, wherein the second universal joint is a curvilinear universal joint having two curvilinear gears, wherein a first curvilinear gear of the second universal joint has a first curvilinear hemispherical surface and a first flat surface opposite the first hemispherical surface and a second curvilinear gear of the second universal joint has a second curvilinear hemispherical surface and a second flat surface opposite the second hemispherical surface, wherein outer surfaces of the hemispherical surfaces of the second universal joint gears register against one another and interact to transmit torque and speed, wherein the hemispherical surface of the first curvilinear gear of the second universal joint has a portion of the hemispherical surface opposite the attachment point of the input axle that defines a single concave segment positioned symmetrically about the axis of rotation for the first curvilinear gear, and wherein the hemispherical surface of the second curvilinear gear of the second universal joint has a portion of the hemispherical surface opposite the attachment point of the output axle that defines a single convex segment projecting from the second gear hemispherical surface with a substantially flat apical surface positioned symmetrically about the second gear axis of rotation, and wherein outer surfaces of the hemispherical surfaces of the first and second gears of the second universal joint register against one another and interact to transmit torque and speed; and,
    an output axle attached to a second end of the second universal joint.

2. The curvilinear transmission system of claim 1 further comprising an enclosure for maintaining the gears in physical contact and a control lever for controlling the angular orientation of the gears.

3. The curvilinear transmission system of claim 1 wherein the first gear and the second gear have outer surfaces formed as friction surfaces that register against one another.

4. The curvilinear transmission system of claim 1 wherein the first gear and the second gear have outer surfaces comprising intermeshing structures.

5. The curvilinear transmission system of claim 4 wherein the intermeshing structures are selected from the group consisting of gear teeth, splines and mixtures thereof.

6. The curvilinear transmission system of claim 1 further comprising a plurality of curvilinear gear systems serially linked together in the curvilinear transmission system.

7. A curvilinear transmission system comprising:
    at least one curvilinear gear system comprising a first gear having a curvilinear hemispherical surface and a flat surface opposite the hemispherical surface; a first shaft or first bearing attached to the flat surface at an axis of rotation for the first gear; a second gear having a second curvilinear hemispherical surface and a second flat surface opposite the second hemispherical surface; and, a second shaft or second bearing attached to the second flat surface at an axis of rotation for the second gear wherein outer surfaces of the hemispherical surfaces of the gears register against one another and interact to transmit torque and speed;

a first universal joint connected to the first shaft or first bearing at a first end of the first universal joint, wherein the first universal joint is a curvilinear universal joint having two curvilinear gears, and wherein a first curvilinear gear of the first universal joint has a first curvilinear hemispherical surface and a first flat surface opposite the first hemispherical surface and a second curvilinear gear of the first universal joint has a second curvilinear hemispherical surface and a second flat surface opposite the second hemispherical surface, wherein the hemispherical surface of the first curvilinear gear of the first universal joint has a portion of the hemispherical surface opposite the attachment point of the input axle that defines a single concave segment positioned symmetrically about the axis of rotation for the first curvilinear gear, and wherein the hemispherical surface of the second curvilinear gear of the first universal joint has a portion of the hemispherical surface opposite the attachment point of the output axle that defines a single convex segment projecting from the second gear hemispherical surface with a substantially flat apical surface positioned symmetrically about the second gear axis of rotation, and wherein outer surfaces of the hemispherical surfaces of the first and second gears of the first universal joint register against one another and interact to transmit torque and speed, and wherein outer surfaces of the hemispherical surfaces of the first universal joint gears register against one another and interact to transmit torque and speed;

an input axle attached to a second end of the first universal joint;

a second universal joint connected to the second shaft or second bearing at a first end of the second universal joint, wherein the second universal joint is a curvilinear universal joint having two curvilinear gears; and, an output axle attached to a second end of the second universal joint.

8. A curvilinear transmission system comprising:

at least one curvilinear gear system comprising a first gear having a curvilinear hemispherical surface and a flat surface opposite the hemispherical surface; a first shaft or first bearing attached to the flat surface at an axis of rotation for the first gear, a second gear having a second curvilinear hemispherical surface and a second flat surface opposite the second hemispherical surface and, a second shaft or second bearing attached to the second flat surface at an axis of rotation for the second gear, and wherein outer surfaces of the hemispherical surfaces of the gears register against one another and interact to transmit torque and speed; and, a first universal joint connected to the first shaft or bearing at a first end, wherein the first universal joint comprises a first universal joint gear having a first curvilinear hemispherical surface and a flat surface opposite the first curvilinear hemispherical surface, wherein a portion of the first curvilinear hemispherical surface defines a single concave segment positioned symmetrically about the axis of rotation for the first universal joint gear, and a second universal joint gear having a second curvilinear hemispherical surface and a second flat surface opposite the second hemispherical surface, wherein a portion of the second curvilinear hemispherical surface defines a single convex segment projecting from the second gear hemispherical surface with a substantially flat apical surface positioned symmetrically about the second gear axis of rotation, and wherein outer surfaces of the hemispherical surfaces of the first and second universal joint gears register against one another and interact to transmit torque and speed; and, an input axle attached to a second end of the first universal joint.

9. The curvilinear transmission system of claim 8 further comprising:

a second universal joint connected to the second shaft or second bearing at a first end of the second universal joint; and, an output axle attached to a second end of the second universal joint.

10. The curvilinear transmission system of claim 9 wherein the second universal joint is a curvilinear universal joint having two curvilinear gears.

11. The curvilinear transmission system of claim 8 wherein the first gear and the second gear have outer surfaces formed as friction surfaces that register against one another.

12. The curvilinear transmission system of claim 8 wherein the first gear and the second gear have outer surfaces comprising intermeshing structures.

13. The curvilinear transmission system of claim 12 wherein the intermeshing structures are selected from the group consisting of gear teeth, splines and mixtures thereof.

* * * * *